(12) United States Patent
Tanaka et al.

(10) Patent No.: US 9,928,580 B2
(45) Date of Patent: Mar. 27, 2018

(54) PROJECTION SYSTEM, PROJECTOR APPARATUS, AND PROJECTION METHOD

(71) Applicants: MegaChips Corporation, Osaka-shi (JP); Nintendo Co., Ltd., Kyoto-shi (JP)

(72) Inventors: Motoyasu Tanaka, Osaka (JP); Yuki Haraguchi, Chiba (JP); Fumiya Shingu, San Jose, CA (US); Eizi Kawai, Kyoto (JP); Kazuhiro Hosoi, Kyoto (JP)

(73) Assignees: MegaChips Corporation, Osaka-shi (JP); Nintendo Co., Ltd., Kyoto-shi (JP)

( * ) Notice: Subject to any disclaimer, the term of this patent is extended or adjusted under 35 U.S.C. 154(b) by 0 days.

(21) Appl. No.: 15/719,329

(22) Filed: Sep. 28, 2017

(65) Prior Publication Data
US 2018/0018761 A1  Jan. 18, 2018

Related U.S. Application Data

(63) Continuation of application No. PCT/JP2016/056253, filed on Mar. 1, 2016.

(30) Foreign Application Priority Data

Mar. 30, 2015  (JP) ................ 2015-068987
Jan. 19, 2016  (JP) ................ 2016-007581

(51) Int. Cl.
*G09G 5/00*  (2006.01)
*G06T 5/00*  (2006.01)
(Continued)

(52) U.S. Cl.
CPC ............. *G06T 5/006* (2013.01); *G06T 3/60* (2013.01); *H04N 9/3185* (2013.01); *H04N 9/3191* (2013.01)

(58) Field of Classification Search
None
See application file for complete search history.

(56) References Cited

U.S. PATENT DOCUMENTS

2009/0115916 A1   5/2009  Kondo et al.
2015/0319514 A1  11/2015  Hara

FOREIGN PATENT DOCUMENTS

JP  2005-123855 A  5/2005
JP  2006-033357 A  2/2006
(Continued)

OTHER PUBLICATIONS

Written Opinion of the International Searching Authority issued in International Application No. PCT/JP2016/056253 dated May 24, 2016.

*Primary Examiner* — Frank Chen
(74) *Attorney, Agent, or Firm* — Oblon, McClelland, Maier & Neustadt, L.L.P.

(57) ABSTRACT

Provided is a projection system that easily and appropriately reduces the geometric distortion of the image projected on the projection plane. The projection circuitry 3 of the projection system 1000 projects a test image onto the projection plane. The three-dimensional shape measurement circuitry 4 measures the three-dimensional shape of the projection plane. The controller 200 generates a control signal. Based on the measured three-dimensional shape data, the projection image adjustment circuitry 1 performs correction processing and rotation processing on a test, in accordance with the control signal, such that the geometrical image distortion is reduced as viewed from the user's viewpoint.

18 Claims, 36 Drawing Sheets

(51) Int. Cl.
*H04N 9/31* (2006.01)
*G06T 3/60* (2006.01)

(56) References Cited

FOREIGN PATENT DOCUMENTS

| | | |
|---|---|---|
| JP | 2008-085748 A | 4/2008 |
| JP | 2009-135921 A | 6/2009 |
| JP | 2013-026824 A | 2/2013 |
| JP | 2014-131091 A | 7/2014 |

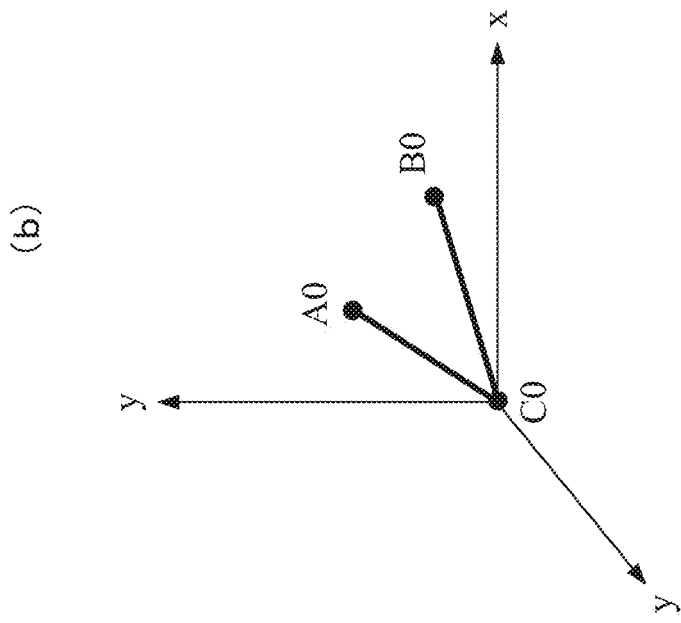
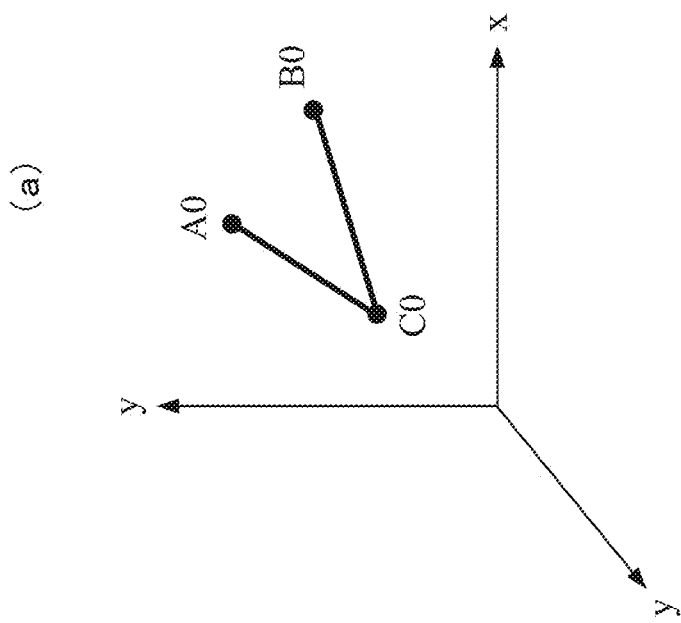
FIG. 33

PROJECTION SYSTEM, PROJECTOR APPARATUS, AND PROJECTION METHOD

CROSS-REFERENCE TO RELATED APPLICATIONS

This application is a continuation of International Application No. PCT/JP2016/056253, filed Mar. 1, 2016, which is based upon and claims priority to Japanese Application No. 2016-007581, filed Jan. 19, 2016, and Japanese Application No. 2015-068987, filed Mar. 30, 2015, the entire contents of which are incorporated herein by reference.

TECHNICAL FIELD

The present invention relates to a technique for appropriately displaying an image (video) projected by a projection-type projector apparatus.

BACKGROUND ART

Various techniques have been developed for correcting geometric distortion that occurs when an image (video) projected by a projection-type projector apparatus is viewed from a user's viewpoint.

For example, a video projection apparatus capable of correcting image distortion due to the distortion of a screen itself is known. Such a video projection apparatus projects a test image from a projector onto the screen, captures the projected test image with a camera-equipped cellular phone, and performs geometric correction based on the image captured by the camera-equipped cellular phone. This allows the video projection apparatus to correct distortion (geometric distortion) of the video due to the distortion of the screen itself.

DISCLOSURE OF INVENTION

Technical Problem

However, the above-described conventional technique additionally requires a device having a photographing function such as a camera-equipped mobile phone in order to perform geometric correction based on the image captured by the camera-equipped mobile phone. In a case when geometric correction of an image projected on a screen by a projection type projector apparatus is performed without using such a device having a photographing function, for example, it is conceivable to adjust a projection state of the projection type projector apparatus by moving four vertices of a rectangular pattern projected on the screen by a user such that the rectangular pattern is projected without geometric distortion. In other words, it is conceivable to let the user to execute four-point geometric correction. Such a four-point geometric correction is difficult for a general user to execute, and is also difficult for the general user to adjust the projector type projector apparatus such that the projection in a state with no geometric distortion is completely achieved.

A projection target onto which projection type projector apparatuses project images is typically a plane screen vertically installed. Thus, even if projection in a state completely with no geometric distortion is not achieved, it is sufficiently possible to adjust the projector type projector apparatus to achieve a projection state in which geometric distortion of a projected image is not noticeable to the user. This is because the user can correctly recognize the fact that an image is projected on the plane screen vertically installed and the user can easily recognize the vertical direction; accordingly, some amount of geometric distortion included in the image that is projected on the plane screen vertically installed does not cause a feeling of strangeness.

However, when a projection target (projection plane) is, for example, set to a ceiling that is installed in parallel with a floor (hereinafter referred to as "horizontal ceiling") and the projection type projector apparatus projects an image on the horizontal ceiling, it is necessary to further reduce the allowable level of geometric distortion of the image projected on the horizontal ceiling as compared with the allowable level of geometric distortion in a case where the projection plane is a vertical plane. This is caused by the following reasons: when the projection plane is set to the horizontal ceiling, it is not easy for the user to instinctively recognize the vertical direction in the projected image; thus an amount of geometric distortion, which does not cause a feeling of strangeness to the user in projecting the image on the plane screen vertically installed, causes a feeling of strangeness to the user in projecting the image on the horizontal ceiling.

In view of the above, it is an object of the present invention to provide a projection system, a projector apparatus, and a program that easily and appropriately reduce geometric distortion of an image projected on a horizontal projection plane (e.g., horizontal ceiling) or a plane parallel to a line connecting both eyes of a user (e.g., a forward inclined plane or a backward inclined plane) without using a device having a photographing function.

Furthermore, when a projection target (projection plane) is, for example, set to a plane that is installed above a user and is inclined by a predetermined angel (e.g., an inclined ceiling) and the projection type projector apparatus projects an image on the inclined ceiling, it is necessary to further reduce the allowable level of geometric distortion of the image projected on the inclined ceiling as compared with the allowable level of geometric distortion in a case where the projection plane is a vertical plane. This is caused by the following reasons: when the projection plane is set to the inclined plane (e.g., inclined ceiling), it is not easy for the user to instinctively recognize the vertical direction in the projected image; thus an amount of geometric distortion, which does not cause a feeling of strangeness to the user in projecting the image on the plane screen vertically installed, causes a feeling of strangeness to the user in projecting the image on the inclined plane (e.g., inclined ceiling).

In view of the above, it is an object of the present invention to provide a projection system, a projector apparatus, and a program that easily and appropriately reduce geometric distortion of an image projected on an inclined plane (e.g., inclined ceiling) without using a device having a photographing function.

Solution to Problem

To solve the above problems, a first aspect of the invention provides a projection system in which a plane parallel to a line connecting a left eye viewpoint and a right eye viewpoint is set as a projection plane and an image is projected such that geometric image distortion is reduced as viewed from a user's viewpoint. The projection system includes a projection unit, a three-dimensional shape measurement unit, a controller, and a projected image adjustment unit.

The projection unit is configured to project an image onto the projection plane, and project a test image.

The three-dimensional shape measurement unit is configured to measure a three-dimensional shape of the projection plane.

The controller is configured to generate a control signal based on operation of the user.

(1) The projected image adjustment unit is configured to perform correction processing, which is image conversion processing, on the test image based on the three-dimensional shape data measured by the three-dimensional shape measurement unit such that geometric image distortion is reduced as viewed from a first point, which is a point that passes through a projection center point, which is an intersection of a projection axis of the projection unit and the projection plane, the first point being on a normal line of the projection plane.

(2) The projected image adjustment unit is configured to determine a rotation angle in accordance with the control signal and perform rotation processing, which is image conversion processing, on the test image after the correction processing, such that the image projected on the projection plane, which is obtained by projecting the test image after the correction processing by the projection unit, appears to be an image obtained by rotating the projected image by the rotation angle around the projection center point as viewed from the first point to the projection plane.

BRIEF DESCRIPTION OF THE DRAWINGS

FIG. 33 is a diagram describing the principle of the viewpoint identification processing.

DESCRIPTION OF THE PREFERRED EMBODIMENTS

First Embodiment

A first embodiment will now be described with reference to the drawings.

1.1 Structure of Projection System

Figure 1:
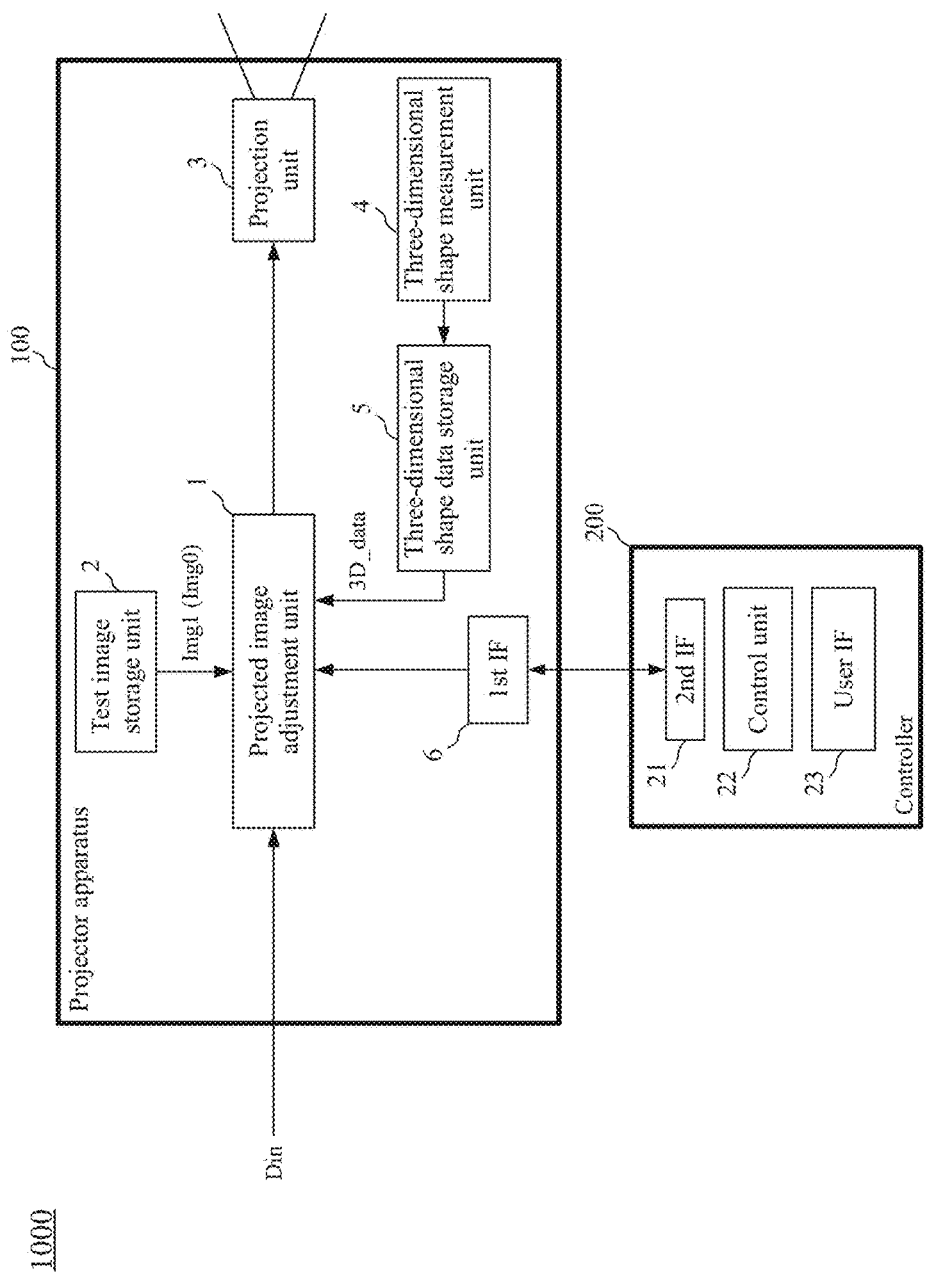
FIG. 1 is a schematic diagram showing the structure of a projection system 1000 according to a first embodiment.

FIG. 1 is a schematic diagram showing the structure of a projection system 1000 according to the first embodiment.

Figure 2:
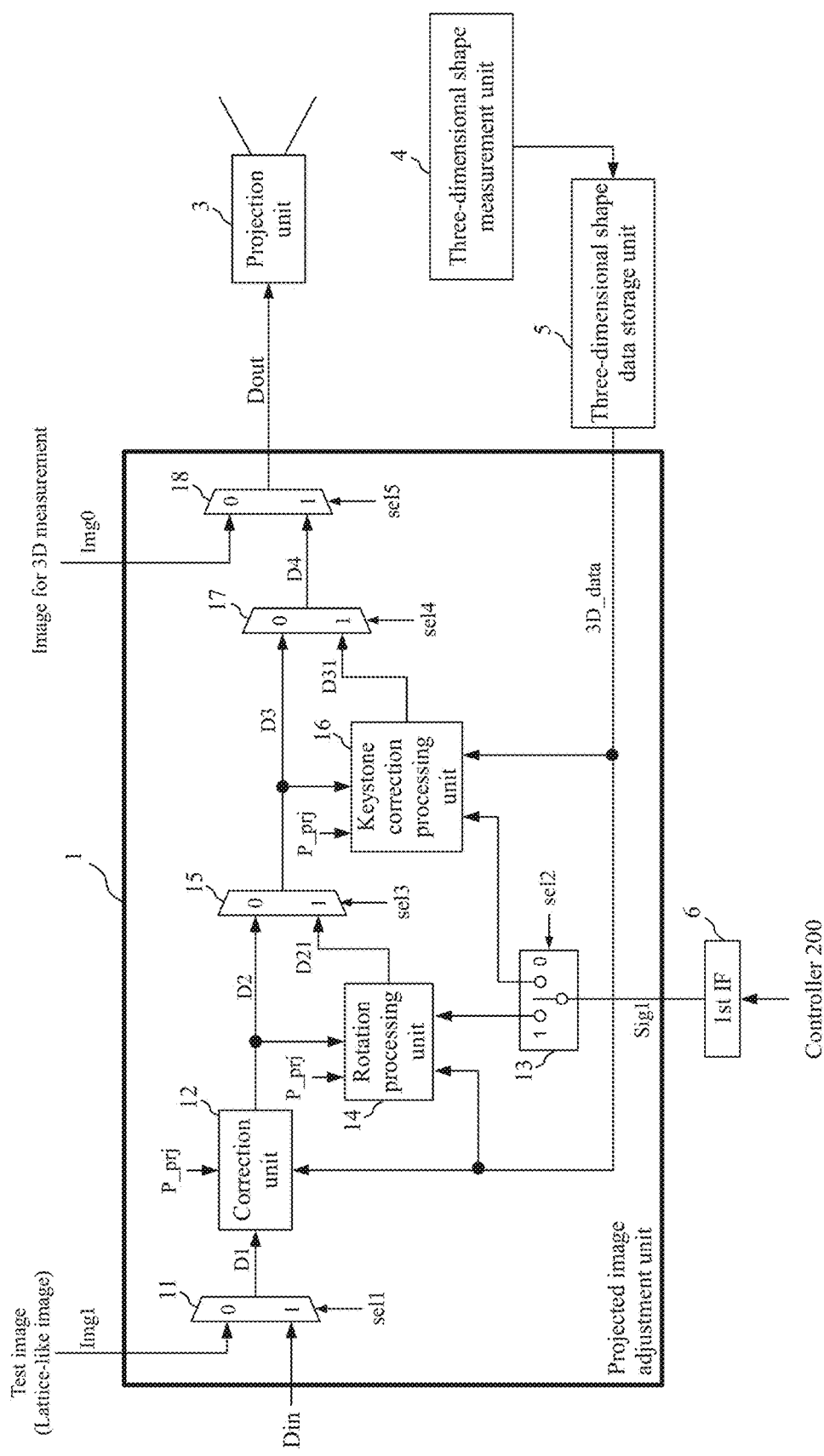
FIG. 2 is a schematic diagram showing the structure of a projected image adjustment unit 1 of a projector apparatus 100 of the projection system 1000 according to the first embodiment.

FIG. 2 is a schematic diagram showing the structure of a projected image adjustment unit 1 of a projector apparatus 100 of the projection system 1000 according to the first embodiment.

As shown in FIG. 1, the projection system 1000 includes a projector apparatus 100 and a controller 200.

As shown in FIG. 1, the projector apparatus 100 includes a projected image adjustment unit 1, a test image storage unit 2, a projection unit 3, a three-dimensional shape measurement unit 4, a three-dimensional shape data storage unit 5, a first interface 6, and a first interface 6.

As shown in FIG. 2, the projected image adjustment unit 1 includes a first selector 11, a correction unit 12, a switcher 13, a rotation processing unit 14, a second selector 15, a keystone correction processing unit 16, a third selector 17, and a fourth selector 18.

The first selector 11 receives an image Din (an image signal Din) inputted into the projector apparatus 100, a test image Img1 transmitted from the test image storage unit 2, and a selection signal sel1. In accordance with the selection signal sel1, the first selector 11 selects one of the image Din and the test image Img1, and then transmits the selected image (the selected image signal) as an image D1 (an image signal D1) to the correction unit 12. Note that the selection signal sel1 is a control signal generated by a control unit (not shown) that controls each functional unit of the projector apparatus 100.

The correction unit 12 receives the image D1 transmitted from the first selector 11, the three-dimensional shape data 3D_data transmitted from the three-dimensional shape data storage unit 5, and the information P_prj on a projection point of the projection unit 3. The correction unit 12 performs correction processing on the image D1 based on the three-dimensional shape data 3D_data and the information P_prj on the projection point. The correction unit 12 then transmits the image after the correction processing as an image D2 (an image signal D2) to the second selector 15 and the rotation processing unit 14.

The switcher 13 receives the signal Sig1 transmitted from the first interface 6 and a selection signal sel2. In accordance with the selection signal sel2, the switcher 13 transmits the signal Sig1 to the rotation processing unit 14 or the keystone correction processing unit 16. Note that the selection signal sel2 is a control signal generated by a control unit that controls each functional unit of the projector apparatus 100.

The rotation processing unit 14 receives the image D2 transmitted from the correction unit 12, the three-dimensional shape data 3D_data transmitted from the three-dimensional shape data storage unit 5, the information P_prj on the projection point of the projection unit 3, and the signal Sig1 transmitted from the switcher 13. When the signal Sig1 is inputted, the rotation processing unit 14 performs rotation processing on the image D2 based on the three-dimensional shape data 3D_data and the information P_prj on the projection point of the projection unit 3. The rotation processing unit 14 then transmits the processed image as an image D21 (an image signal D21) to the second selector 15.

The second selector 15 receives the image D2 transmitted from the correction unit 12, the image D21 transmitted from the rotation processing unit 14, and a selection signal sel3. In accordance with the selection signal sel3, the second selector 15 selects one of the image D2 and the image D21, and transmits the selected image as an image D3 (an image signal D3) to the keystone correction processing unit 16 and the third selector 17. Note that the selection signal sel3 is a control signal generated by a control unit that controls each functional unit of the projector apparatus 100.

The keystone correction processing unit 16 receives the image D3 transmitted from the second selector 15, the three-dimensional shape data 3D_data transmitted from the three-dimensional shape data storage unit 5, the information P_prj on the projection point of the projection unit 3, and the signal Sig1 transmitted from the switcher 13. When the signal Sig1 is inputted, the keystone correction processing unit 16 performs keystone correction processing on the image D3 based on the three-dimensional shape data 3D_data and the information P_prj on the projection point of the projection unit 3. The keystone correction processing unit 16 then transmits the processed image as an image D31 (an image signal D31) to the third selector 17.

The third selector 17 receives the image D3 transmitted from the second selector 15, the image D31 transmitted from the keystone correction processing unit 16, and the selection signal sel4. The third selector 17 selects one of the image D3 and the image D31 in accordance with the selection signal sel4 and transmits the selected image as an image D4 (an image signal D4) to the fourth selector 18. Note that the selection signal sel4 is a control signal generated by a control unit that controls each functional unit of the projector apparatus 100.

The fourth selector 18 receives the image D4 transmitted from the third selector 17, the test image Img0 transmitted from the test image storage unit 2, and the selection signal sel5. In accordance with the selection signal sel5, the fourth selector 18 selects one of the image D4 and the test image Img0, and transmits the selected image as an image Dout (an image signal Dout) to the projection unit 3. Note that the selection signal sel5 is a control signal generated by a control unit that controls each functional unit of the projector apparatus 100.

The test image storage unit 2 stores a test image, and outputs a test image to the projected image adjustment unit 1 at a predetermined timing in accordance with a request from the projected image adjustment unit 1.

The projection unit 3 includes an optical system for projecting an image. The projection unit 3 receives the image Dout (image signal Dout) transmitted from the fourth selector 18 of the projected image adjustment unit 1 and then projects the received image Dout (image signal Dout) onto the projection target in the three-dimensional space.

The three-dimensional shape measurement unit 4 obtains the three-dimensional measurement data of the projection target in the three-dimensional space and transmits the obtained three-dimensional measurement data of the projection target to the three-dimensional shape data storage unit 5. The three-dimensional shape measurement unit 4 has, for example, a camera, and captures the test image for three-dimensional shape measurement projected from the projection unit 3 to obtain the three-dimensional measurement data of the projection target based on the captured image of the test image for three-dimensional shape measurement.

For example, the three-dimensional shape measurement unit 4 (1) calculates the normal line of the projection plane and determines the positional relationship between the projection unit 3 and the projection surface, or (2) calculates an angle formed by the projection axis of the projection unit 3 (the optical axis of the optical system of the projection unit 3) and the projection plane and determines the positional relationship between the projection unit 3 and the projection plane, thereby obtaining three-dimensional measurement data of the projection target (projection plane).

Alternatively, the three-dimensional shape measurement unit 4 may obtain the three-dimensional measurement data of the projection target by obtaining a range image using the TOF (Time Of Flight) method (e.g., the TOF method using phase differences). In this case, the three-dimensional shape measurement unit 4 includes, for example, a light source for emitting infrared rays and an image sensor for infrared rays, and receives the reflected light of the infrared ray irradiated from the light source with the image sensor and measures a time period from when the infrared ray is irradiated to when the irradiated infrared ray is reflected at the projection target and returns to the light source, thereby obtaining a range image. The three-dimensional shape measurement unit 4 then obtains three-dimensional measurement data of the projection target from the obtained range image.

As further alternative, the three-dimensional shape measurement unit 4 includes a laser light source and a sensor for laser and measures a distance from the laser light source to the projection target based on the flight time of the laser light to obtain three-dimensional measurement data of the projection target. In this case, the three-dimensional shape measurement unit 4 irradiates the laser light to the projection target while sequentially changing the irradiation direction (while scanning the projection target with the laser light), and measure a time period from when the infrared laser light is irradiated to when the irradiated laser light is reflected at the projection target and returns to the laser light source, thereby obtaining three-dimensional measurement data of the projection target.

The three-dimensional shape data storage unit 5 receives the three-dimensional measurement data of the projection target obtained by the three-dimensional shape measurement unit 4, and stores the received three-dimensional measurement data of the input projection target. In accordance with a request from the correction unit 12, the rotation processing unit 14, and/or the keystone correction processing unit 16, the three-dimensional shape data storage unit 5 transmits the three-dimensional measurement data to the correction unit 12, the rotation processing unit 14, and/or the keystone correction processing unit 16.

The first interface 6 is an interface between the projector apparatus 100 and the controller 200. Via the first interface 6, a signal from the controller 200 can be transmitted to the projector apparatus 100.

As shown in FIG. 1, the controller 200 includes a second interface 21, a control unit 22, and a user interface 23.

The second interface 21 is an interface between the controller 200 and the projector apparatus 100.

The control unit 22 is a control unit that controls each functional unit of the controller 200.

The user interface 23 generates a signal in accordance with the user's operation. For example, when the user presses a predetermined button provided on the controller, the user interface 23 generates a signal indicating that the button is pressed.

1.2 Operation of Projection System

The operation of the projection system 1000 with the above-described structure will now be described.

For operations performed in the projection system 1000, (1) three-dimensional shape measurement processing, (2) correction processing, (3) rotation processing, and (4) keystone correction processing will now be described separately.

Figure 3:
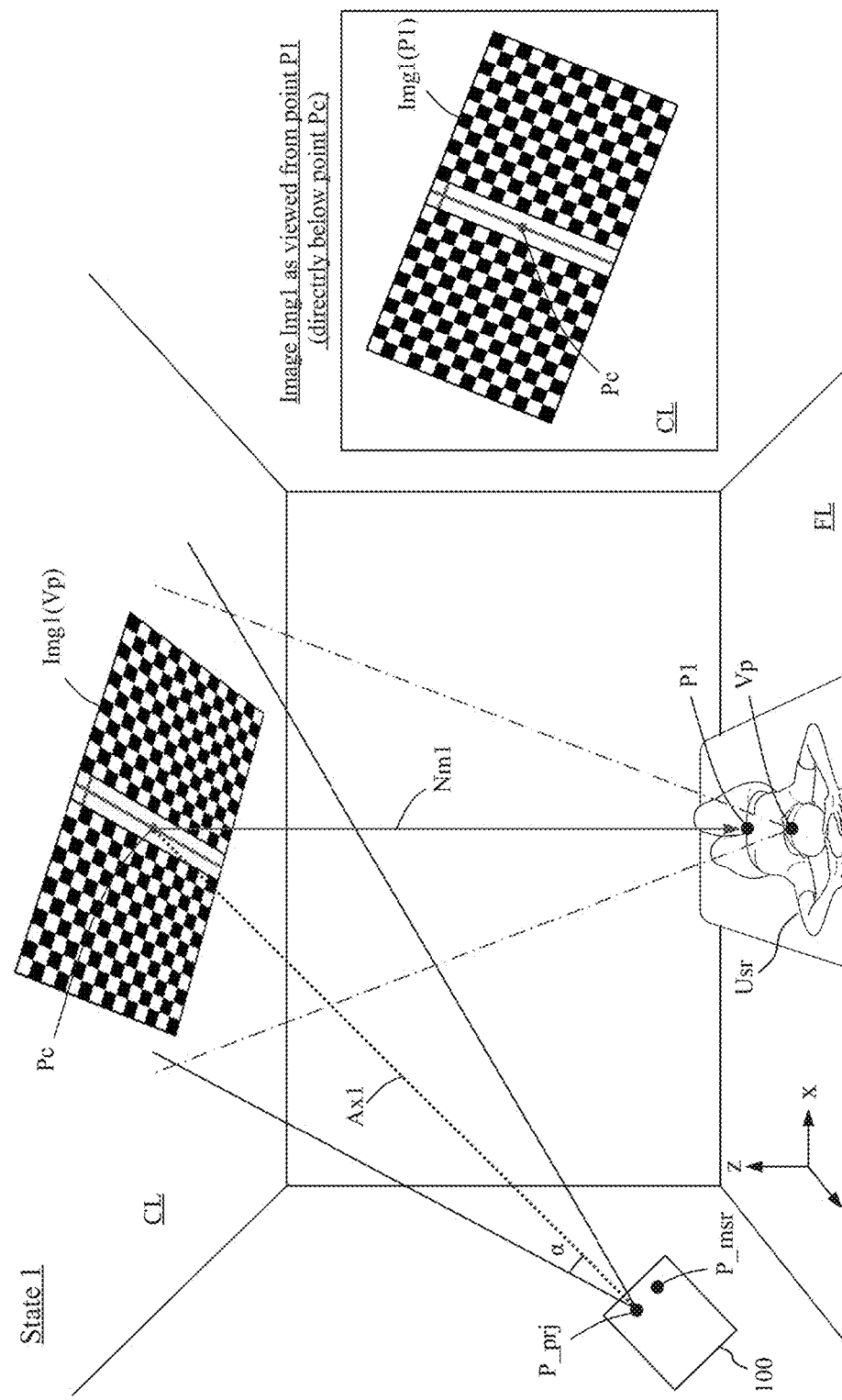
FIG. 3 is a diagram schematically showing a three-dimensional space including a ceiling CL (horizontal ceiling CL) to be projected.

For ease of explanation, a case in which the projection system 1000 operates assuming that a three-dimensional space shown in FIG. 3 is set as a projection target will be described.

FIG. 3 is a diagram schematically showing a three-dimensional space including a ceiling CL (horizontal ceiling CL) to be projected, the projector apparatus 100, and a user Usr on the floor FL. In the three-dimensional space shown in FIG. 3, the ceiling CL (the horizontal ceiling CL) is a plane and is parallel to the floor FL which is a plane. In FIG. 3, the projection point of the projection unit 3 of the projector apparatus 100 is indicated as a point P_prj, and the measurement point of the three-dimensional shape measurement unit 4 of the projector apparatus 100 is indicated as a point P_msr. In FIG. 3, the intersection of the optical axis (projection axis) Ax1 of the optical system of the projection unit 3 and the horizontal ceiling CL (plane CL) is set as a point Pc, and the user's viewpoint position (the center point of both eyes of the user) is indicated as a point Vp. In FIG. 3, the intersection of a normal line Nm1, which passes through the point Pc, of the horizontal ceiling plane CL and a plane that is parallel to the floor plane FL and includes the point Vp is indicated as a point P1.

In FIG. 3, the distance between the position of the left eye of the user Usr and the point Pc equals the distance between the position of the right eye of the user Usr and the point Pc.

Note that the x-axis, the y-axis, and the z-axis are set as shown in FIG. 3.

1.2.1 Three-Dimensional Shape Measurement Processing

First, the three-dimensional shape measurement process will be described.

A case will now be described in which in the projection system 1000, the three-dimensional shape measurement unit 4 includes a camera, captures a test image for three-dimensional shape measurement projected from the projection unit 3, and obtains three-dimensional measurement data of the projection target based on the captured image of the test image for three-dimensional shape measurement.

The test image Img0 for three-dimensional shape measurement is transmitted from the test image storage unit 2 to the fourth selector 18 of the projected image adjustment unit 1. The control unit generates a selection signal sel5 for selecting the terminal 0 shown in FIG. 2 of the fourth selector 18, and transmits the selection signal to the fourth selector 18. This causes the test image Img0 for three-dimensional shape measurement to be transmitted from the fourth selector 18 to the projection unit 3 as the image signal Dout.

The projection unit 3 (A) sets the projection axis (the optical axis of the optical system of the projection unit 3) to the axis Ax1 shown in FIG. 3, (B) sets the angle of view to an angel of a shown in FIG. 3, (C) sets a projection point to the point P_prj shown in FIG. 3, and then projects the test image Img0 for three-dimensional shape measurement onto the horizontal ceiling CL, which is the projection target.

The three-dimensional shape measurement unit 4 captures the test image Img0 for three-dimensional shape measurement projected by the projection unit 3 using a camera for three-dimensional shape measurement whose image capturing point is at the point P_msr. The three-dimensional shape measurement unit 4 compares the captured image with the test image Img0 for three-dimensional shape measurement to obtain three-dimensional measurement data of the projection target.

In the projection system 1000, the coordinates, in the three-dimensional space, of the projection point P_prj are known, the coordinates, in the three-dimensional space, of the imaging point P_msr of the three-dimensional shape measurement unit 4 are known, and the test image Img0 for three-dimensional shape measurement to be projected is also known; therefore, the coordinates, in the three-dimensional space, of the projection target can be calculated from the image captured at the image capturing point P_msr. In other words, examining which pixel in the captured test image Img0 for three-dimensional shape measurement corresponds to which pixel in the image captured at the image capturing point P_msr allows for determining the position, in the three-dimensional space, corresponding to each pixel (the position, in the three-dimensional space, at which light corresponding to each pixel is reflected). Thus, specifying the three-dimensional spatial position corresponding to each pixel allows for calculating the coordinates, in the three-dimensional space, of the projection target.

Note that the test image Img0 for three-dimensional shape measurement may be, for example, an image formed by a sine wave signal with a predetermined cycle. In this case, for example, a plurality of images obtained by changing the cycle and phase of a sinusoidal signal at a predetermined timing may be projected from the projection unit 3 onto the projection target, and the three-dimensional shape measurement unit 4 may obtain the three-dimensional shape data of the projection target based on the plurality of projected images.

The three-dimensional shape data of the projection target obtained by the three-dimensional shape measurement unit 4 through the above processing is transmitted from the three-dimensional shape measurement unit 4 to the three-dimensional shape data storage unit 5 and then is stored in the three-dimensional shape data storage unit 5.

1.2.2 Correction Processing

Next, correction processing will be described.

The test image Img1 is transmitted from the test image storage unit 2 to the first selector 11. The control unit then generates the selection signal sel1 for selecting the terminal 0 shown in FIG. 2 of the first selector 11 and transmits it to the first selector 11. This causes the test image Img1 to be transmitted from the first selector 11 to the correction unit 12 as the image signal D1.

Figure 4:
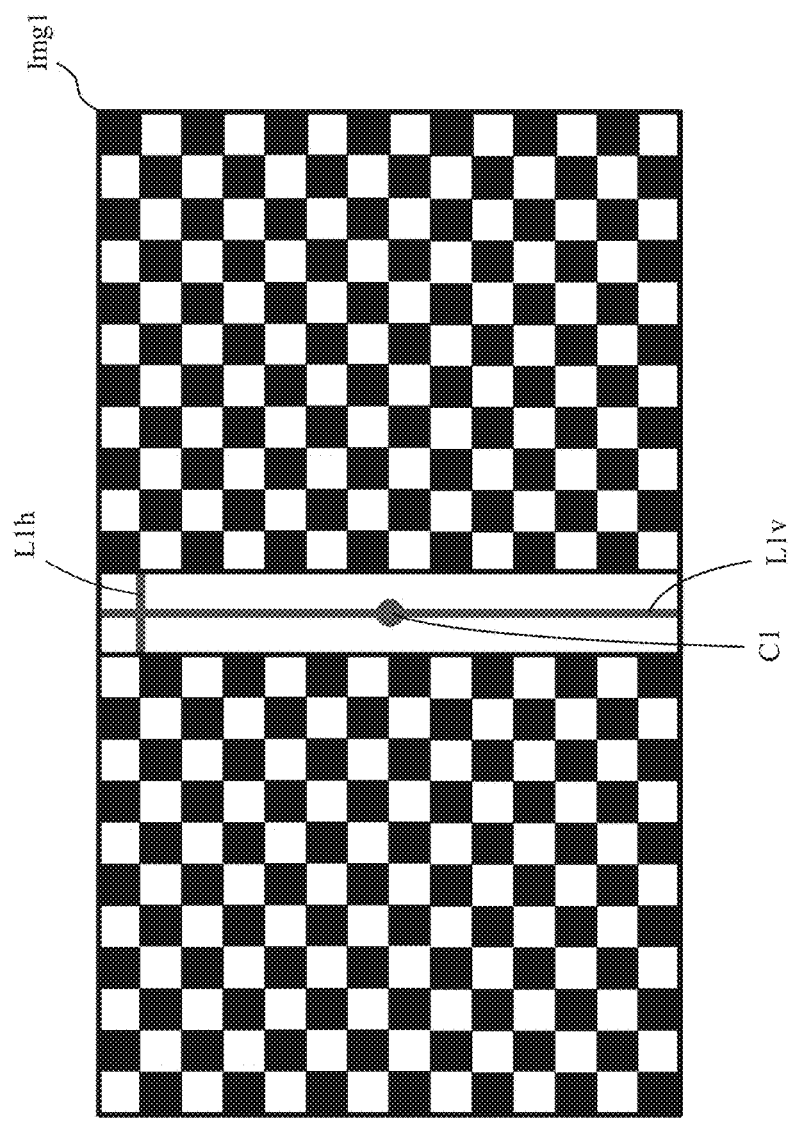
FIG. 4 shows an example of a test image Img1.

FIG. 4 shows an example of the test image Img1. As shown in FIG. 4, the test image1 is an image in which a first lattice pattern which is a square pattern of a white background and a second lattice pattern which is a square pattern of a black background are alternately arranged in the horizontal and vertical directions in the image. As shown in FIG. 4, the test image Img1 has a center line L1$v$ at the center of the image, a circular dot C1 at the center point of the image Img1, and a line L1$h$ in the upper portion of the image Img1, which extends toward the horizontal direction (lateral direction).

In the test image Img1 shown in FIG. 4, the portion where the intersection of the line L1$v$ and the line L1$h$ exists is the upper portion of the image. In the projection system 1000, it is necessary to let the user recognize the upper side of the image of the test image Img1; thus, it is preferable that an image, such as the test image Img1 shown in FIG. 4, for which the user easily recognizes the upper side of the image is employed as the test image used for the projection system 1000. Note that the test image Img1 shown in FIG. 4 is an example and may be another image that the user can easily recognize the upper side of the image.

For example, as the test image, an image is employed in which a first lattice pattern which is a square pattern of a white background and a second lattice pattern which is a square pattern of a black background are alternately arranged, over the whole image area, in the horizontal and vertical directions in the image and a specific pattern indicating the upper portion of the image is superimposed at a predetermined position of the image.

For ease of explanation, a case in which the test image Img1 shown in FIG. 4 is used as the test image will be described.

The correction unit 12 reads the three-dimensional shape data 3D_data from the three-dimensional shape data storage unit 5 to obtain three-dimensional coordinates data of the horizontal ceiling plane CL, which is the projection target. The correction unit 12 then performs correction processing on the image D1 such that the image is in a state without distortion as viewed from the point P1, which is a point directly below the intersection Pc of the projection axis Ax1 and the ceiling plane CL. The correction unit 12 then transmits the image after the correction processing to the second selector 15 as the image D2.

The control unit generates the selection signal sel3 for selecting the terminal 0 shown in FIG. 2 of the second selector 15, and transmits it to the second selector 15. This causes the image D2 to be transmitted from the second selector 15 to the third selector 17 as the image signal D3.

The control unit generates the selection signal sel4 for selecting the terminal 0 shown in FIG. 2 of the third selector 17, and transmits it to the third selector 17. This causes the image D3 to be transmitted from the third selector 17 to the fourth selector 18 as the image signal D4.

The control unit generates the selection signal sel5 for selecting the terminal 1 shown in FIG. 2 of the fourth selector 18, and transmits it to the fourth selector 18. This causes the image D4 to be transmitted from the fourth selector 18 to the projection unit 3 as the image signal D4.

The projection unit 3 projects the image Dout from the fourth selector 18 onto the horizontal ceiling plane CL by the projection axis Ax1 shown in FIG. 3. This state is referred to as "State 1".

Figure 5:
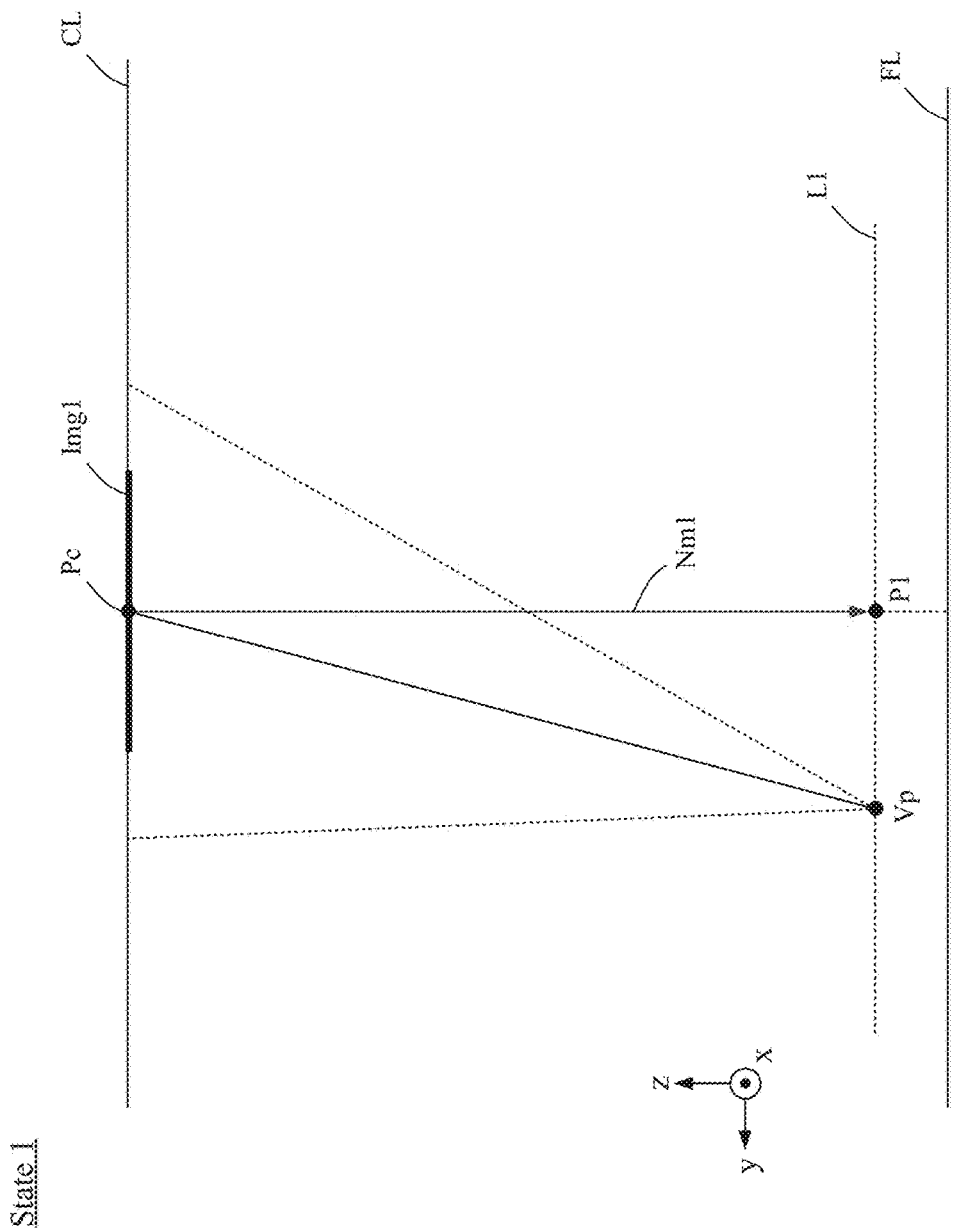
FIG. 5 is a view of a horizontal ceiling plane CL, a floor FL, a viewpoint Vp of a user Usr, a point Pc, and a point P1 in State 1 as viewed from the x-axis positive direction toward the negative x-axis direction (a plan view in the y-z plane).

FIG. 5 is a view of the horizontal ceiling plane CL, the floor FL, the viewpoint Vp of the user Usr, the point Pc, which is the intersection of the optical axis (projection axis) of the optical system of the projection unit 3 and the horizontal ceiling (plane) CL, and the point P1, which is the intersection of the normal line Nm1, which passes through the point Pc, of the horizontal ceiling plane CL and a plane that is parallel to the floor plane FL and includes the point Vp, in State 1 as viewed from the x-axis positive direction toward the negative x-axis direction (a plan view in the y-z plane). Note that in FIG. 5, L1 represents a plane that is parallel to the floor FL and includes the viewpoint Vp.

In FIG. 3, the test image Img1 viewed from the viewpoint Vp in State 1 is shown as the image Img1(Vp). Further, in FIG. 3, the test image Img1 as viewed from the point P1 (the point directly below the point Pc) is shown as the image Img1 (P1).

As can be seen from FIG. 3, in State 1, geometric distortion occurs in the image Img1(Vp) viewed from the viewpoint Vp of the user Usr, whereas no geometric distortion occurs in the test image Img1(P1) viewed from the point P1 (the point directly below the point Pc).

In the projection system 1000, after the correction processing is performed as described above, the rotation processing is performed.

1.2.3 Rotation Processing

Next, the rotation processing will be described.

Figure 6:
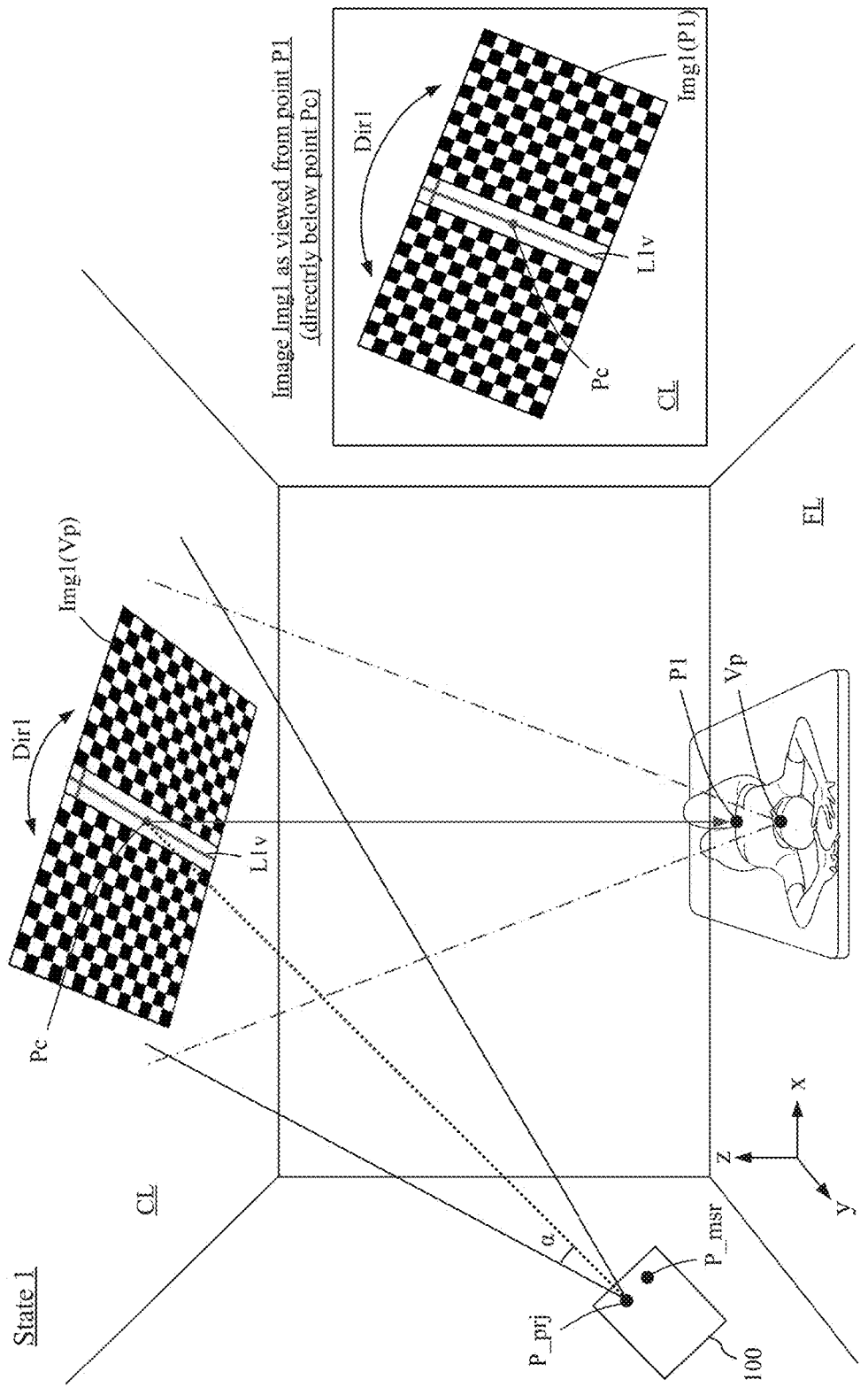
FIG. 6 is a diagram schematically showing the three-dimensional space in State 1.

FIG. 6 is a diagram schematically showing the three-dimensional space in State 1 and for describing the rotation processing.

In State 1 shown in FIG. 6, the user operates the controller 200 to rotate the image Img1 projected on the horizontal ceiling plane CL in the direction indicated by the arrow Dir1 in FIG. 6 around the point Pc such that the center line L1$v$ of the image Img1 appears to the user to be a straight vertical line as viewed from the user's viewpoint Vp. More specifically, the user operates the controller 200 to rotate the image Img1 projected on the horizontal ceiling plane CL in the direction indicated by the arrow Dir1 in FIG. 6 around the point Pc such that the center line L1$v$ of the image Img1 is included in a plane that includes the points Pc and P1 and the viewpoint Vp. Note that the user rotates the image Img1 such that the upper portion of the image Img1 (the portion where the line L1$v$ intersects with the line L1$h$ in the image Img1) becomes the upper side as viewed from the user.

This rotation processing will be described in detail.

Similarly to State 1, the test image Img1 is transmitted from the test image storage unit 2 to the first selector 11. The control unit then generates a selection signal sel1 for selecting the terminal 0 shown in FIG. 2 of the first selector 11, and transmits it to the first selector 11. This causes the test image Img1 to be transmitted from the first selector 11 to the correction unit 12 as the image signal D1.

The correction unit 12 performs the same correction processing on the image D1 as the processing performed in State 1. The correction unit 12 then transmits the image after the correction processing as the image D2 to the rotation processing unit 14.

The user operates the controller 200 to cause the projector apparatus 100 to perform the rotation processing. For example, the controller 200 has two buttons for performing rotation processing, and pressing the first button (one button) of the controller 200 once causes processing for rotating, by a predetermined angle, the test image Img1 counterclockwise in the direction indicated by the direction Dir in FIG. 6 to be performed, whereas pressing the second button (the other button) of the controller 200 once causes processing for rotating, by a predetermined angle, the test image Img1 clockwise in the direction indicated by the direction Dir in FIG. 6 to be performed.

A case where the first button is pressed will now be described.

When the first button of the controller 200 is pressed once, the user interface 23 generates a signal indicating that the first button has been pressed once. Based on the signal generated by the user interface 23, the control unit 22 of the controller 200 transmits a signal indicating that the first button has been pressed once to the first interface of the projector apparatus 100 via the second interface 21.

Note that the user can operate the controller 200 in the user's hand, and the controller 200 transmits and/or receives signals to and/or from the projector apparatus 100 by wireless communication.

For example, in the state shown in FIG. 6, the user holds the controller 200 in hand and operates the controller 200, while viewing the image Img1 projected on the horizontal ceiling plane CL, to rotate the image Img1 projected onto the horizontal ceiling plane CL.

The first interface 6 of the projector apparatus 100 receives the signal transmitted from the second interface 21 of the controller 200 and transmits the received signal to the switcher 13 as the signal Sig1.

The switcher 13 selects the terminal 1 shown in FIG. 2 in accordance with the selection signal sel2 generated by the control unit, and transmits the signal Sig1 to the rotation processing unit 14.

The rotation processing unit 14 performs rotation processing on the image D2 transmitted from the correction unit 12 based on the signal Sig1, the three-dimensional shape data 3D_data, and the information P_prj on the projection point of the projection unit 3.

More specifically, the rotation processing unit 14 performs rotation processing (conversion processing) on the image D2 such that the image Img1 is rotated counterclockwise in the direction indicated by the arrow Dir1 in FIG. 6 around the point Pc by an angle determined by the signal Sig1 as viewed from the point P1 to the horizontal ceiling plane CL. The rotation processing unit 14 then transmits the processed image as the image D21 (image signal D21) to the second selector 15.

The second selector 15 selects the terminal 1 shown in FIG. 2 in accordance with the selection signal sel3 generated by the control unit, and transmits the image D21 as the image D3 to the third selector 17.

The third selector 17 selects the terminal 0 shown in FIG. 2 in accordance with the selection signal sel4 generated by the control unit, and transmits the image D3 (=image D21) as the image D4 to the fourth selector 18.

The fourth selector 18 selects the terminal 1 shown in FIG. 2 in accordance with the selection signal sel5 generated by the control unit, and transmits the image D4 (=image D21) as the image Dout to the projection unit 3.

The projection unit 3 projects the image Dout (=image D21) from the fourth selector 18 onto the horizontal ceiling plane CL by the projection axis Ax1 shown in FIG. 3. This causes the image Img1 to be rotated around the point Pc by a predetermined angle in the direction Dir as viewed from the point P1 to the horizontal ceiling plane CL.

Repeating the above operation causes the center line L1v of the image Img1 to appear to the user to be a straight vertical line as viewed from the user's viewpoint Vp. This state, in which the center line L1v of the image Img1 is included in the plane including the points Pc, P1, and the viewpoint Vp, is referred to as "State 2".

Figure 7:
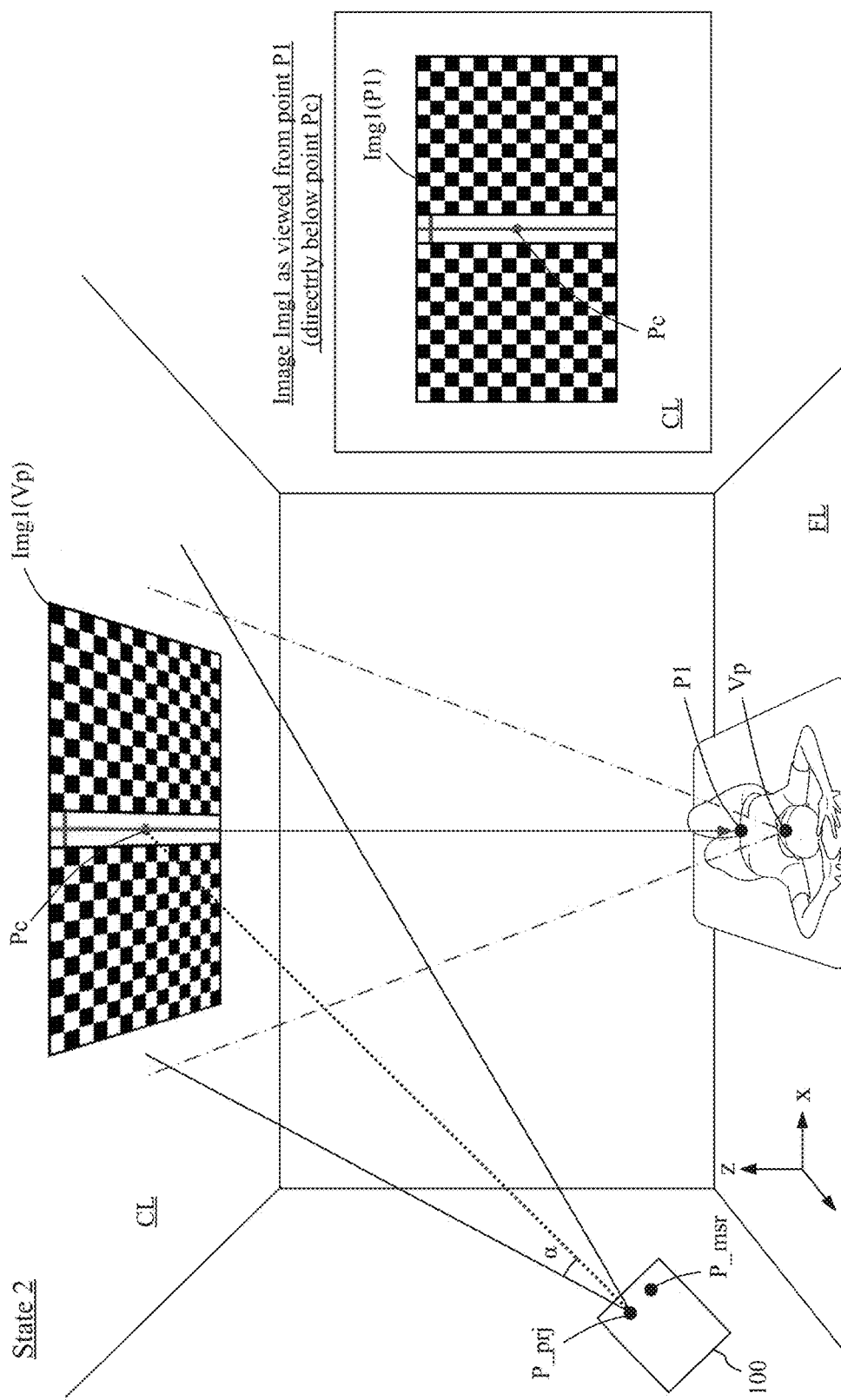
FIG. 7 is a diagram schematically showing the three-dimensional space in State 2.

FIG. 7 is a diagram schematically showing the three-dimensional space in State 2. As shown in FIG. 7, in State 2, the test image Img1 viewed from the viewpoint Vp of the user is shown as an image Img1(Vp). As shown in FIG. 7, in State 2, the test image Img1 viewed from the point P1 is shown as an image Img1 (P1).

As can be seen from FIG. 7, in State 2, the test image Img1 viewed from the the user's viewpoint Vp appears to be a trapezoid-shaped image (image Img1(Vp1)).

After the projection state of the projection system 1000 becomes State 2 by performing the rotation processing as described above in the projection system 1000, keystone correction processing is performed.

1.2.4 Keystone Correction Processing

Next, keystone correction processing will be described.

Figure 8:
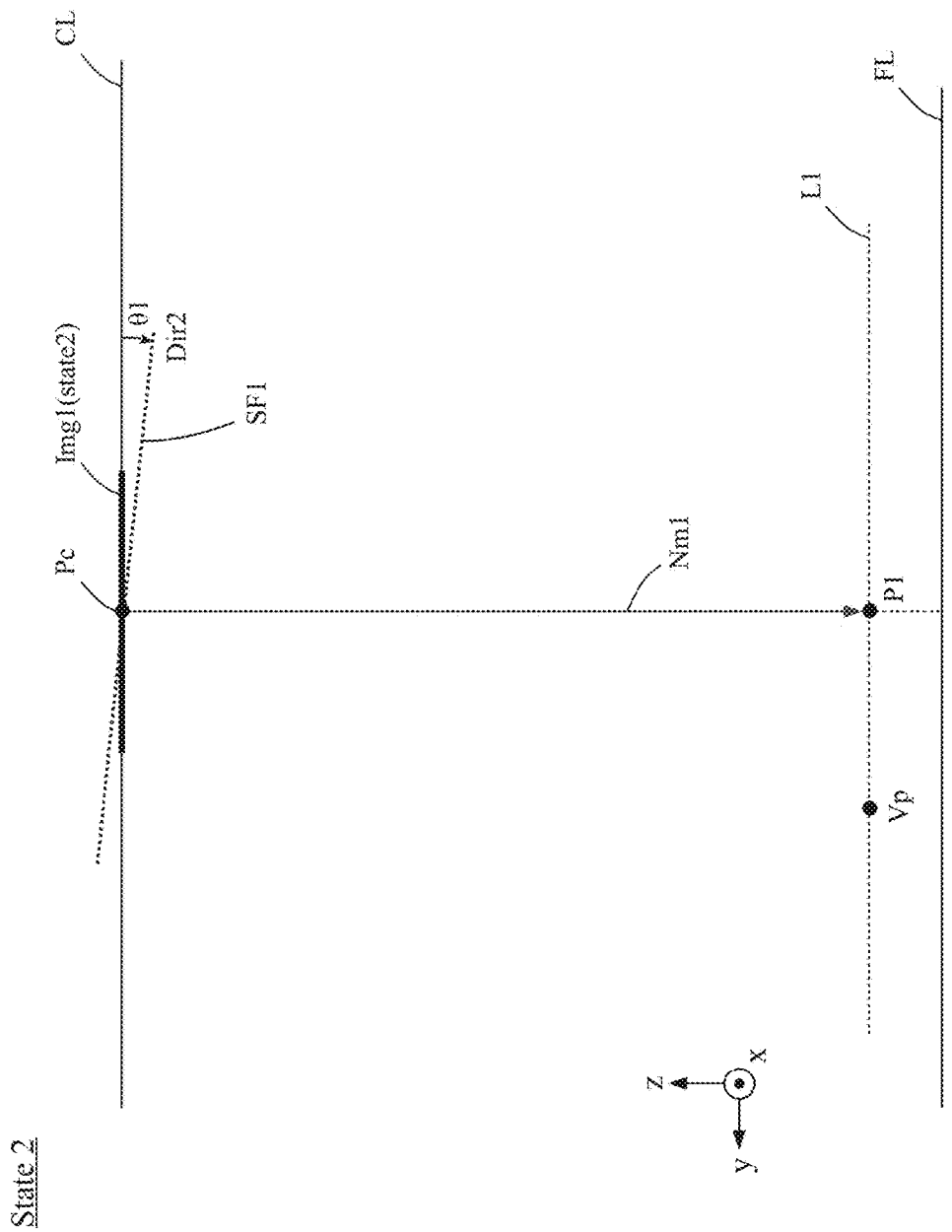
FIG. 8 is a diagram describing keystone correction processing.

FIG. 8 is a diagram describing the keystone correction processing. FIG. 8 is a view of the horizontal ceiling plane CL, the floor FL, the viewpoint Vp of the user Usr, the point Pc, which is the intersection of the optical axis (projection axis) of the optical system of the projection unit 3 and the horizontal ceiling (plane) CL, and the point P1, which is the intersection of the normal line Nm1, which passes through the point Pc, of the horizontal ceiling plane CL and a plane that is parallel to the floor plane FL and includes the point Vp, in State 2 as viewed from the x-axis positive direction toward the negative x-axis direction (a plan view in the y-z plane). Note that in FIG. 8, L1 represents a plane that is parallel to the floor FL and includes the viewpoint Vp.

FIGS. 9 to 13 are diagrams describing the keystone correction processing. Similarly to FIG. 8, FIGS. 9 to 13 is a view of the horizontal ceiling plane CL, the floor FL, the viewpoint Vp of the user Usr, the point Pc, and the intersection P1 as viewed from the x-axis positive direction toward the x-axis negative direction (a plan view in the y-z plane).

Figure 14:
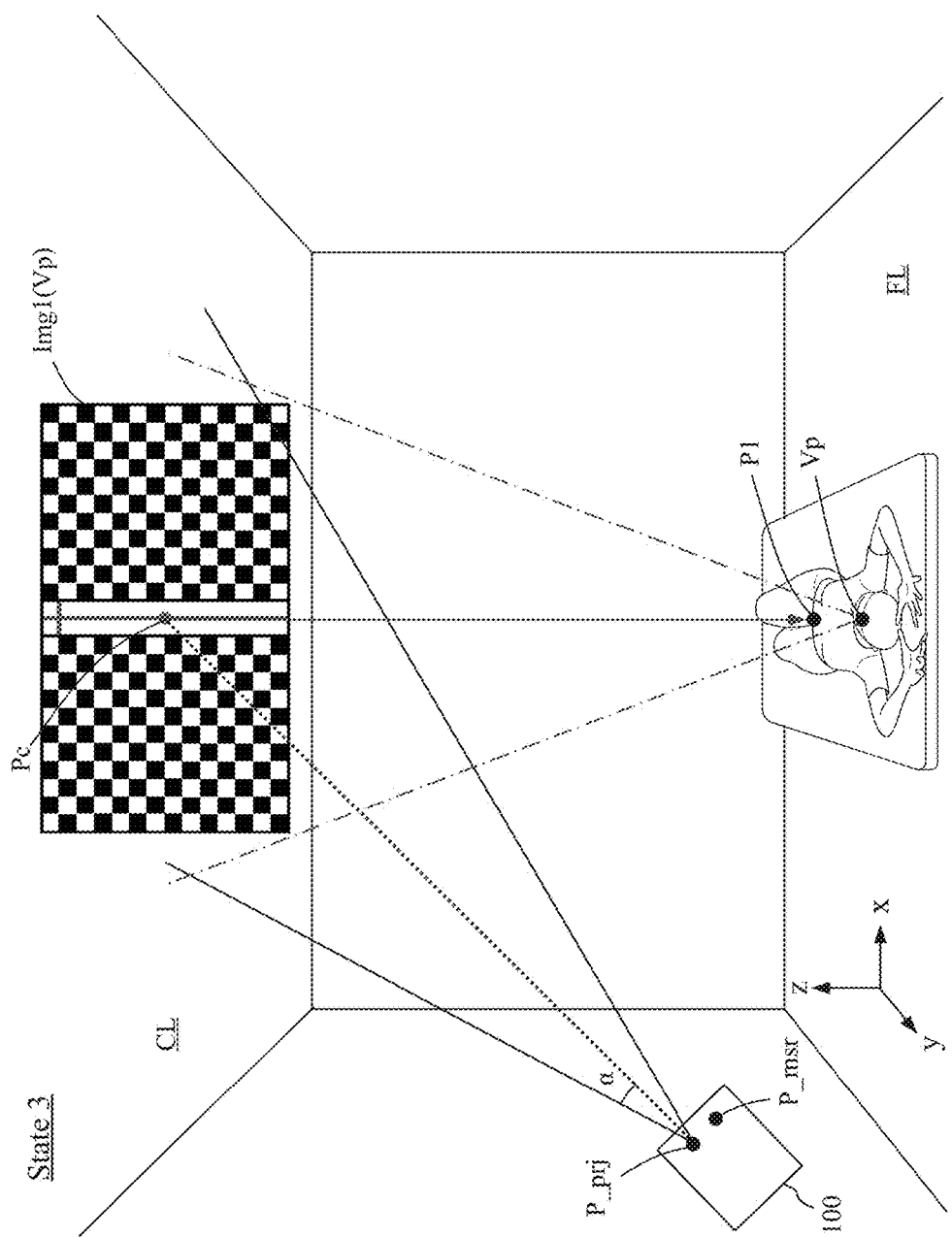
FIG. 14 is a diagram schematically showing the three-dimensional space in State 3.

FIG. 14 is a diagram schematically showing the three-dimensional space in State 3 and for describing the keystone correction processing.

In State 2 shown in FIGS. 7 and 8, the user operates the controller 200 to cause the projector apparatus 100 to perform keystone correction processing on the image Img1 projected on the horizontal ceiling plane CL.

The keystone correction processing is performed, for example, by the following processes (1) and (2).

(1) As shown in FIG. 8, a plane that is obtained by rotating the test image Img1 (the image Img1 in State 2 (this is referred to as an image Img(state2))) projected on the horizontal ceiling plane CL in the direction indicated by Dir2 (clockwise) by a predetermined angle around a rotation axis that passes through the point Pc and is parallel to the X-axis is set as a virtual projection plane (e.g., a virtual projection plane SF1 as shown in FIG. 8).

(2) Image conversion processing (keystone correction processing) is performed such that the image has no geometric distortion as viewed from a point (a point P2 in FIGS. 8 and 9) that passes through the point Pc and is on the normal line of the virtual projection plane set as described above.

This keystone correction processing will be described in detail.

Similarly to the States 1 and 2, the test image Img1 is transmitted from the test image storage unit 2 to the first selector 11. The control unit then generates a selection signal sel1 for selecting the terminal 0 shown in FIG. 2 of the first selector 11, and transmits it to the first selector 11. This causes the test image Img1 to be transmitted from the first selector 11 to the correction unit 12 as the image signal D1.

The correction unit 12 performs the same correction processing on the image D1 as the processing performed in States 1 and 2. The correction unit 12 then transmits the image after the correction processing as the image D2 to the rotation processing unit 14.

The rotation processing unit 14 performs the same rotation processing as the processing performed in State 2. The rotation processing unit 14 then transmits the image D21 after performing the rotation processing on the image D2 to the second selector 15.

The second selector 15 selects the terminal 1 shown in FIG. 2 in accordance with the selection signal sel3 generated by the control unit, and transmits the image D21 as the image D3 to the keystone correction processing unit 16.

The user operates the controller 200 to cause the projector apparatus 100 to perform keystone correction processing. For example, the controller 200 has two buttons for performing the keystone correction processing, and pressing the buttons causes the projector apparatus 100 to perform the processes (1) and (2) below, for example.

Figure 9:
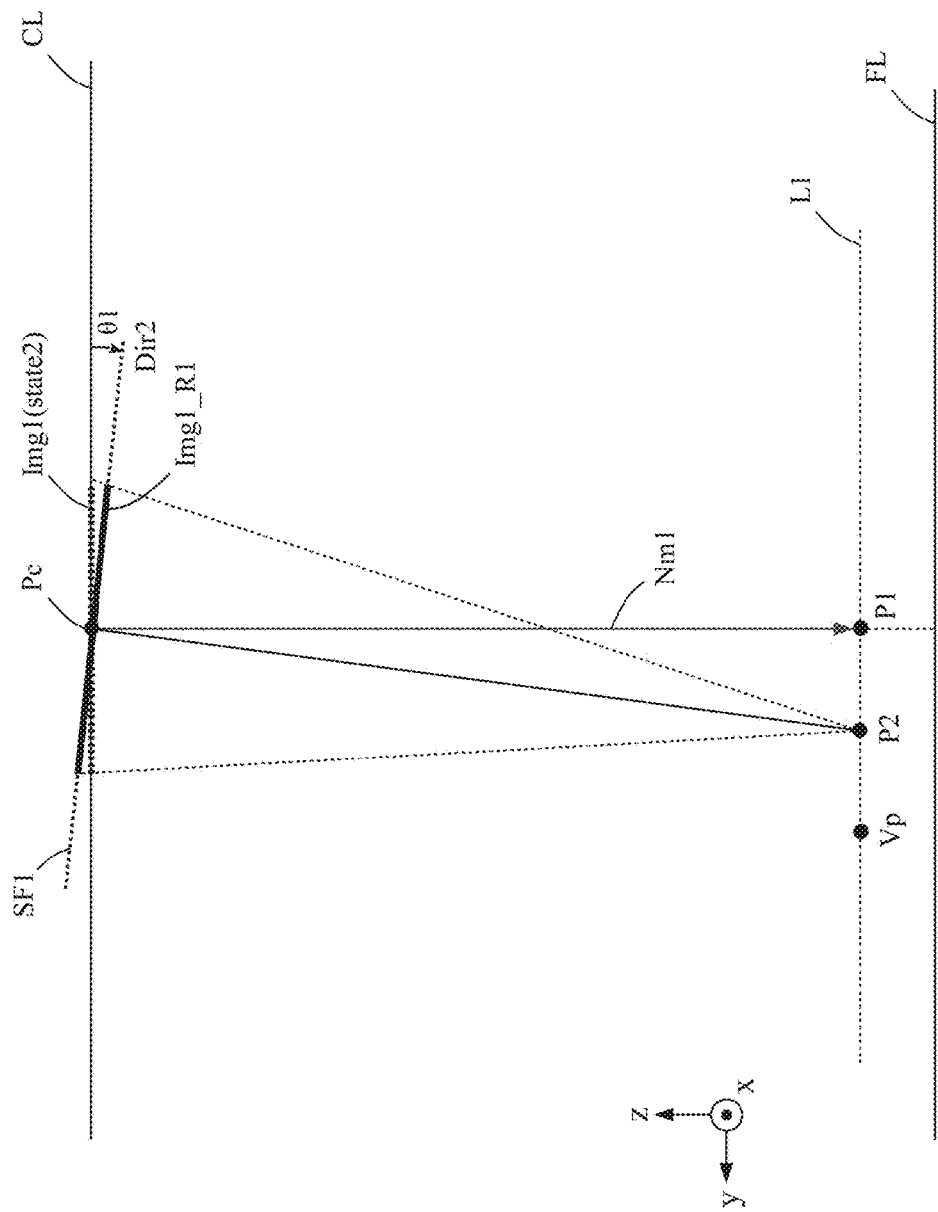
FIG. 9 is a diagram describing keystone correction processing.

(1) When the first button (one button) of the controller 200 is pressed once, a virtual plane is set to a plane obtained by rotating the horizontal ceiling plane CL in the direction indicated by Dir2 (clockwise) in FIG. 9 by a predetermined angle, and the image conversion processing (keystone correction processing) is performed by the projector apparatus 100 such that the image has no geometric distortion as viewed from a point that passes through the point Pc and is on the normal line of the virtual plane.

(2) When the second button (the other button) of the controller 200 is pressed once, a virtual plane is set to a plane obtained by rotating the horizontal ceiling plane CL in the direction opposed to the direction indicated by Dir2 (counterclockwise) in FIG. 9 by a predetermined angle, and the image conversion processing (keystone correction processing) is performed by the projector apparatus 100 such that the image has no geometric distortion as viewed from a point that passes through the point Pc and is on the normal line of the virtual plane.

A case where the first button is pressed will be now described.

When the first button of the controller 200 is pressed once, the user interface 23 generates a signal indicating that the first button has been pressed once. Based on the signal generated by the user interface 23, the control unit 22 of the controller 200 transmits a signal indicating that the first button has been pressed once to the first interface 6 of the projector apparatus 100 via the second interface 21.

Note that the user can operate the controller 200 in the user's hand, and the controller 200 transmits and/or receives signals to and/or from the projector apparatus 100 by wireless communication.

For example, in the state shown in FIG. 7, the user holds the controller 200 in hand and operates the controller 200, while viewing the image Img1 projected on the horizontal ceiling plane CL, to perform processing (keystone correction processing) for reducing geometric distortion in the image Img1 projected on the horizontal ceiling plane CL.

The first interface 6 of the projector apparatus 100 receives the signal transmitted from the second interface 21 of the controller 200 and transmits the received signal to the switcher 13 as the signal Sig1.

The switcher 13 selects the terminal 0 shown in FIG. 2 in accordance with the selection signal sel2 generated by the control unit, and transmits the signal Sig1 to the keystone correction processing unit 16.

The keystone correction processing unit 16 performs on the image D3 transmitted from the second selector 15 based on the signal Sig1, the three-dimensional shape data 3D_data, and the information P_prj on the projection point of the projection unit 3.

More specifically, the keystone correction processing unit 16 determines the rotation angle θ1 from the signal Sig1 when the first button (one button) of the controller 200 is pressed once. The keystone correction processing unit 16 then sets the virtual plane SF1 to a plane obtained by rotating the horizontal ceiling plane CL in the direction indicated by Dir2 in FIG. 9 (clockwise) by a predetermined angle, and performs image conversion processing (keystone correction processing) on the image D3 such that the image projected on the horizontal ceiling plane CL has no geometric distortion as viewed from the point P2 that passes through the point Pc and is on the normal line of the virtual plane. The keystone correction processing unit 16 then transmits the image after keystone correction processing as the image D31 to the third selector 17.

The third selector 17 selects the terminal 1 shown in FIG. 2 in accordance with the selection signal sel4 generated by the control unit, and transmits the image D31 as the image D4 to the fourth selector 18.

The fourth selector 18 selects the terminal 1 shown in FIG. 2 in accordance with the selection signal sel5 generated by the control unit, and transmits the image D4 (=image D31) as the image Dout to the projection unit 3.

The projection unit 3 projects the image Dout (=image D31) from the fourth selector 18 onto the horizontal ceiling plane CL by the projection axis Ax1 shown in FIG. 3. This allows the image Img1 to be projected without distortion as viewed from the point p2 to the horizontal ceiling plane CL. The state at this time is shown in FIG. 10

Figure 10:
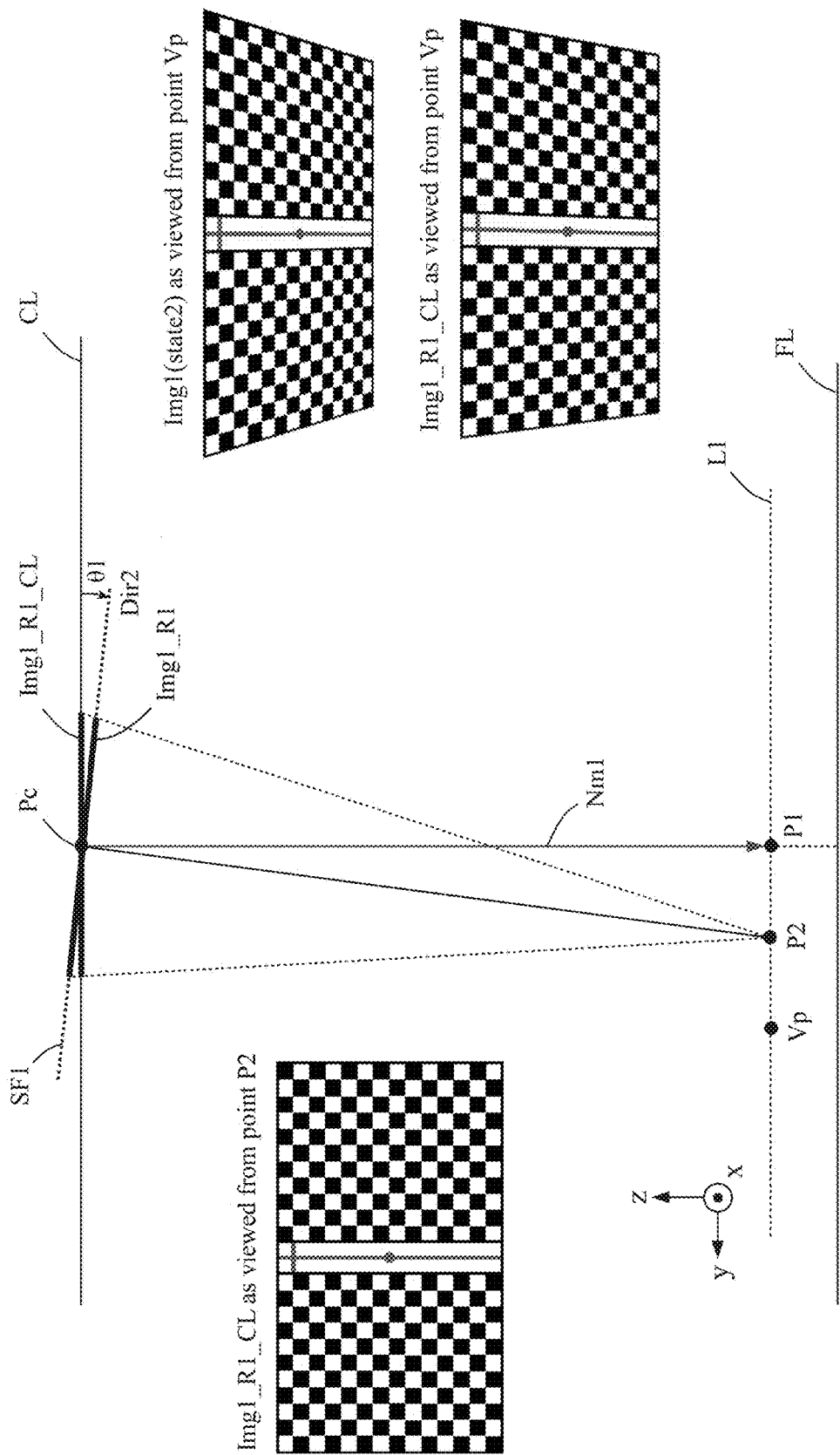
FIG. 10 is a diagram describing keystone correction processing.

The image Img_R1_CL shown in FIG. 10 is an image obtained as described below. The image Img_R1_CL is an image obtained by projecting, from a point (e.g., the point P2) on the normal line of the virtual plane SF1, an image (an image Img_R1 in FIG. 10 (an image Img_R1 on the virtual plane SF1)) obtained by rotating the image Img(state2) on the horizontal ceiling plane CL in State 2 clockwise in the y-z plane (in the direction Dir2) by the angle θ1 around the rotation axis that passes through the point Pc and is parallel to the X-axis.

The image Img1(state2) as viewed from the point Pc to the horizontal ceiling plane CL in State 2 is shown in the upper right portion of FIG. 10. The image Img1_R1_CL as viewed from the point Vp to the horizontal ceiling plane CL in performing the keystone correction processing is shown in the lower right portion of FIG. 10.

Further, the image Img1_R1_CL as viewed from the point P2 to the horizontal ceiling plane CL in performing the keystone correction processing is shown in the left portion of FIG. 10.

It is recognized that geometric distortion included in the image Img1_R1_CL shown in the lower right portion of FIG. 10 is reduced as compared with geometric distortion included in the image Img1(state2) shown in the upper right portion of FIG. 10. Further pressing the first button by the user causes the keystone correction processing to be performed such that the angle θ1 shown in FIG. 10 becomes larger, thereby allowing for further reducing geometric distortion in the image projected on the horizontal ceiling plane CL.

In a case in which the user recognizes that the geometric distortion (trapezoidal distortion) included in the image projected on the horizontal ceiling plane CL becomes large when the user presses the first button, the user presses the second button, which is the other button of the controller 200, to cause the projector apparatus 100 to perform keystone correction processing for reducing geometric distortion (trapezoidal distortion) in the image projected on the horizontal ceiling plane CL.

In a case show in FIG. 10, it is recognized that pressing the first button of the controller 200 has reduced the geometric distortion (trapezoidal distortion) of the image projected on the horizontal ceiling plane CL, and thus the user further presses the first button to cause the projector apparatus 100 to perform the keystone correction processing.

When the user further presses the first button, the same processing as above is performed in the projector apparatus 100. The keystone correction processing unit 16 then performs the keystone correction processing for increasing the rotation angle θ1 shown in FIG. 10.

Figure 11:
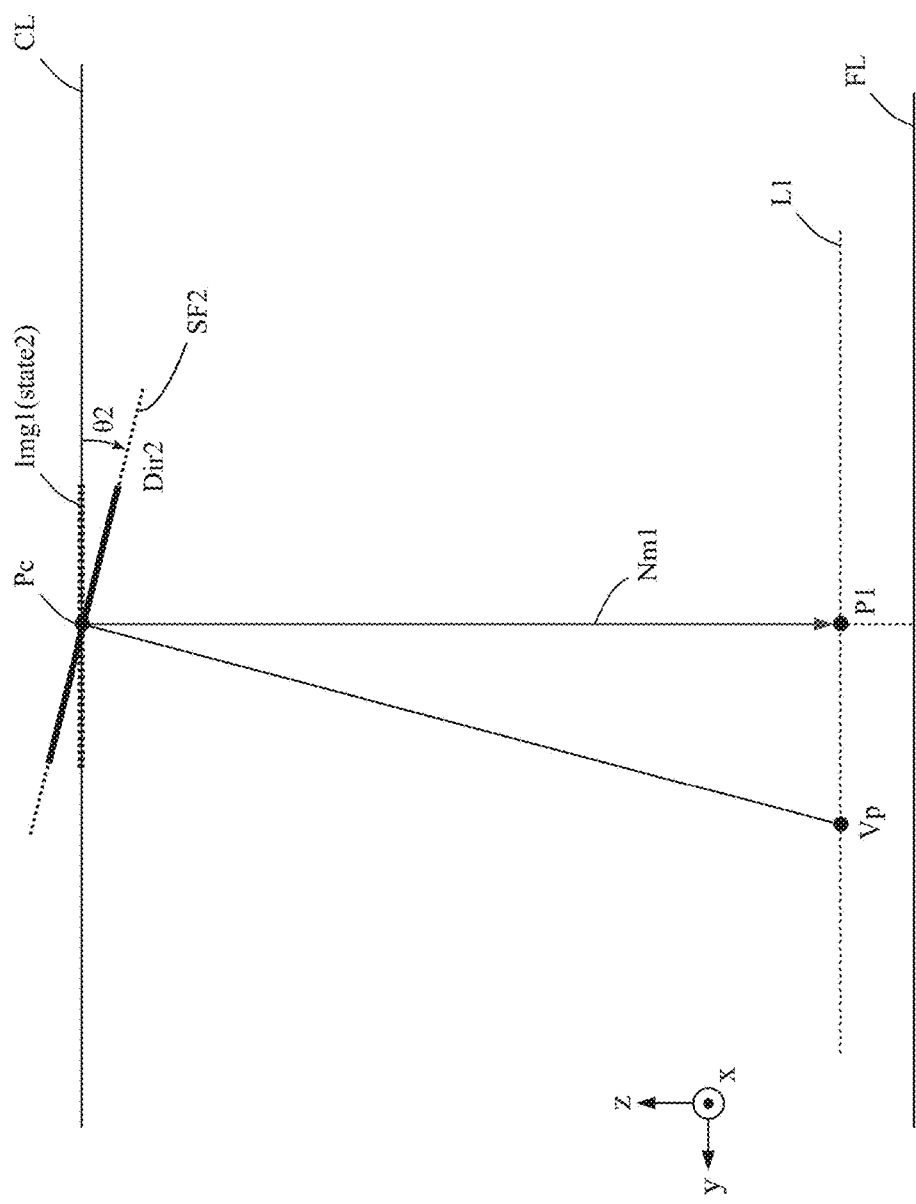
FIG. 11 is a diagram describing keystone correction processing.

It is assumed that when the user further presses the first button, the rotation angle becomes θ2 as shown in FIG. 11, resulting in a state in which the normal line, passing through the point Pc, of the virtual plane SF2 passes through the user's viewpoint Vp, the virtual plane SF being obtained by rotating the horizontal ceiling plane CL clockwise in the y-z plane (in the direction Dir2) by the angle θ2 around the rotation axis that passes through the point Pc and is parallel to the X-axis. Such a case will now be described.

In this case, the keystone correction processing unit 16 determines, from the signal Sig1, the rotation angle θ2 when the first button (one button) of the controller 200 is further pressed. The keystone correction processing unit 16 sets the virtual plane SF2 to a plane obtained by rotating the horizontal ceiling plane CL by the rotation angle θ2 in the direction Dir2 (clockwise direction) shown in FIG. 11, and performs image conversion processing (keystone correction processing) on the image D3 such that the image projected on the horizontal ceiling plane CL has no distortion as viewed from the point Pc, which passes through the point Pc and is on the normal line of the virtual plane SF2, to the horizontal ceiling plane CL. The keystone correction processing unit 16 then transmits the image after keystone correction processing as the image D31 to the third selector 17.

The image D31 generated by the keystone correction processing unit 16 in this way is projected onto the horizontal ceiling plane CL by the projection unit 3. This state is referred to as "State 3".

Thus, the image Img1 is projected as an image without geometric distortion (image with reduced geometric distortion) as viewed from the user's viewpoint Vp to the horizontal ceiling plane CL. The state at this time is shown in FIG. 12.

Figure 12:
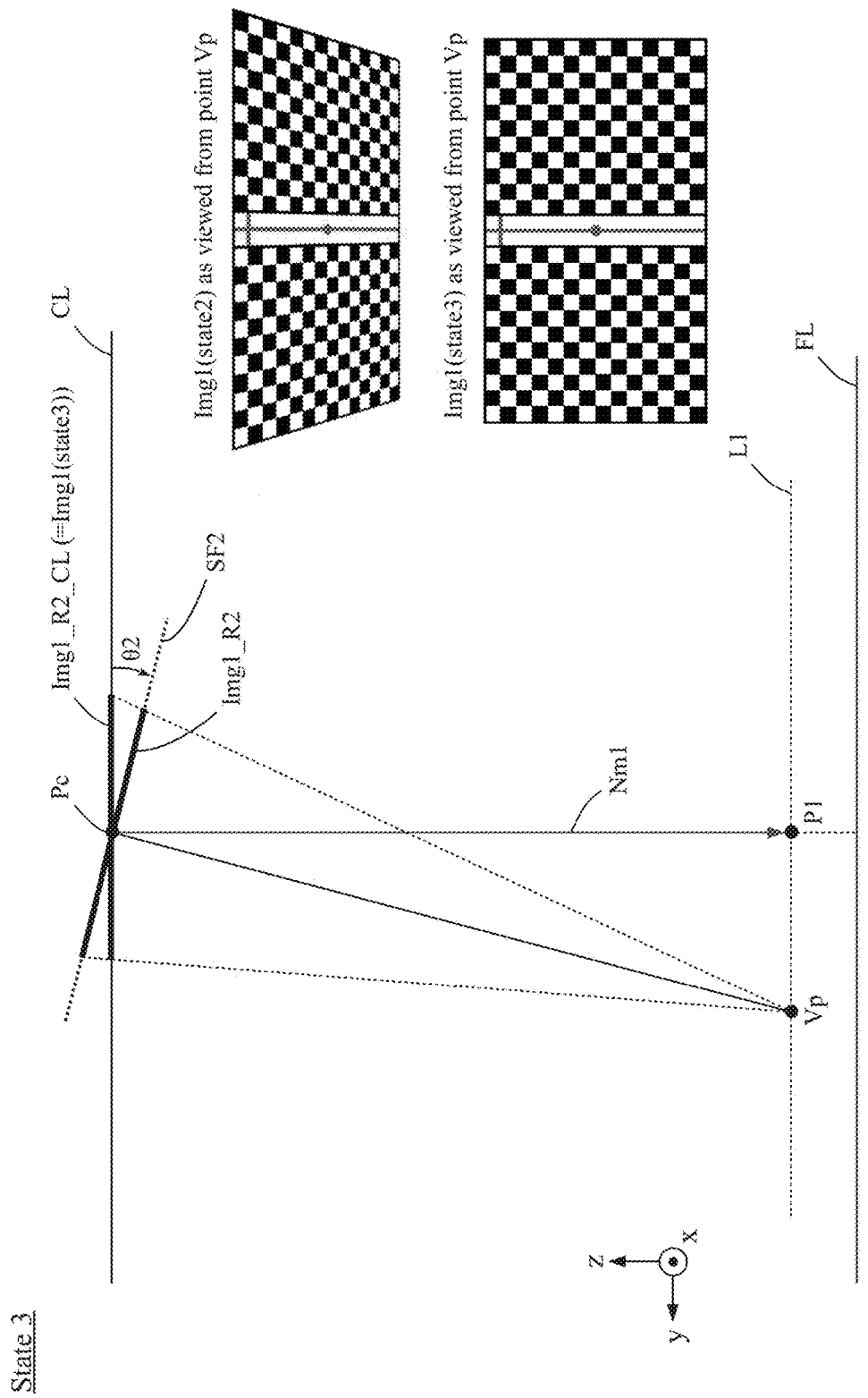
FIG. 12 is a diagram describing keystone correction processing.
Figure 13:
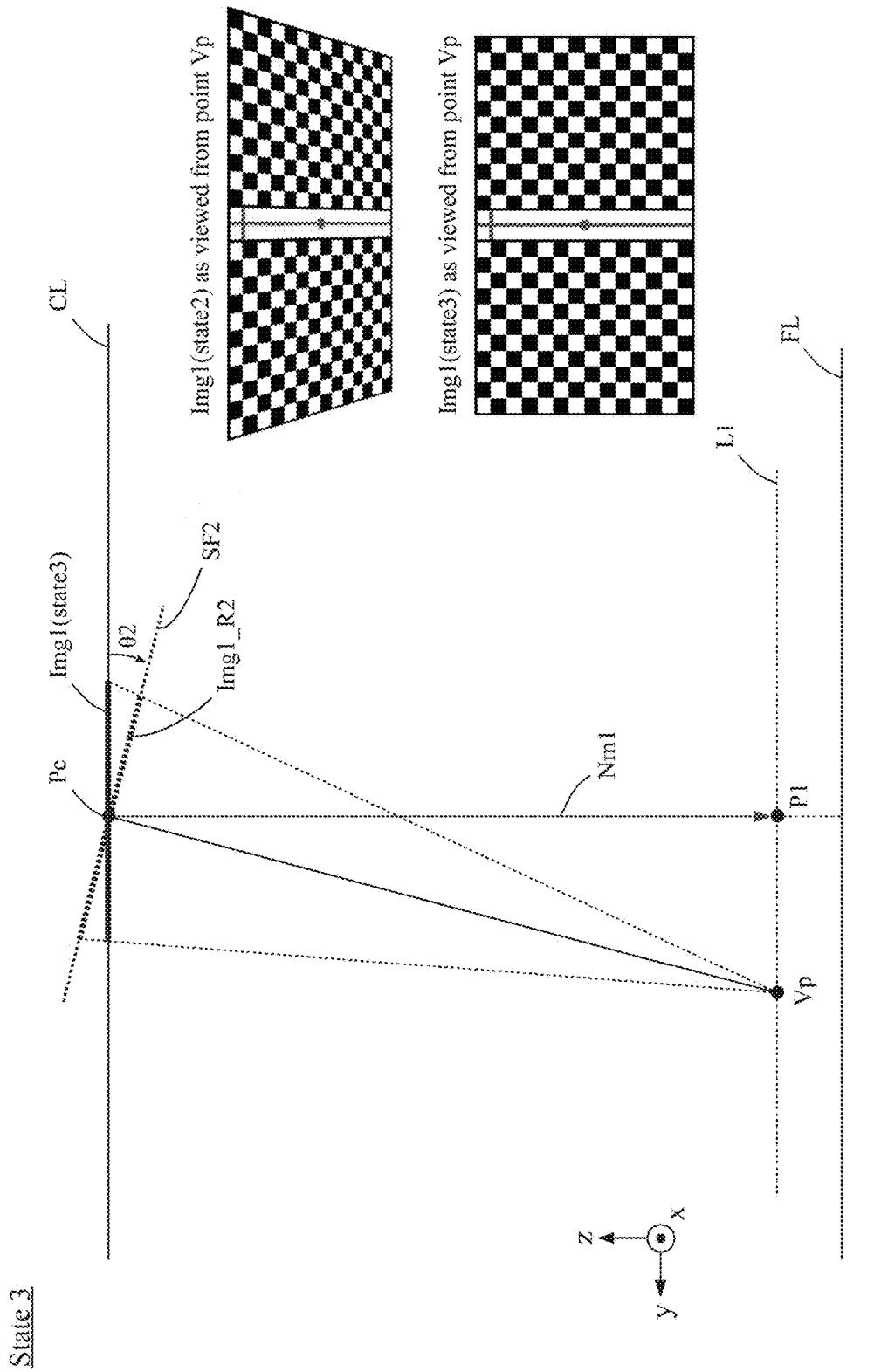
FIG. 13 is a diagram describing keystone correction processing.

The image Img_R2_CL shown in FIG. 12 is an image obtained as described below. The image Img_R2_CL is an image obtained by projecting, from a point (e.g., the viewpoint Vp) on the normal line of the virtual plane SF2, an image (an image Img_R2 in FIG. 12 (an image Img_R2 on the virtual plane SF2)) obtained by rotating the image Img(state2) on the horizontal ceiling plane CL in State 2 clockwise in the y-z plane (in the direction Dir2) by the angle θ2 around the rotation axis that passes through the point Pc and is parallel to the X-axis.

The image Img1(state2) as viewed from the point Vp to the horizontal ceiling plane CL in State 2 is shown in the upper right portion of FIG. 12. The image Img1_R2_CL as viewed from the point Vp to the horizontal ceiling plane CL in performing the above-described keystone correction processing is shown in the lower right portion of FIG. 12; that is, the image Img1(state3) viewed from the point Vp to the horizontal ceiling plane CL in State 3 is shown in the lower right portion of FIG. 12.

It is recognized that geometric distortion (trapezoidal distortion) included in the image Img1(state3) (image Img1_R2_CL) shown in the lower right portion of FIG. 12 disappears (is significantly reduced) as compared with geometric distortion included in the image Img1(state2) shown in the upper right portion of FIG. 12.

The user confirms the state (State 3) in which the geometric distortion included in the image projected on the horizontal ceiling plane CL is sufficiently reduced and then terminates adjustment processing (adjustment processing for reducing geometric distortion in the image) in the projector apparatus 100. For example, the user operates the controller 200 to terminate the adjustment processing (adjustment processing for reducing geometric distortion in the image) in the projector apparatus 100.

The projector apparatus 100 receives from the controller 200 a signal for terminating the adjustment processing (adjustment processing for reducing geometric distortion in the image) in the projector apparatus 100.

When receiving the above-described signal from the controller 200, the projector apparatus 100 maintains a state in which (1) correction processing by the correction unit 12, (2) rotation processing by the rotation processing unit 14, and (3) keystone correction processing by the keystone correction processing unit 16 are performed using the current settings, and then terminates the adjustment processing (the adjustment processing for reducing geometric distortion in the image).

When the projector apparatus 100 is switched to a mode for displaying (projecting) the image signal (or video signal) Din, the first selector 11 selects the terminal 1 and transmits the image signal Din to the correction unit 12.

The projector apparatus 100 causes the terminal 1 of the second selector 15, the terminal 1 of the third selector 17, and the terminal 1 of the fourth selector 18 to be selected.

The correction unit 12, the rotation processing unit 14, and the keystone correction processing unit 16 of the projector apparatus 100 respectively perform the correction processing, the rotation processing, and the keystone correction processing using the settings obtained when the adjustment processing (the adjustment processing for reducing geometric distortion in the image) has been completed.

An image (video) after performing the above processes is projected from the projection unit 3 onto the horizontal ceiling plane CL. This allows the image Din (or the video Din) inputted into the projector apparatus 100 to be projected onto the horizontal ceiling plane CL without geometric distortion (with less geometric distortion) as viewed from the user's viewpoint Vp.

As described above, the projection system 1000 projects a test image, in which the upper portion can be recognized when the image is displayed, onto the horizontal ceiling plane CL, the user operates the controller 200 (1) to causes the projector apparatus 100 to perform processing for rotating the projected image in the horizontal ceiling plane CL, and then (2) to cause the projector apparatus 100 to perform the keystone correction processing on the image projected onto the horizontal ceiling plane CL, thereby allowing for eliminating (reducing) geometric distortion in the image projected onto the horizontal ceiling plane CL.

Thus, the projection system 1000 easily and appropriately eliminates (reduces) geometric distortion of an image projected on a horizontal plane (e.g., a horizontal ceiling) without using a device having a photographing function.

First Modification

Next, a first modification of the first embodiment will be described.

In this modification, the components that are the same as in the first embodiment are given the same reference numerals as those components, and will not be described in detail.

Figure 15:
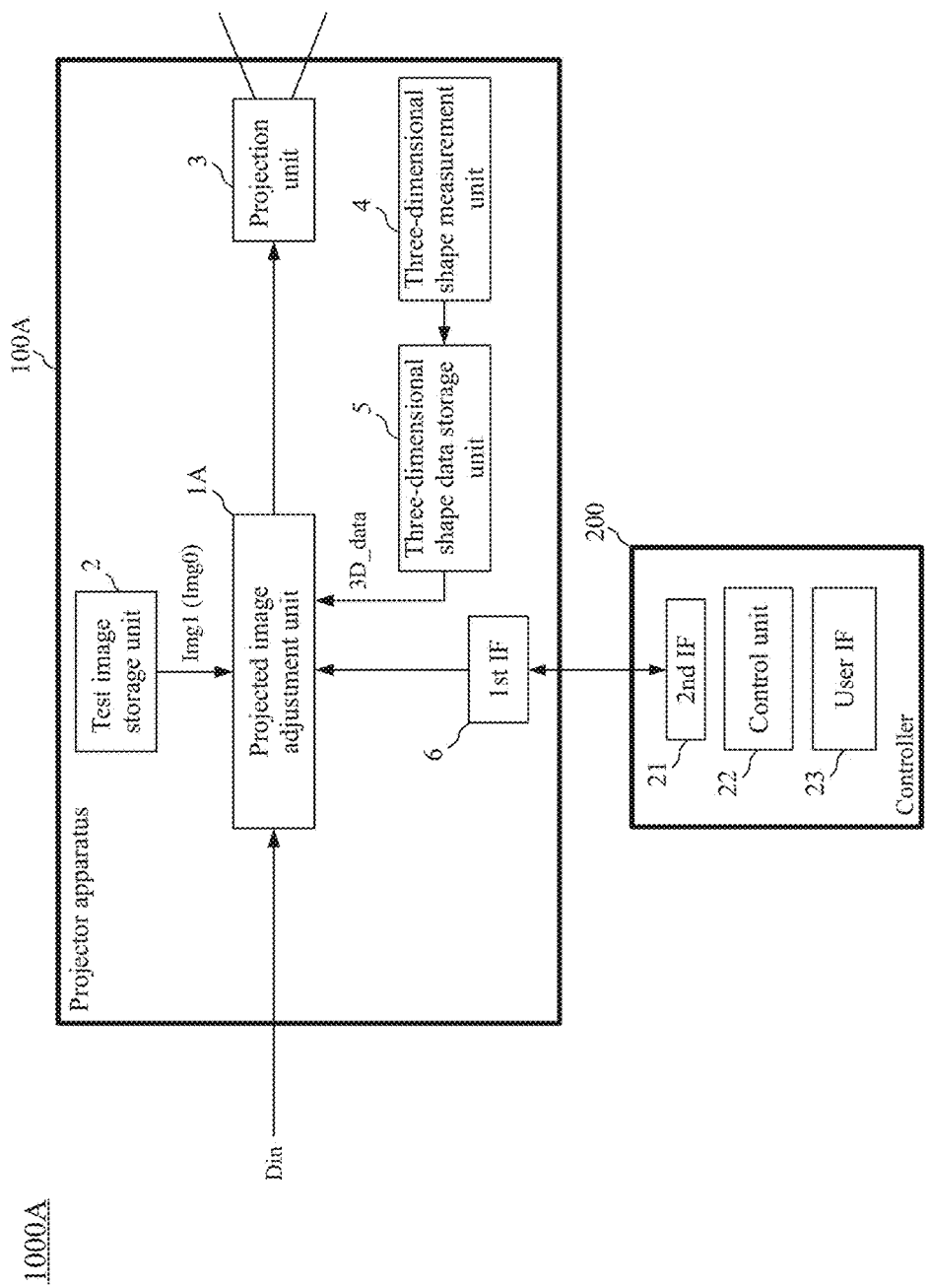
FIG. 15 is a schematic diagram showing the structure of a projection system 1000A according to a first modification of the first embodiment.

FIG. 15 is a schematic diagram showing the structure of a projection system 1000A according to the first modification of the first embodiment.

Figure 16:
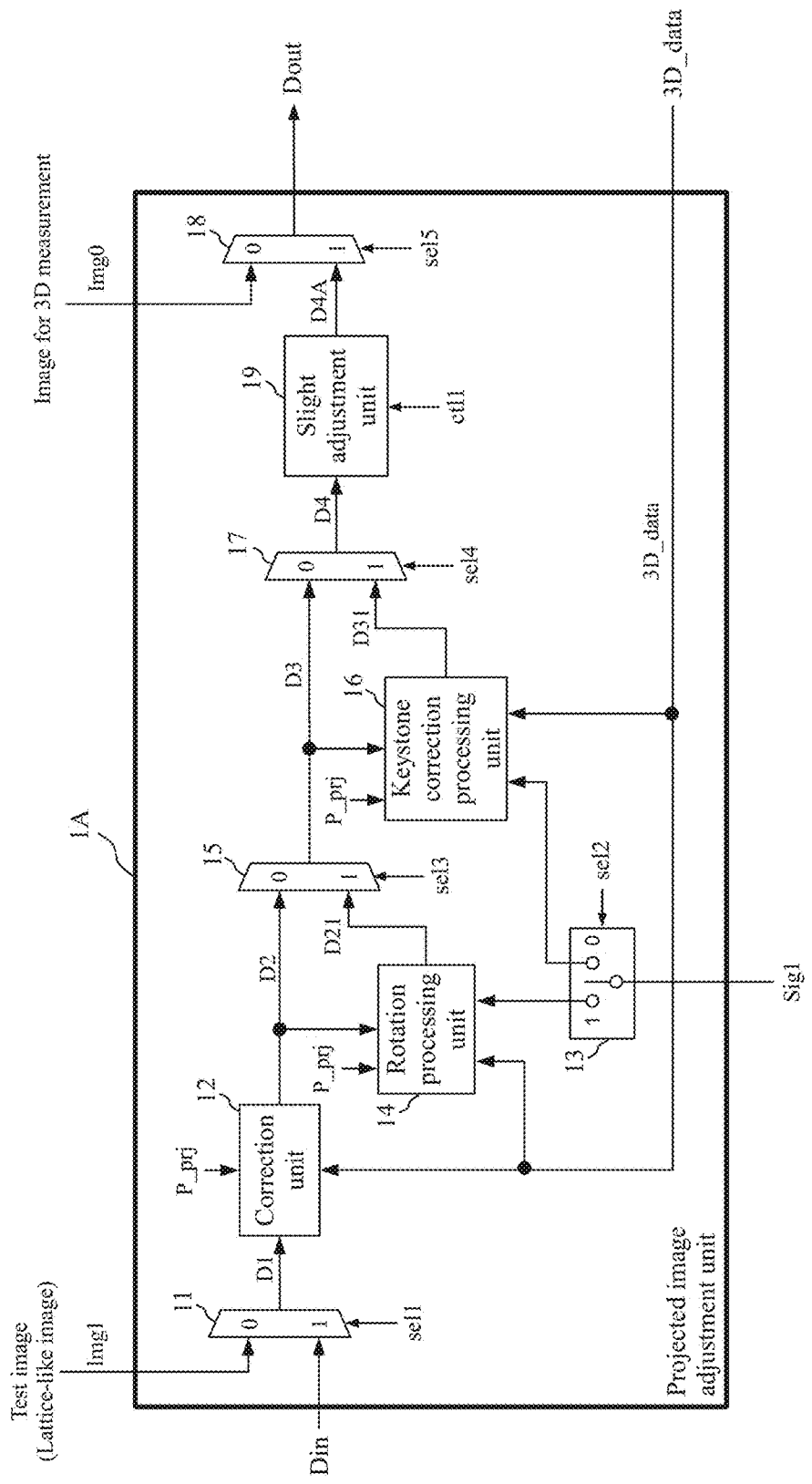
FIG. 16 is a schematic diagram showing the structure of a projected image adjustment unit 1A according to the first modification of the first embodiment.

FIG. 16 is a schematic diagram showing the structure of a projected image adjustment unit 1A of the projector apparatus 100A of the projection system 1000A according to the first modification of the first embodiment.

The projection system 1000A of the first modification includes the projector apparatus 100A replacing the projector apparatus 100 of the projection system 1000 according to the first embodiment.

As shown in FIG. 16, the projector apparatus 100A has a configuration in which a slight adjustment unit 19 is added between the third selector 17 and the fourth selector 18 of the projector apparatus 100. The other structure of the projector apparatus 100A is the same as the structure of the projector apparatus 100.

The slight adjustment unit 19 receives the image D4 transmitted from the third selector 17 and the control signal ctl1 transmitted from the control unit. Until the adjustment processing (the adjustment processing for reducing geometric distortion of the image) described in the first embodiment is completed, the slight adjustment unit 19 directly transmits the received signal without performing any processing on the received signal to the fourth selector 18 as a signal D4A (image D4A). After the adjustment processing (the adjustment processing for reducing geometric distortion of the image) has been completed, the slight adjustment unit 19 performs processing on the image D4 for slightly shifting each vertex of the image projected on the projection plane by the projection unit 3 in accordance with the control signal ctl1 from the control unit, and then transmits the processed image to the fourth selector 18 as the image D4A (image signal D4A).

Note that the slight adjustment unit 19 holds the settings obtained through the above-described slight adjustment processing, and performs the slight adjustment processing using the settings when the mode is switched to a mode for displaying (projecting) the image signal (or the video signal) Din in the projector apparatus 100.

As described above, in the projection system 1000A of this modification, the slight adjustment unit 19 performs the slight adjustment processing to correct errors that occurs in the three-dimensional shape measurement processing in the projection system 1000A, for example. This allows the projection system 1000A to perform even more accurate image projection processing (processing for reducing geometric distortion).

After the same adjustment processing (adjustment processing for reducing the geometric distortion of the image) as the projection system of the first embodiment is performed, the projection system 1000A of this modification performs the slight adjustment processing, thus significantly reducing the amount of processing (workload) required for correcting errors occurring in the three-dimensional shape measurement processing as compared with the conventional techniques.

Note that the control signal ctl1 inputted into the slight adjustment unit 19 may be a signal based on an operation by a user using the controller 200. In this case, the user operates for performing the slight adjustment processing using the controller 200. The controller 200 generates a control signal based on the user's operation and then transmits the generated control signal to the projector apparatus 100A. The projector apparatus 100A receives the signal transmitted from the controller 200 as the signal Sig1 via the first interface 6 and may transmit the received signal Sig1 to the slight adjustment unit 19 instead of the control signal ctrl1.

Second Embodiment

The second embodiment will now be described with reference to the drawings.

Structure of Projection System

Figure 17:
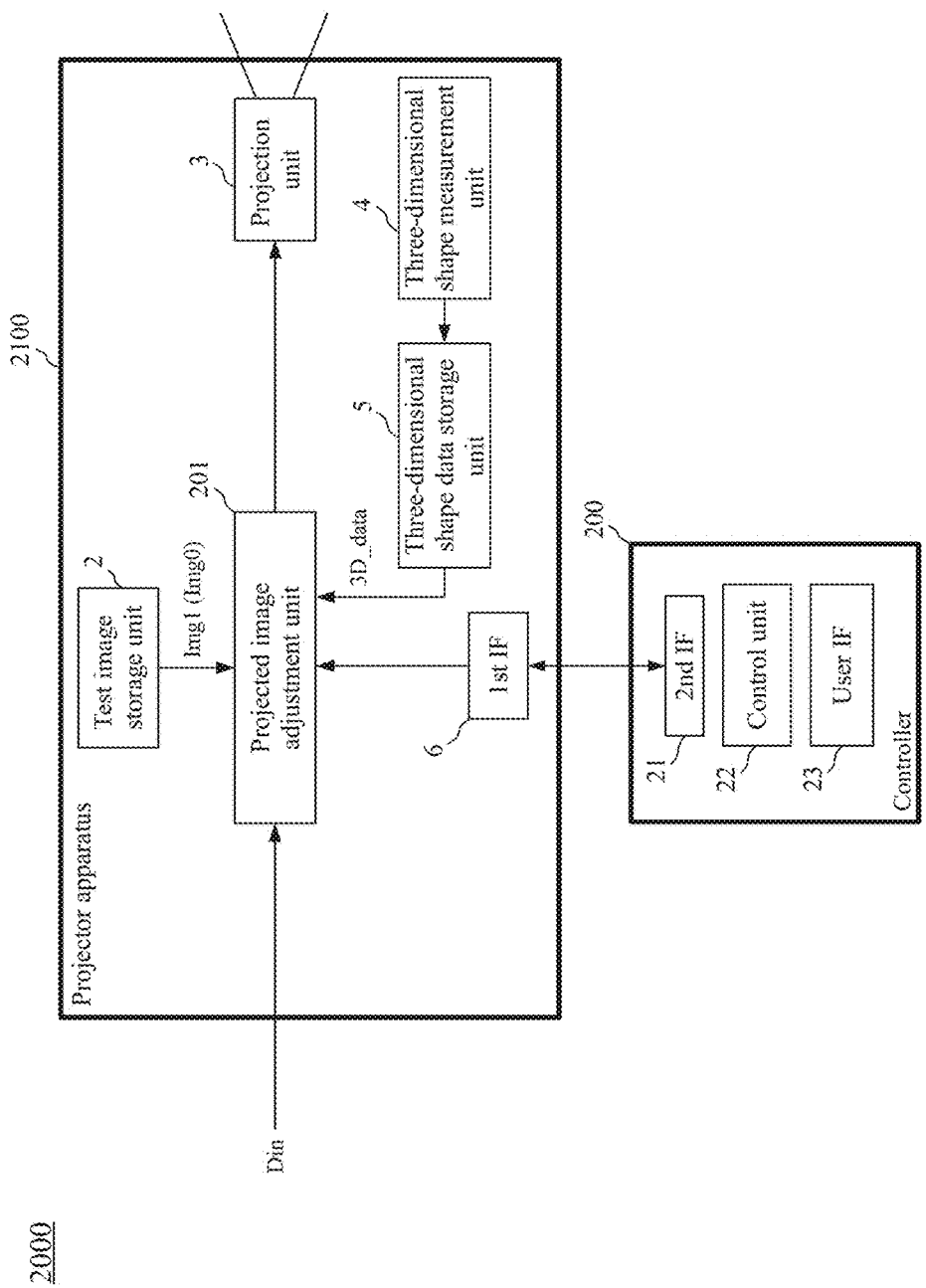
FIG. 17 is a schematic diagram showing the structure of a projection system 2000 according to a second embodiment.

FIG. 17 is a schematic diagram showing the structure of a projection system 2000 according to the second embodiment.

Figure 18:
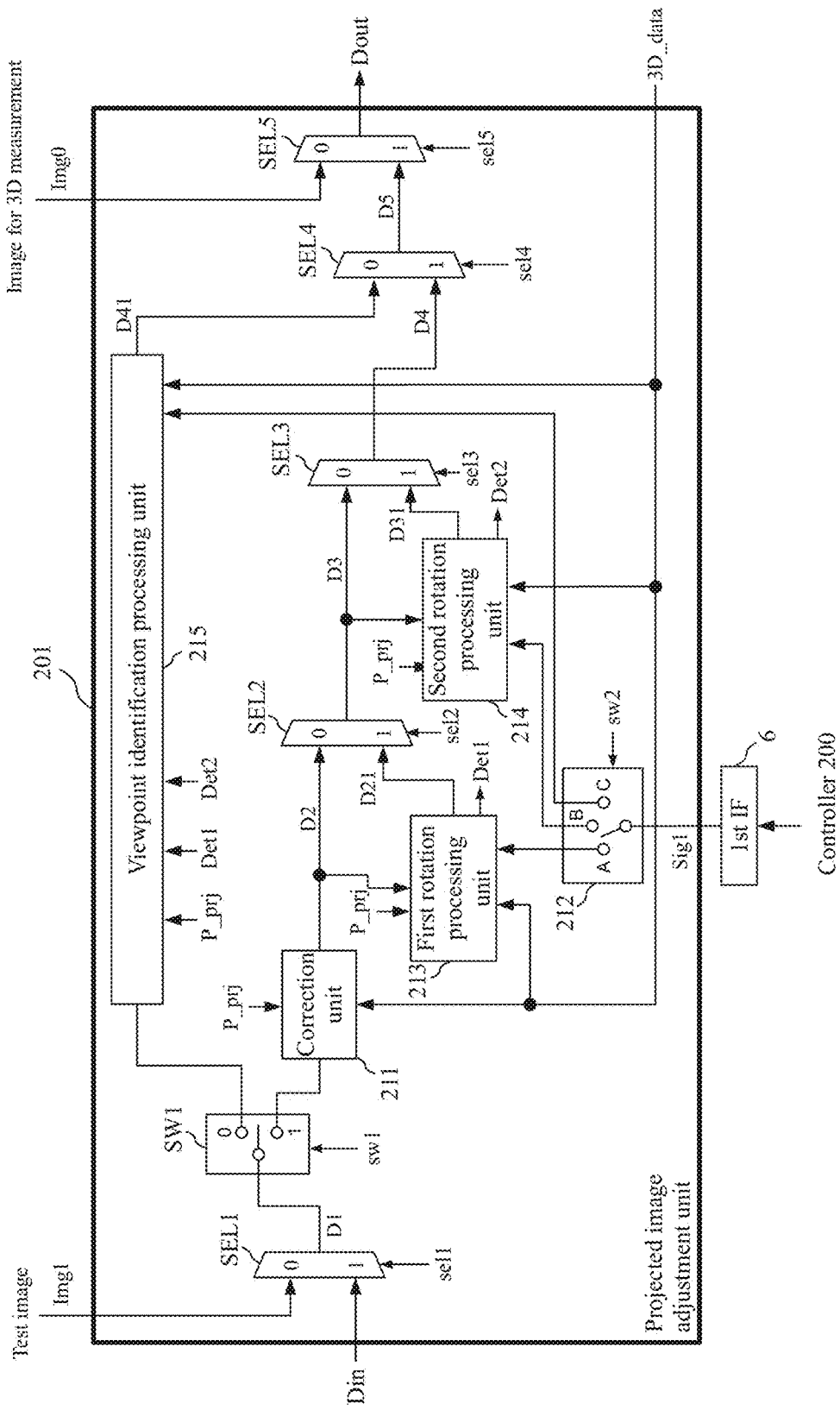
FIG. 18 is a schematic diagram showing the structure of a projected image adjustment unit 201 of a projector apparatus 2100 of the projection system 2000 according to the second embodiment.

FIG. 18 is a schematic diagram showing the structure of a projected image adjustment unit 201 of a projector apparatus 2100 of the projection system 2000 according to the second embodiment.

Figure 19:
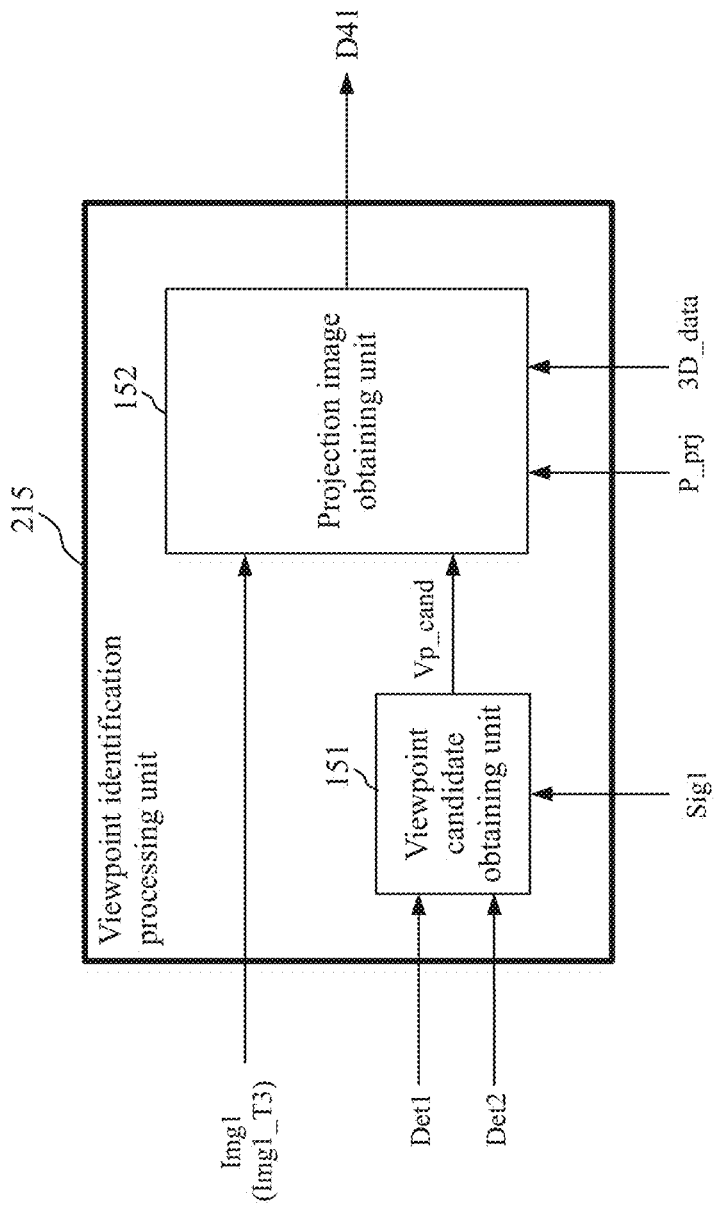
FIG. 19 is a schematic diagram showing the structure of a viewpoint identification processing unit 215 of the projection system 2000 according to the second embodiment.

FIG. 19 is a schematic diagram showing the structure of a viewpoint identification processing unit 215 of the projection system 2000 according to the second embodiment.

Figure 20:
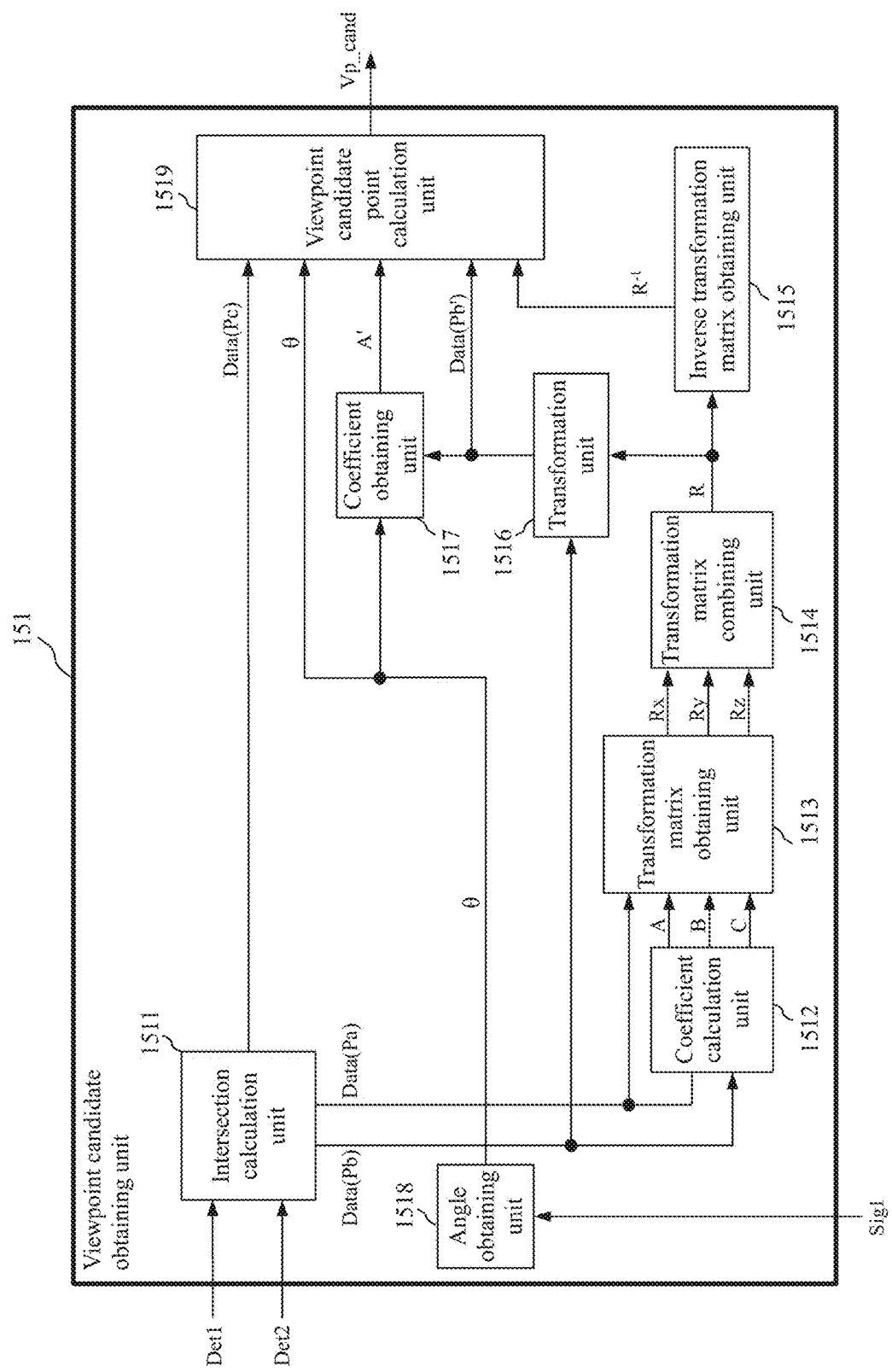
FIG. 20 is a schematic diagram showing the structure of a viewpoint candidate obtaining unit 151 of the projection system 2000 according to the second embodiment.

FIG. 20 is a schematic diagram showing the structure of a viewpoint candidate obtaining unit 151 of the projection system 2000 according to the second embodiment.

As shown in FIG. 17, the projection system 2000 includes a projector apparatus 2100 and a controller 200.

As shown in FIG. 17, the projector apparatus 2100 includes a projected image adjustment unit 201, a test image storage unit 2, a projection unit 3, a three-dimensional shape measurement unit 4, a three-dimensional shape data storage unit 5, and a first interface 6.

As shown in FIG. 18, the projected image adjustment unit 201 includes a first selector SEL1, a first switcher SW1, a correction unit 211, a second switcher 212, a first rotation processing unit 213, a second selector SEL2, a second rotation processing unit 214, a third selector SEL3, a viewpoint identification processing unit 215, a fourth selector SEL4, and a fifth selector SEL5.

The first selector SEL1 receives an image Din (image signal Din) inputted into the projector apparatus 2100, a test image Img1 transmitted from the test image storage unit 2, and a selection signal sel1. The first selector SEL1 selects one of the image Din and the test image Img1 in accordance with the selection signal sel1, and transmits the selected image (selected image signal) to the first switcher SW1 as an image D1 (an image signal D1). Note that the selection signal sel1 is a control signal generated by a control unit (not shown) that controls each functional unit of the projector apparatus 2100.

The first switcher SW1 receives the image D1 transmitted from the first selector SEL1 and the switching signal sw1. The first switcher SW1 transmits the image D1 (image signal D1), in accordance with the switching signal sw1, to one of the correction unit 211 and the viewpoint identification processing unit 215. Note that the switching signal sw1 is a control signal generated by a control unit that controls each functional unit of the projector apparatus 2100.

The correction unit 211 receives the image D1 transmitted from the first switcher SW1, the three-dimensional shape data 3D_data transmitted from the three-dimensional shape data storage unit 5, and the information P_prj on the projection point of the projection unit 3. The correction unit 211 performs correction processing on the image D1 based on the three-dimensional shape data 3D_data and the information P_prj on the projection point. The correction unit 211 then transmits the image after the correction processing as the image D2 (image signal D2) to the second selector SEL2 and the first rotation processing unit 213.

The second switcher 212 receives the signal Sig1 transmitted from the first interface 6 and the switching signal sw2. The second switcher 212 transmits the signal Sig1, in accordance with the switching signal sw2, to one of the first rotation processing unit 213, the second rotation processing unit 214, and the viewpoint identification processing unit 215. Note that the switching signal sw2 is a control signal generated by a control unit that controls each functional unit of the projector apparatus 2100.

The first rotation processing unit 213 receives the image D2 transmitted from the correction unit 211, the three-dimensional shape data 3D_data transmitted from the three-dimensional shape data storage unit 5, the information P_prj on the projection point of the projection unit 3, and the signal Sig1 transmitted from the second switcher 212. When receiving the signal Sig1, the first rotation processing unit 213 performs first rotation processing on the image D2 based on the three-dimensional shape data 3D_data and the information P_prj on the projection point of the projection unit 3 (details will be described later). The first rotation processing unit 213 then transmits the processed image as an image D21 (image signal D21) to the second selector SEL2. In addition, the first rotation processing unit 213 transmits a detection signal including information (detection information) in completing the first rotation processing as Det1 to the viewpoint identification processing unit 215 (details will be described later). The detection signal Det1 includes data of the first straight line (first straight line data) (details will be described later).

The second selector SEL2 receives the image D2 transmitted from the correction unit 211, the image D21 transmitted from the first rotation processing unit 213, and the selection signal sel2. The second selector SEL2 selects, in accordance with the selection signal sel2, one of the image D2 and the image D21, and then transmits the selected image as the image D3 (image signal D3) to the second rotation processing unit 214 and the third selector SEL3. Note that the selection signal sel2 is a control signal generated by a control unit that controls each functional unit of the projector apparatus 2100.

The second rotation processing unit 214 receives the image D3 transmitted from the second selector SEL2, the three-dimensional shape data 3D_data transmitted from the three-dimensional shape data storage unit 5, the information P_prj on the projection point of the projection unit 3, and the signal Sig1 transmitted from the second switcher 212. When receiving the signal Sig1, the second rotation processing unit 214 performs the second rotation processing on the image D3 based on the three-dimensional shape data 3D_data and the information P_prj on the projection point of the projection unit 3 (details will be described later). The second rotation processing unit 214 then transmits the processed image as the image D31 (image signal D31) to the third selector SEL3. The second rotation processing unit 214 also transmits a detection signal including information (detection information) in completing the second rotation processing as Det2 to the viewpoint identification processing unit 215 (details will be described later). The detection signal Det2 includes data of a second straight line (second straight line data) (details will be described later).

The third selector SEL3 receives the image D3 transmitted from the second selector SEL2, the image D31 transmitted from the second rotation processing unit 214, and the selection signal sel3. The third selector SEL3 selects, in accordance with the selection signal sel3, one of the image D3 and the image D31, and then transmits the selected image as the image D4 (image signal D4) to the fourth selector SEL4. Note that the selection signal sel3 is a control signal generated by a control unit that controls each functional unit of the projector apparatus 2100.

The viewpoint identification processing unit 215 receives the image D1 transmitted from the first switcher SW1, the three-dimensional shape data 3D_data transmitted from the three-dimensional shape data storage unit 5, the information P_prj on the projection point of the projection unit 3. Also, the viewpoint identification processing unit 215 receives the detection signal Det1 transmitted from the first rotation processing unit 213 and the detection signal Det2 transmitted from the second rotation processing unit 214.

As shown in FIG. 19, the viewpoint identification processing unit 215 includes a viewpoint candidate obtaining unit 151 and a projection image obtaining unit 152.

As shown in FIG. 20, the viewpoint candidate obtaining unit 151 includes an intersection calculation unit 1511, a coefficient calculation unit 1512, a transformation matrix obtaining unit 1513, a transformation matrix combining unit 1514, an inverse transformation matrix obtaining unit 1515, a transformation unit 1516, a coefficient obtaining unit 1517, an angle obtaining unit 1518, and a viewpoint candidate point calculation unit 1519.

The intersection calculation unit 1511 receives the detection signal Det1 transmitted from the first rotation processing unit 213 and the detection signal Det2 transmitted from the second rotation processing unit 214. Based on the first straight line data included in the detection signal Det1 and the second straight line data included in the detection signal Det2, the intersection calculation unit 1511 calculates the coordinates of the intersection Pc of the first straight line and the second straight line, the coordinates of a point Pa, which is on the first straight line and is a point other than the intersection Pc, and the coordinates of a point Pb, which is on the second straight line and is a point other than the intersection Pc. The intersection calculation unit 1511 transmits a signal (data) including information on the calculated coordinates of the intersection Pc, as Data(Pc), to the viewpoint candidate point calculation unit 1519.

Further, the intersection calculation unit 1511 transmits a signal (data) including information on the coordinates of the point Pa to the coefficient calculation unit 1512 and the transformation matrix obtaining unit 1513 as Data(Pa).

The intersection calculation unit 1511 also transmits a signal (data) including information on the coordinates of the point Pb to the coefficient calculation unit 1512 and the transformation unit 1516 as Data(Pb).

The coefficient calculation unit 1512 receives the data Data(Pa) of the point Pa and the data Data(Pb) of the point Pb transmitted from the intersection calculation unit 1511. The coefficient calculation unit 1512 obtains information on the coefficients A, B, and C based on the data Data(Pa) of the point Pa and the data Data(Pb) of the point Pb (details will be described later). The coefficient calculation unit 1512 then transmits information (data) on the obtained coefficients A, B, and C to the transformation matrix obtaining unit 1513.

The transformation matrix obtaining unit 1513 receives the information (data) on the coefficients A, B, and C transmitted from the coefficient calculation unit 1512 and data Pa(Pa) of the point Pa transmitted from the intersection calculation unit 1511. The transformation matrix obtaining unit 1513 obtains transformation matrices Rx, Ry, and Rz based on the coefficients A, B, and C and the data Data(Pa) of the point Pa. The transformation matrix obtaining unit 1513 then transmits data on the obtained transformation matrices Rx, Ry, and Rz to the transformation matrix combining unit 1514.

The transformation matrix combining unit 1514 receives the data on transformation matrices Rx, Ry, and Rz transmitted from the transformation matrix obtaining unit 1513, and obtains a composite matrix R from transformation matrices Rx, Ry, and Rz. The transformation matrix combining unit 1514 then transmits data on the obtained composite matrix R to the inverse transformation matrix obtaining unit 1515 and the transformation unit 1516.

The inverse transformation matrix obtaining unit 1515 receives the data on the composite matrix R transmitted from the transformation matrix combining unit 1514. The inverse transformation matrix obtaining unit 1515 obtains an inverse transformation matrix $E^{-1}$ from the composite matrix R and then transmits the data on the obtained inverse transformation matrix $R^{-1}$ to the viewpoint candidate point calculation unit 1519.

The transformation unit 1516 receives the data on the composite matrix R transmitted from the transformation matrix combining unit 1514 and the data Data(Pb) of the point Pb transmitted from the intersection calculation unit 1511. The transformation unit 1516 obtains data (coordinates data) on the point Pb', as Data (Pb'), from the composite matrix R and the data Data(Pb) of the point Pb. The transformation unit 1516 then transmits the obtained data Data(Pb') to the coefficient obtaining unit 1517 and the viewpoint candidate point calculation unit 1519.

The coefficient obtaining unit 1517 receives the data Data(Pb') transmitted from the transformation unit 1516 and the data on the angle θ transmitted from the angle obtaining unit 1518. The coefficient obtaining unit 1517 obtains the coefficient A' based on the data Data(Pb') and the angle θ. The coefficient obtaining unit 1517 then transmits the data on the obtained coefficient A' to the viewpoint candidate point calculation unit 1519.

The angle obtaining unit 1518 receives the signal Sig1 transmitted from the first interface 6, and obtains the angle θ based on the signal Sig1. The angle obtaining unit 1518 then transmits data on the obtained angle θ to the coefficient obtaining unit 1517 and the viewpoint candidate point calculation unit 1519.

The viewpoint candidate point calculation unit 1519 receives the data Data(Pc) transmitted from the intersection calculation unit 1511 and the data on the angle θ transmitted from the angle obtaining unit 1518. In addition, the viewpoint candidate point calculation unit 1519 receives the data on the coefficient A' transmitted from the coefficient obtaining unit 1517, the data Data(Pb') transmitted from the transformation unit 1516, and the data on the inverse transformation matrix $R^{-1}$ transmitted from the inverse transformation matrix obtaining unit 1515.

The viewpoint candidate point calculation unit 1519 calculates coordinates data Vp_cand of a viewpoint candidate point based on the data Data(Pc), the angle θ, the coefficient A', the data Data(Pb'), and the inverse transformation matrix $R^{-1}$. The viewpoint candidate point calculation unit 1519 then transmits the obtained coordinates data Vp_cand of the viewpoint candidate point to the projection image obtaining unit 152.

The projection image obtaining unit 152 receives the image D1 (test image Img1(Img1_T3)) transmitted from the first switcher SW1 and the coordinates data Vp_cand of the viewpoint candidate point transmitted from the viewpoint candidate point calculation unit 1519 of the viewpoint candidate obtaining unit 151. Further, the projection image obtaining unit 152 receives the three-dimensional shape data 3D_data transmitted from the three-dimensional shape data storage unit 5 and the information P_prj on the projection point of the projection unit 3. Based on the three-dimensional shape data 3D_data and the information P_prj on the projection point of the projection unit 3, the projection image obtaining unit 152 converts the image D1 (test image Img1 (Img1_T3)) into an image without geometric distortion viewed from a viewpoint candidate point specified by the coordinates data Vp_cand, and then transmits the converted image, as an image D41 (image signal D41), to the fourth selector SEL4.

The fourth selector SEL4 receives the image D4 transmitted from the third selector SEL3, the image D41 transmitted from the viewpoint identification processing unit 215, and the selection signal sel4. The fourth selector SEL4 selects one of the image D4 and the image D41 in accordance with the selection signal sel4, and transmits the selected image as an image D5 (image signal D5) to the fifth selector SEL5. Note that the selection signal sel4 is a control signal generated by a control unit that controls each functional unit of the projector apparatus 2100.

The fifth selector SEL5 receives the image D5 transmitted from the fourth selector SEL4, the test image Img0 for three-dimensional shape measurement transmitted from the test image storage unit 2, and the selection signal sel5. The fifth selector SEL5 selects one of the image D5 and the test image Img0 in accordance with the selection signal sel5, and then transmits the selected image as the image Dout (image signal Dout) to the projection unit 3. Note that the selection signal sel5 is a control signal generated by a control unit that controls each functional unit of the projector apparatus 2100.

The test image storage unit 2 stores a test image, and outputs a test image to the projected image adjustment unit 201 at a predetermined timing in accordance with a request from the projected image adjustment unit 201.

The projection unit 3 includes an optical system for projecting an image. The projection unit 3 receives the image Dout (image signal Dout) transmitted from the fifth selector SEL5 of the projected image adjustment unit 201 and then projects the received image Dout (image signal Dout) onto the projection target in the three-dimensional space.

The three-dimensional shape measurement unit 4 obtains the three-dimensional measurement data of the projection target in the three-dimensional space and transmits the obtained three-dimensional measurement data of the projection target to the three-dimensional shape data storage unit 5. The three-dimensional shape measurement unit 4 has, for example, a camera, and captures the test image for three-dimensional shape measurement projected from the projection unit 3 to obtain the three-dimensional measurement data of the projection target based on the captured image of the test image for three-dimensional shape measurement.

For example, the three-dimensional shape measurement unit 4 (1) calculates the normal line of the projection plane and determines the positional relationship between the projection unit 3 and the projection surface, or (2) calculates an angle formed by the projection axis of the projection unit 3 (the optical axis of the optical system of the projection unit 3) and the projection plane and determines the positional relationship between the projection unit 3 and the projection plane, thereby obtaining three-dimensional measurement data of the projection target (projection plane).

Alternatively, the three-dimensional shape measurement unit 4 may obtain the three-dimensional measurement data of the projection target by obtaining a range image using the TOF (Time Of Flight) method (e.g., the TOF method using phase differences). In this case, the three-dimensional shape measurement unit 4 includes, for example, a light source for emitting infrared rays and an image sensor for infrared rays, and receives the reflected light of the infrared ray irradiated from the light source with the image sensor and measures a time period from when the infrared ray is irradiated to when the irradiated infrared ray is reflected at the projection target and returns to the light source, thereby obtaining a range image. The three-dimensional shape measurement unit 4 then obtains three-dimensional measurement data of the projection target from the obtained range image.

As further alternative, the three-dimensional shape measurement unit 4 includes a laser light source and a sensor for laser and measures a distance from the laser light source to the projection target based on the flight time of the laser light to obtain three-dimensional measurement data of the projection target. In this case, the three-dimensional shape measurement unit 4 irradiates the laser light to the projection target while sequentially changing the irradiation direction (while scanning the projection target with the laser light), and measure a time period from when the infrared laser light is irradiated to when the irradiated laser light is reflected at the projection target and returns to the laser light source, thereby obtaining three-dimensional measurement data of the projection target.

The three-dimensional shape data storage unit 5 receives the three-dimensional measurement data of the projection target obtained by the three-dimensional shape measurement unit 4, and stores the received three-dimensional measurement data of the input projection target. In accordance with a request from the correction unit 211, the first rotation processing unit 213, and/or viewpoint identification processing unit 215, the three-dimensional shape data storage unit 5 transmits the three-dimensional measurement data to the correction unit 211, the first rotation processing unit 213, and/or viewpoint identification processing unit 215.

The first interface 6 is an interface between the projector apparatus 2100 and the controller 200. Via the first interface 6, a signal from the controller 200 can be transmitted to the projector apparatus 2100.

As shown in FIG. 17, the controller 200 includes a second interface 21, a control unit 22, and a user interface 23.

The second interface 21 is an interface between the controller 200 and the projector apparatus 2100.

The control unit 22 is a control unit that controls each functional unit of the controller 200.

The user interface 23 generates a signal in accordance with the user's operation. For example, when the user presses a predetermined button provided on the controller, the user interface 23 generates a signal indicating that the button is pressed.

2.2 Operation of Projection System

The operation of the projection system 2000 with the above-described structure will now be described.

For operations performed in the projection system 2000, (1) three-dimensional shape measurement processing, (2) correction processing, (3) first rotation processing, (4) second rotation processing and (5) viewpoint identification processing will now be described separately.

Figure 21:
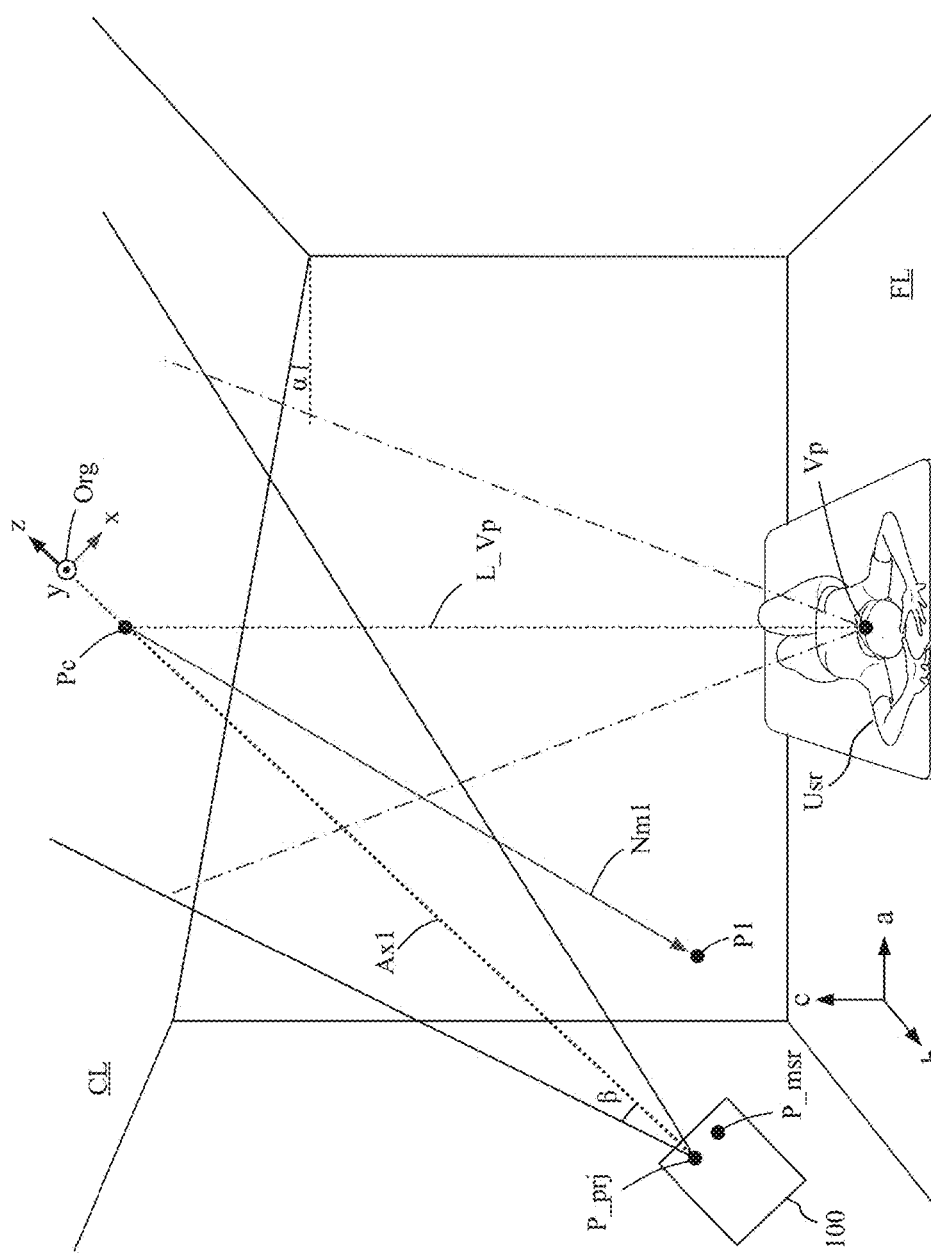
FIG. 21 is a diagram schematically showing a three-dimensional space.

For ease of explanation, a case in which the projection system 2000 operates assuming that a three-dimensional space shown in FIG. 21 is set as a projection target will be described.

FIG. 21 is a diagram schematically showing a three-dimensional space including a ceiling CL (included ceiling CL) to be projected, the projector apparatus 2100, and a user Usr on the floor FL. Further, a-axis, b-axis and c-axis are set as shown in FIG. 21.

In the three-dimensional space shown in FIG. 21, the inclined ceiling CL is a flat surface and is inclined by the angle α shown in FIG. 21 with respect to the floor FL (the floor plane FL) which is a flat surface. In FIG. 21, the projection point of the projection unit 3 of the projector apparatus 2100 is indicated as a point P_prj, and the measurement point of the three-dimensional shape measurement unit 4 of the projector apparatus 2100 is indicated as a point P_msr. In FIG. 21, the intersection of the optical axis (projection axis) Ax1 of the optical system of the projection unit 3 and the inclined ceiling CL is set as a point Pc, and the user's viewpoint position (the center point of both eyes of the user) is indicated as a point Vp.

Note that the inclined ceiling CL should not be limited to one described above, which corresponds to a plane obtained by rotating a plane around the rotation axis, which is the b-axis, with respect to a plane (a-b plane) parallel to the floor FL. For example, the inclined ceiling CL is a plane obtained by rotating a plane parallel to the floor FL around the rotation axis, which is the b-axis, by an angle α with respect to a plane (a-b plane) parallel to the floor FL, and furthermore rotating the plane, which is obtained by rotating the plane parallel to the floor FL around the b-axis by the angle α, around the rotation axis, which is the a-axis, by an angle β.

For ease of explanation, it is assumed that the center point (left eye viewpoint) of the left eye of the user and the center point (right eye view point) of the right eye of the user are present on a straight line parallel to the a-axis. The distance dL between the position of the left eye of the user (the left eye viewpoint) and the point Pc equals the distance dR (=dL) between the position of the right eye of the user (the right viewpoint) and the point Pc.

The x-axis, the y-axis, and the z-axis are set as shown in FIG. 21. In other words, the x-axis and the y-axis are set such that the optical axis Ax1 of the optical system of the projection unit 3 agrees with the z-axis, and the normal line of the x-y plane is parallel to the z-axis. As shown in FIG. 21, it is assumed that the origin Org of the xyz coordinates exists on the optical axis Ax1.

Also, FIG. 21 shows the normal line Nm1, which passes through the point Pc, of the inclined ceiling plane CL and the point P1 on the normal line Nm1.

2.2.1 Three-Dimensional Shape Measurement Processing

First, the three-dimensional shape measurement process will be described.

A case will now be described in which in the projection system 2000, the three-dimensional shape measurement unit 4 includes a camera, captures a test image for three-dimensional shape measurement projected from the projection unit 3, and obtains three-dimensional measurement data of the projection target based on the captured image of the test image for three-dimensional shape measurement.

The test image Img0 for three-dimensional shape measurement is transmitted from the test image storage unit 2 to the fifth selector SEL5 of the projected image adjustment unit 201. The control unit generates a selection signal sel5 for selecting the terminal 0 shown in FIG. 18 of the fifth selector SEL5, and transmits the selection signal to the fifth selector SEL5. This causes the test image Img0 for three-dimensional shape measurement to be transmitted from the fifth selector SEL5 to the projection unit 3 as the image signal Dout.

The projection unit 3 (A) sets the projection axis (the optical axis of the optical system of the projection unit 3) to the axis Ax1 shown in FIG. 21, (B) sets the angle of view to an angel of β shown in FIG. 21, (C) sets a projection point to the point P_prj shown in FIG. 21, and then projects the test image Img0 for three-dimensional shape measurement onto the inclined ceiling CL, which is the projection target.

The three-dimensional shape measurement unit 4 captures the test image Img0 for three-dimensional shape measurement projected by the projection unit 3 using a camera for three-dimensional shape measurement whose image capturing point is at the point P_msr. The three-dimensional shape measurement unit 4 compares the captured image with the test image Img0 for three-dimensional shape measurement to obtain three-dimensional measurement data of the projection target.

In the projection system 2000, the coordinates, in the three-dimensional space, of the projection point P_prj are known, the coordinates, in the three-dimensional space, of the imaging point P_msr of the three-dimensional shape measurement unit 4 are known, and the test image Img0 for three-dimensional shape measurement to be projected is also known; therefore, the coordinates, in the three-dimensional space, of the projection target can be calculated from the image captured at the image capturing point P_msr. In other words, examining which pixel in the captured test image Img0 for three-dimensional shape measurement corresponds to which pixel in the mage captured at the image capturing point P_msr allows for determining the position, in the three-dimensional space, corresponding to each pixel (the position, in the three-dimensional space, at which light corresponding to each pixel is reflected). Thus, specifying the three-dimensional spatial position corresponding to each pixel allows for calculating the coordinates, in the three-dimensional space, of the projection target.

Note that the test image Img0 for three-dimensional shape measurement may be, for example, an image formed by a sine wave signal with a predetermined cycle. In this case, for example, a plurality of images obtained by changing the cycle and phase of a sinusoidal signal at a predetermined timing may be projected from the projection unit 3 onto the projection target, and the three-dimensional shape measurement unit 4 may obtain the three-dimensional shape data of the projection target based on the plurality of projected images.

The three-dimensional shape data of the projection target obtained by the three-dimensional shape measurement unit 4 through the above processing is transmitted from the three-dimensional shape measurement unit 4 to the three-dimensional shape data storage unit 5 and then is stored in the three-dimensional shape data storage unit 5.

2.2.2 Correction Processing Next, the correction processing will be described.

The test image Img1 is transmitted from the test image storage unit 2 to the first selector SEL1. The control unit then generates a selection signal sel1 for selecting the terminal 0 shown in FIG. 18 of the first selector SEL1, and transmits it to the first selector SEL1. This causes the test image Img1 to be transmitted from the first selector SEL1 to the first switcher SW1 as the image signal D1.

Figure 22:
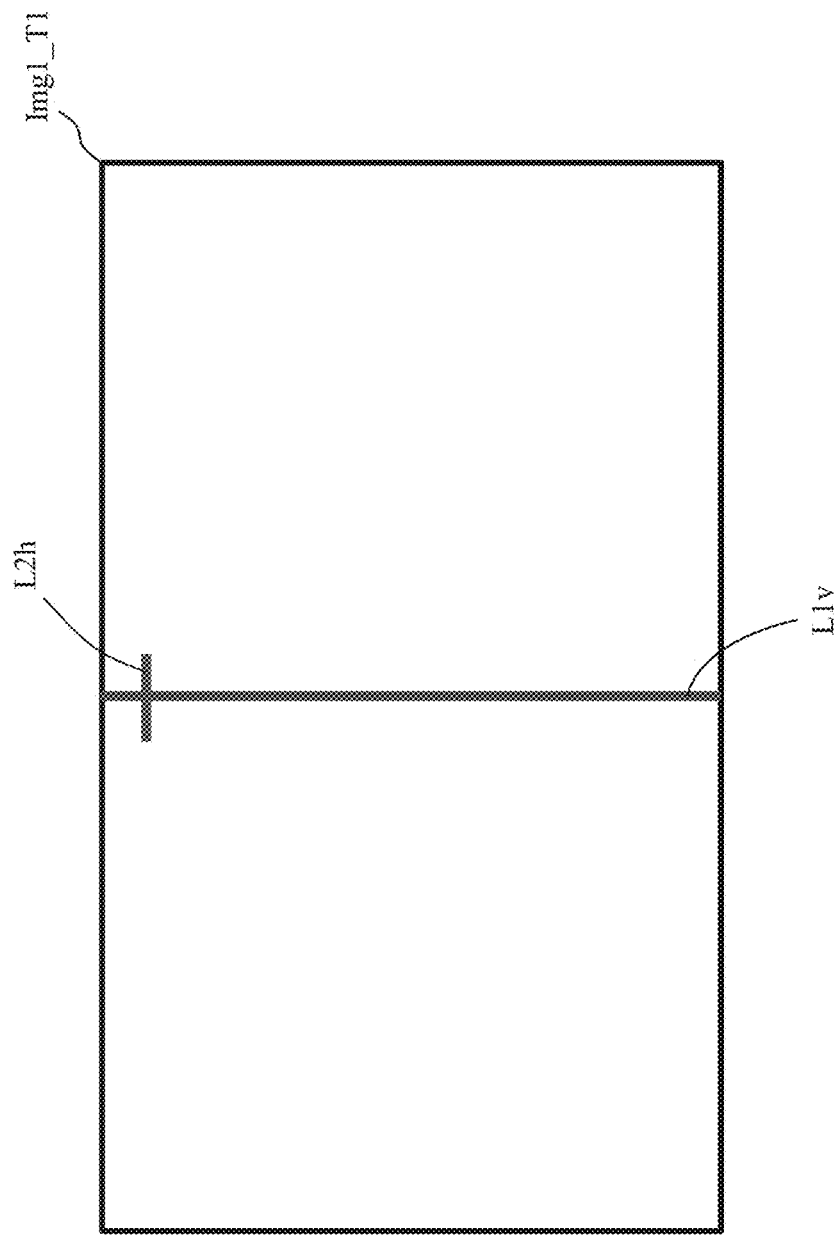
FIG. 22 shows an example of a first test image Img1_T1.

FIG. 22 shows a first test image Img1_T1, which is an example of the test image Img1. As shown in FIG. 22, the first test image Img1_T1 is a rectangular image. As shown in FIG. 22, the first test image Img1_T1 is a pattern image that has a vertical center line L1v extending in the longitudinal direction (in the vertical direction) at the center in the lateral direction (the horizontal direction) of the image, and a horizontal line L2h extending in the lateral direction (in the horizontal direction) in the upper portion of the image.

In the first test image Img1_T1 shown in FIG. 22, the portion where the intersection of the line L1v and the line L2h exists is the upper portion of the image. In the projection system 2000, it is necessary to let the user recognize the upper side of the image of the first test image Img1_T1; thus, it is preferable that an image, such as the first test image Img1_T1 shown in FIG. 22, for which the user easily recognizes the upper side of the image is employed as the test image used for the projection system 2000. Note that the first test image Img1_T1 shown in FIG. 22 is an example and may be another image for which the user can easily recognize the upper side of the image.

For ease of explanation, a case in which the first test image Img1_T1 shown in FIG. 22 is used as the test image will be described.

The correction unit 211 reads the three-dimensional shape data 3D_data from the three-dimensional shape data storage unit 5 to obtain three-dimensional coordinates data of the inclined ceiling plane CL, which is the projection target. Using the obtained three-dimensional coordinate data of the inclined ceiling plane CL, the correction unit 211 then performs correction processing on the image D1 such that the image is in a state without distortion as viewed from the point P1, which is a point on the normal line of the ceiling plane CL that passes through the intersection Pc of the projection axis Ax1 and the ceiling plane CL. The correction unit 211 then transmits the image after the correction processing to the second selector SEL2 as the image D2.

The control unit generates the selection signal sel2 for selecting the terminal 0 shown in FIG. 18 of the second selector SEL2, and transmits it to the second selector SEL2. This causes the image D2 to be transmitted from the second selector SEL2 to the third selector SEL3 as the image D3.

The control unit generates the selection signal sel3 for selecting the terminal 0 shown in FIG. 18 of the third selector SEL3, and transmits it to the third selector SEL3.

This causes the image D3 to be transmitted from the third selector SEL3 to the fourth selector SEL4 as the image D4.

The control unit generates the selection signal sel4 for selecting the terminal 1 shown in FIG. 18 of the fourth selector SEL4, and transmits it to the fourth selector SEL4. This causes the image D4 to be transmitted from the fourth selector SEL4 to the fifth selector SEL5 as the image D5.

The control unit generates a selection signal sel5 for selecting the terminal 1 shown in FIG. 18 of the fifth selector SEL5, and transmits it to the fifth selector SEL5. This causes the image D5 to be transmitted from the fifth selector SEL5 to the projection unit 3 as the image Dout.

The projection unit 3 projects the image Dout from the fifth selector SEL5 onto the inclined ceiling plane CL by the projection axis Ax1 shown in FIG. 21. This state is referred to as "State 1".

Figure 23:
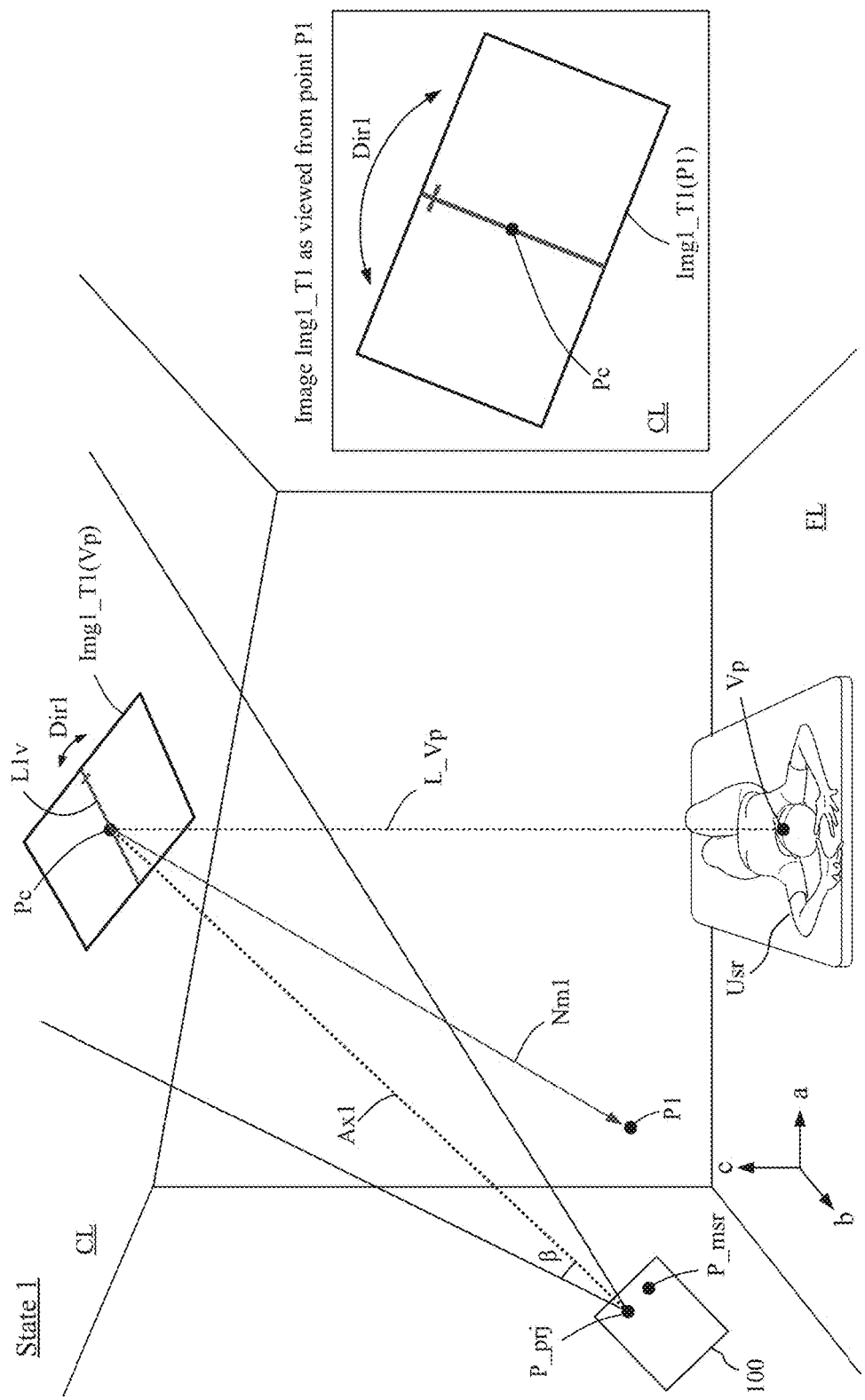
FIG. 23 is a diagram schematically showing the three-dimensional space in State 1.

FIG. 23 is a diagram schematically showing the three-dimensional space in State 1. More specifically, FIG. 23 is a diagram schematically showing a state in which the first test image Img1_T1 shown in FIG. 22 is projected on the inclined ceiling plane CL. In FIG. 23, the first test image Img1_T1 viewed from the viewpoint Vp of the user in State 1 is shown as the image Img1_T1(Vp). In FIG. 23, the first test image Img1_T1 viewed from the point P1 in State 1 is shown as the image Img1_T1(P1).

As can be seen from FIG. 23, in State 1, geometric distortion occurs in the first image Img1_T1(Vp) viewed from the user's viewpoint Vp, whereas no geometric distortion occurs (little geometric distortion occurs) in the first test image Img1_T1(P1) viewed from the point P1.

In the projection system 2000, after the correction processing is performed as described above, the first rotation processing is performed.

2.2.3 First Rotation Processing

Next, the first rotation processing will be described.

In State 1 shown in FIG. 23, the user operates the controller 200 to rotate the image Img1_T1 projected on the inclined ceiling plane CL in the direction indicated by the arrow Dir1 in FIG. 23 around the point Pc such that the vertical center line L1v of the image Img1_T1 appears to the user to be a straight vertical line as viewed from the user's viewpoint Vp. More specifically, the user operates the controller 200 to rotate the image Img1_T1 projected on the inclined ceiling plane CL in the direction indicated by the arrow Dir1 in FIG. 23 around the point Pc such that a plane including the vertical center line L1v of the image Img1_T1, the point Pc, and the viewpoint Vp is orthogonal to a line connecting both eyes of the user. Note that the user rotates the image Img1_T1 such that the upper portion of the image Img1_T1 (the portion where the line L1v intersects with the line L2h in the image Img1_T1) becomes the upper side as viewed from the user.

This first rotation processing will be described in detail.

Similarly to the State 1, the test image Img1_T1 is transmitted from the test image storage unit 2 to the first selector SEL1. The control unit then generates a selection signal sel1 for selecting the terminal 0 shown in FIG. 18 of the first selector SEL1, and transmits it to the first selector SEL1. This causes the image Img1_T1 to be transmitted from the first selector SEL1 to the first switcher SW1 as the image signal D1.

The control unit generates a switching signal sw1 for selecting the terminal 1 shown in FIG. 18 of the first switcher SW1, and transmits it to the first switcher SW1. This causes the image Img1_T1 to be transmitted from the first switcher SW1 to the correction unit 211 as the image signal D1.

The correction unit 211 performs the same correction processing on the image D1 as the processing performed in State 1. The correction unit 211 then transmits the image after the correction processing to the first rotation processing unit 213 as the image D2.

The user operates the controller 200 to cause the projector apparatus 2100 to perform the first rotation processing. For example, the controller 200 has two buttons for performing the first rotation processing, and pressing the first button (one button) of the controller 200 once causes processing for rotating, by a predetermined angle, the test image Img1_T1 counterclockwise in the direction indicated by the direction Dir1 in FIG. 23 to be performed, whereas pressing the second button (the other button) of the controller 200 once causes processing for rotating, by a predetermined angle, the test image Img1_T1 clockwise in the direction indicated by the direction Dir1 in FIG. 23 to be performed.

A case where the first button is pressed will be now described.

When the first button of the controller 200 is pressed once, the user interface 23 generates a signal indicating that the first button has been pressed once. Based on the signal generated by the user interface 23, the control unit 22 of the controller 200 transmits a signal indicating that the first button has been pressed once to the first interface of the projector apparatus 2100 via the second interface 21.

Note that the user can operate the controller 200 in the user's hand, and the controller 200 transmits and/or receives signals to and/or from the projector apparatus 2100 by wireless communication.

For example, in the state shown in FIG. 23, the user holds the controller 200 in hand and operates the controller 200, while viewing the image Img1_T1 projected on the inclined ceiling plane CL, to perform for rotating the image Img1_T1 projected on the inclined ceiling plane CL.

The first interface of the projector apparatus 2100 receives the signal transmitted from the second interface of the controller 200 and transmits the received signal to the second switcher 212 as the signal Sig1.

The second switcher 212 selects the terminal A shown in FIG. 18 in accordance with the switching signal sw2 generated by the control unit, and transmits the signal Sig1 to the first rotation processing unit 213.

Based on the signal Sig1, the three-dimensional shape data 3D_data, and the information P_prj on the projection point of the projection unit 3, the first rotation processing unit 213 performs the first rotation processing on the image D2 transmitted from the correction unit 211.

Note that the first rotation processing unit 213 may perform the first rotation processing on the image D2 transmitted from the correction unit 211 based on the signal Sig1 without using the three-dimensional shape data 3D_data and the information P_prj on the projection point of the projection unit 3. In this case, the three-dimensional shape data 3D_data and the information P_prj on the projection point of the projection unit 3 may not be inputted into the first rotation processing unit 213.

More specifically, the first rotation processing unit 213 performs conversion processing (first rotation processing) on the image D2 such that the image Img1_T1 is rotated counterclockwise in the direction indicated by the arrow Dir1 in FIG. 23 around the point Pc by an angle determined by the signal Sig1 as viewed from the point P1 to the inclined ceiling plane CL. The first rotation processing unit 213 then transmits the processed image as the image D21 (image signal D21) to the second selector SEL2.

The second selector SEL2 selects the terminal 1 shown in FIG. 18 in accordance with the selection signal sel2 generated by the control unit, and transmits the image D21 as the image D3 to the third selector SEL3.

The third selector SEL3 selects the terminal 0 shown in FIG. 18 in accordance with the selection signal sel3 generated by the control unit, and transmits the image D3 (=image D21) as the image D4 to the fourth selector SEL4.

The fourth selector SEL4 selects the terminal 1 shown in FIG. 18 in accordance with the selection signal sel4 generated by the control unit, and transmits the image D4 (=image D21) as the image D5 to the fifth selector SEL5.

The fifth selector SEL5 selects the terminal 1 shown in FIG. 18 in accordance with the selection signal sel5 generated by the control unit, and transmits the image D5 (=image D21) as the image Dout to the projection unit 3.

The projection unit 3 projects the image Dout (=image D21) from the fifth selector SEL5 onto the inclined ceiling plane CL by the projection axis Ax1 shown in FIG. 23. This causes the image Img1_T1 to be rotated in the direction Dir1 by a predetermined angle around the point Pc as viewed from the point P1 to the inclined ceiling plane CL.

Repeating the above operation causes the vertical center line L1v of the image Img1_T1 to appear to the user to be a straight vertical line as viewed from the user's viewpoint Vp. This state, in which a plane including the vertical center line L1v of the image Img1_T1, the point Pc, and the viewpoint Vp is orthogonal to the line connecting both eyes of the user, is referred to as "State 2".

Figure 24:
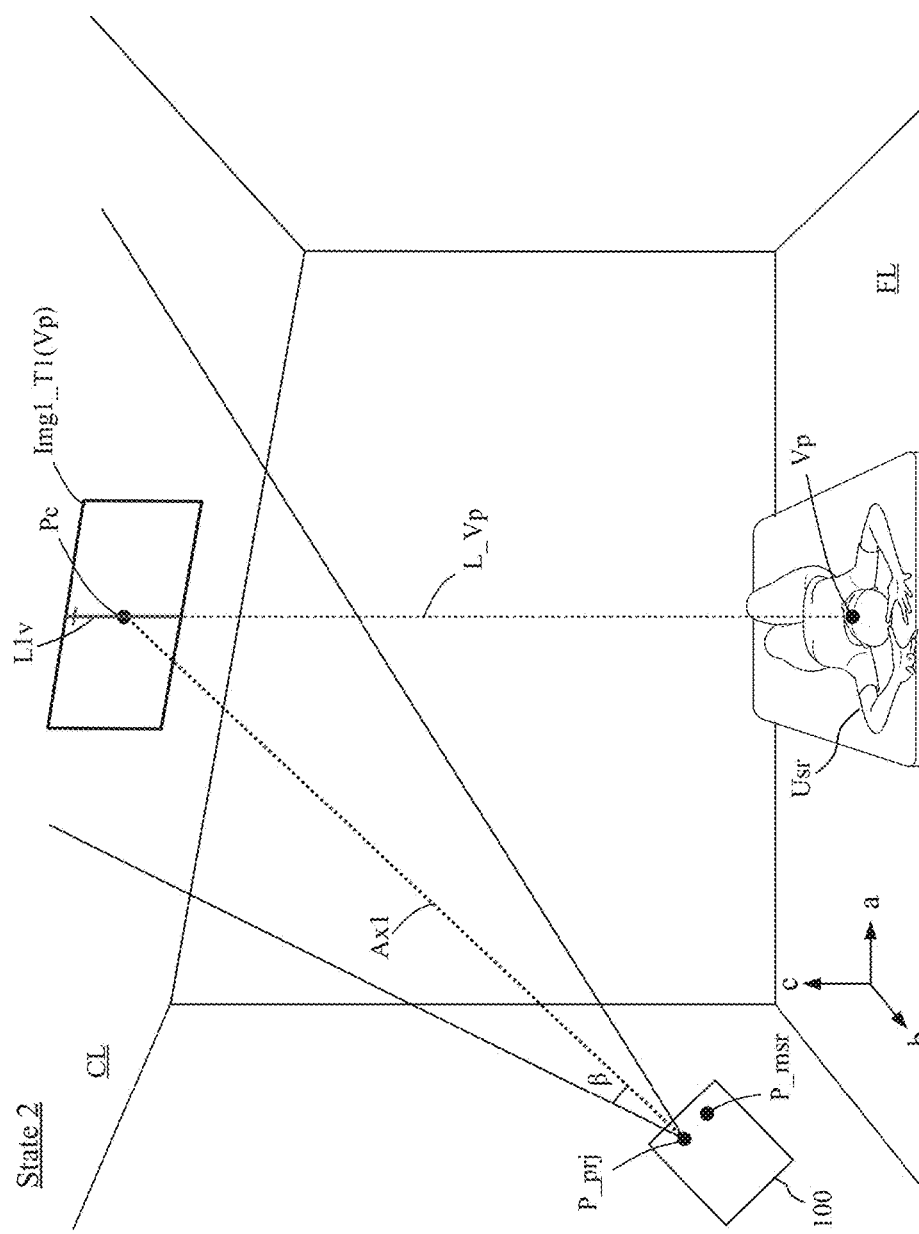
FIG. 24 is a diagram schematically showing the three-dimensional space in State 2.

FIG. 24 is a diagram schematically showing the three-dimensional space in State 2. As shown in FIG. 24, in State 2, the test image Img1_T1 viewed from the viewpoint Vp of the user is shown as an image Img1_T1(Vp).

As can be seen from the FIG. 24, in State 2, the vertical center line L1v of the test image Img1_T1(Vp) appears to be a straight vertical line as viewed from the user's viewpoint Vp.

In state 2, the first rotation processing unit 213 obtains and holds the data for specifying a straight line including the vertical center line L1v. Examples of data for specifying a straight line including the vertical center line L1v include (1) data of an equation (a straight line equation) that defines the straight line and (2) data for specifying the coordinates of two different points included in the straight line.

The first rotation processing unit 213 then transmits a detection signal including data for specifying a straight line including the vertical center line L1v as Det1 to the viewpoint identification processing unit 215.

After performing the first rotation processing as described above, the projection system 2000 performs the second rotation processing.

2.2.4 Correction Processing (for Second Test Image)

Figure 25:
FIG. 25 shows an example of a second test image Img1_T2.

FIG. 25 shows an example of a second test image Img1_T2, which is an example of the test image Img1 used for the second rotation processing.

Figure 26:
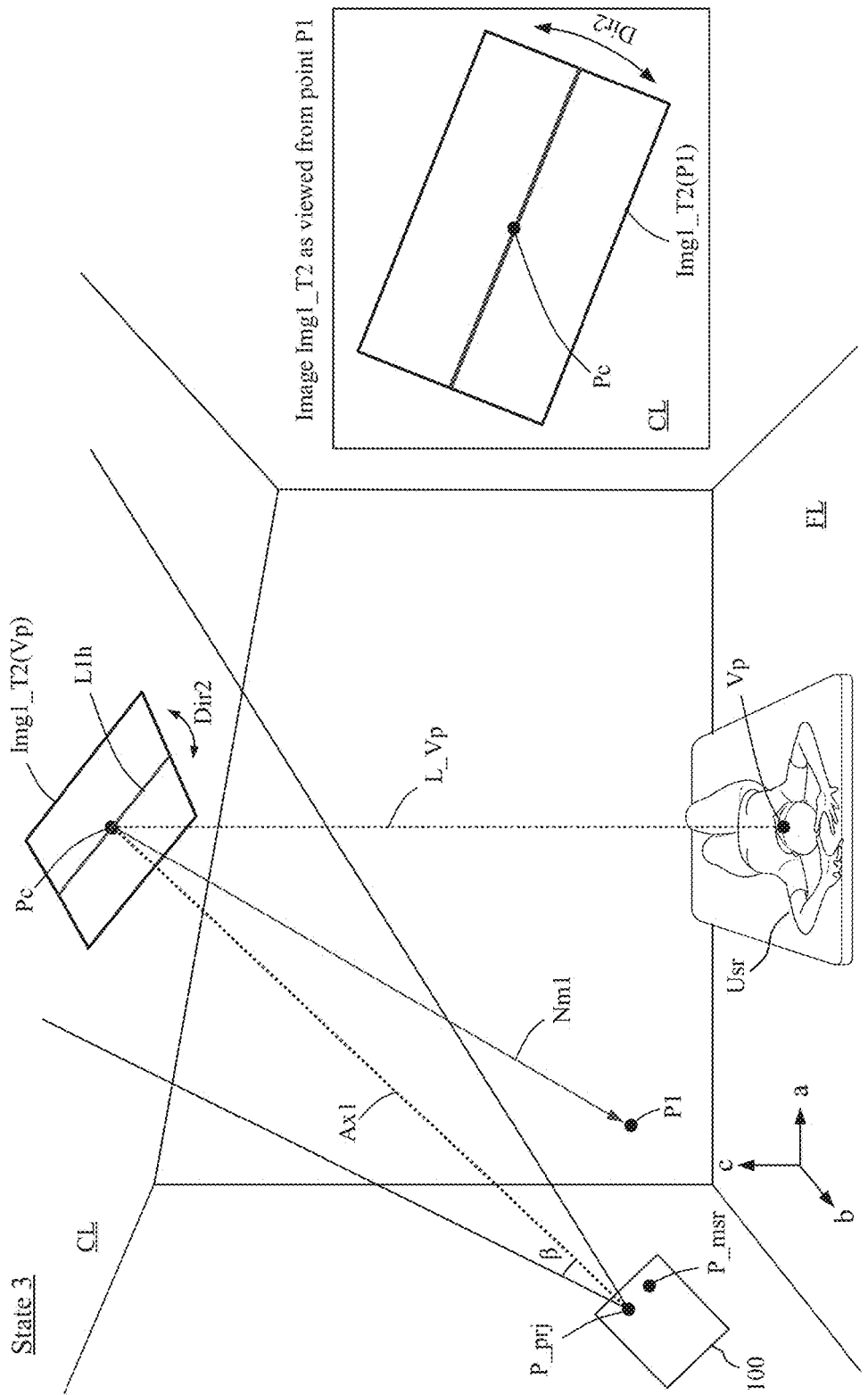
FIG. 26 is a diagram describing second rotation processing.

FIG. 26 is a diagram describing the second rotation processing, and is a diagram (a front view) of the three-dimensional space including the inclined ceiling plane CL as viewed from the b-axis positive direction toward the b-axis negative direction.

The correction unit 211 receives the second test image Img1_T2 as an input image, and then performs the correction processing on the received image in the same manner as described above. In other words, the following processing is performed.

The second test image Img1_T2 is transmitted from the test image storage unit 2 to the first selector SEL1. The control unit then generates a selection signal sel1 for selecting the terminal 0 shown in FIG. 18 of the first selector SEL1, and transmits it to the first selector SEL1. This causes the test image Img1_T2 to be transmitted from the first selector SEL1 to the first switcher SW1 as the image signal D1.

As shown in FIG. 25, the second test image Img1_T2 is a rectangular image. As shown in FIG. 25, the second test image Img1_T2 is a pattern image that has a horizontal center line L1h extending in the lateral direction (in the horizontal direction) at the center in the longitudinal direction (the vertical direction) of the image.

Note that the second test image Img1_T2 shown in FIG. 25 is an example and may be another image in which the user can easily recognize distortion in the horizontal direction of the image.

For ease of explanation, a case in which the second test image Img1_T2 shown in FIG. 25 is used as the test image will be described.

The correction unit 211 reads the three-dimensional shape data 3D_data from the three-dimensional shape data storage unit 5 to obtain three-dimensional coordinates data of the inclined ceiling plane CL, which is the projection target. Using the obtained three-dimensional coordinate data of the inclined ceiling plane CL, the correction unit 211 then performs correction processing on the image D1 such that the image is in a state without distortion as viewed from the point P1, which is a point on the normal line of the ceiling plane CL that passes through the intersection Pc of the projection axis Ax1 and the ceiling plane CL. The correction unit 211 then transmits the image after the correction processing to the second selector SEL2 as the image D2.

The control unit generates the selection signal sel2 for selecting the terminal 0 shown in FIG. 18 of the second selector SEL2, and transmits it to the second selector SEL2. This causes the image D2 to be transmitted from the second selector SEL2 to the third selector SEL3 as the image D3.

The control unit generates the selection signal sel3 for selecting the terminal 0 shown in FIG. 18 of the third selector SEL3, and transmits it to the third selector SEL3. This causes the image D3 to be transmitted from the third selector SEL3 to the fourth selector SEL4 as the image D4.

The control unit generates the selection signal sel4 for selecting the terminal 1 shown in FIG. 18 of the fourth selector SEL4, and transmits it to the fourth selector SEL4. This causes the image D4 to be transmitted from the fourth selector SEL4 to the fifth selector SEL5 as the image D5.

The control unit generates a selection signal sel5 for selecting the terminal 1 shown in FIG. 18 of the fifth selector SEL5, and transmits it to the fifth selector SEL5. This causes the image D5 to be transmitted from the fifth selector SEL5 to the projection unit 3 as the image Dout.

The projection unit 3 projects the image Dout from the fifth selector SEL5 onto the inclined ceiling plane CL by the projection axis Ax1 shown in FIG. 21. This state is referred to as "State 3".

FIG. 26 is a diagram schematically showing the three-dimensional space in State 3. More specifically, FIG. 26 is a diagram schematically showing a state in which the second test image Img1_T2 shown in FIG. 25 is projected on the inclined ceiling plane CL. In FIG. 26, the second test image Img1_T2 viewed from the viewpoint Vp of the user in State 3 is shown as the image Img1_T2(Vp). In FIG. 26, the second test image Img1_T2 viewed from the point P1 in State 3 is shown as the image Img1_T2(P1).

As can be seen from FIG. 26, in State 3, geometric distortion occurs in the second test image Img1_T2(Vp)

viewed from the user's viewpoint Vp, whereas no geometric distortion occurs (little geometric distortion occurs) in the second test image Img1_T2(P1) viewed from the point P1.

In the projection system 2000, after the correction processing is performed as described above, the second rotation processing is performed.

2.2.5 Second Rotation Processing

Next, the second rotation processing will be described.

In State 3 shown in FIG. 26, the user operates the controller 200 to rotate the image Img1_T2 projected on the inclined ceiling plane CL in the direction indicated by the arrow Dir2 in FIG. 26 around the point Pc such that the horizontal center line L1$h$ of the image Img1_T2 appears to the user to be a straight horizontal line as viewed from the user's viewpoint Vp.

This second rotation processing will be described in detail.

The second test image Img 1_T2 is transmitted from the test image storage unit 2 to the first selector SEL1. The control unit then generates a selection signal sel1 for selecting the terminal 0 shown in FIG. 18 of the first selector SEL1, and transmits it to the first selector SEL1. This causes the second test image Img1_T2 to be transmitted from the first selector selector1 to the first switcher SW1 as the image signal D1.

The control unit generates a switching signal sw1 for selecting the terminal 1 shown in FIG. 18 of the first switcher SW1, and transmits it to the first switch SW1. This causes the second test image Img1_T2 to be transmitted from the first switcher SW1 to the correction unit 211 as the image signal D1.

The correction unit 211 performs the same correction processing on the image D1 as the processing performed in State 3. The correction unit 211 then transmits the image after the correction processing to the second selector SEL2 as the image D2.

The control unit generates the selection signal sel2 for selecting the terminal 0 shown in FIG. 18 of the second selector SEL2, and transmits it to the second selector SEL2. This causes the test image Img1_T2 to be transmitted from the second selector SEL2 to the second rotation processing unit 214 as the image signal D3.

The user operates the controller 200 to cause the projector apparatus 2100 to perform the second rotation processing. For example, the controller 200 has two buttons for performing the second rotation processing, and pressing the first button (one button) of the controller 200 once causes processing for rotating, by a predetermined angle, the second test image Img1_T2 counterclockwise in the direction indicated by the direction Dir2 in FIG. 26 to be performed, whereas pressing the second button (the other button) of the controller 200 once causes processing for rotating, by a predetermined angle, the test image Img1_T2 clockwise in the direction indicated by the direction Dir2 in FIG. 26 to be performed.

A case where the first button is pressed will now be described.

When the first button of the controller 200 is pressed once, the user interface 23 generates a signal indicating that the first button has been pressed once. Based on the signal generated by the user interface 23, the control unit 22 of the controller 200 transmits a signal indicating that the first button has been pressed once to the first interface of the projector apparatus 2100 via the second interface 21.

Note that the user can operate the controller 200 in the user's hand, and the controller 200 transmits and/or receives signals to and/or from the projector apparatus 2100 by wireless communication.

For example, in the state shown in FIG. 26, the user holds the controller 200 in hand and operates the controller 200, while viewing the image Img1_T2 projected on the inclined ceiling plane CL, to rotate the image Img1_T2 projected onto the inclined ceiling plane CL.

The first interface of the projector apparatus 2100 receives the signal transmitted from the second interface of the controller 200 and transmits the received signal to the second switcher 212 as the signal Sig1.

The second switcher 212 selects the terminal B shown in FIG. 18 in accordance with the switching signal sw2 generated by the control unit, and transmits the signal Sig1 to the second rotation processing unit 214.

The second rotation processing unit 214 performs the second rotation processing on the image D3 transmitted from the second selector SEL2 based on the signal Sig1, the three-dimensional shape data 3D_data, and the information P_prj on the projection point of the projection unit 3.

Note that the second rotation processing unit 214 may perform the second rotation processing on the image D3 transmitted from the correction unit 211 based on the signal Sig1 without using the three-dimensional shape data 3D_data and the information P_prj on the projection point of the projection unit 3. In this case, the three-dimensional shape data 3D_data and the information P_prj on the projection point of the projection unit 3 may not be inputted into the second rotation processing unit 214.

More specifically, the second rotation processing unit 214 performs conversion processing (second rotation processing) on the image D3 such that the image Img1_T2 is rotated counterclockwise in the direction indicated by the arrow Dir2 in FIG. 26 around the point Pc by an angle determined by the signal Sig1 as viewed from the point P1 to the inclined ceiling plane CL. The second rotation processing unit 214 then transmits the processed image as the image D31 (image signal D31) to the third selector SEL3.

The third selector SEL3 selects the terminal 1 shown in FIG. 18 in accordance with the selection signal sel3 generated by the control unit, and transmits the image D31 as the image D4 to the fourth selector SEL4.

The fourth selector SEL4 selects the terminal 1 shown in FIG. 18 in accordance with the selection signal sel4 generated by the control unit, and transmits the image D4 as the image D5 to the fifth selector SEL5.

The fifth selector SEL5 selects the terminal 1 shown in FIG. 18 in accordance with the selection signal sel5 generated by the control unit, and transmits the image D5 (=image D31) as the image Dout to the projection unit 3.

The projection unit 3 projects the image Dout (=image D31) from the fifth selector SEL5 onto the inclined ceiling plane CL by the projection axis Ax1 shown in FIG. 26. This causes the image Img1_T2 to be rotated in the direction Dir2 by a predetermined angle around the point Pc as viewed from the point P1 to the inclined ceiling plane CL.

Repeating the above operation causes the vertical center line L1$v$ of the image Img1_T2 to appear to the user to be a straight horizontal line as viewed from the user's viewpoint Vp. This state, in which the horizontal center line L1$h$ of the image Img1_T2 is parallel to a line connecting both eyes of the user, is referred to as "State 4".

Figure 27:
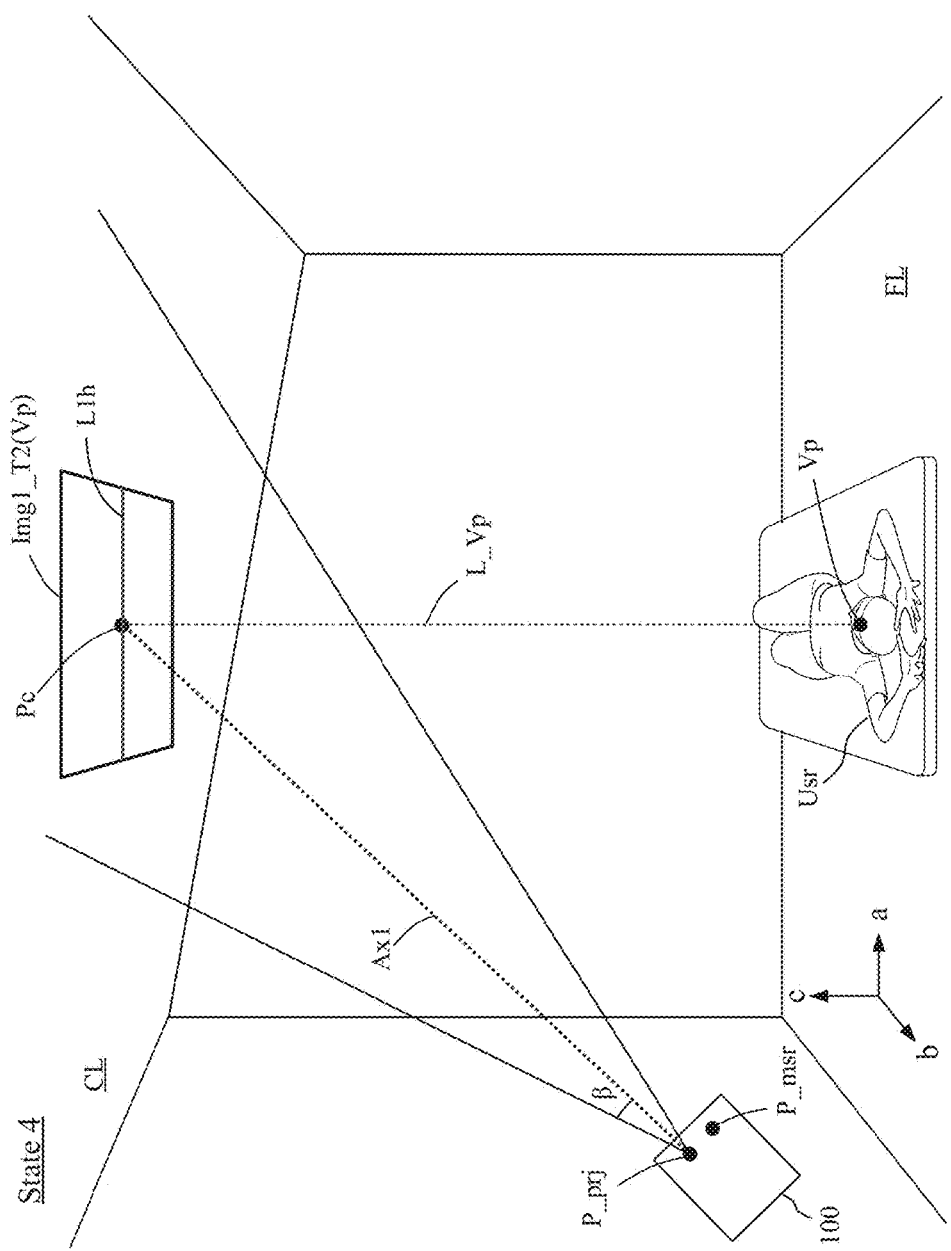
FIG. 27 is a diagram schematically showing the three-dimensional space in State 4.

FIG. 27 is a diagram schematically showing the three-dimensional space in State 4.

As can be seen from the FIG. 27, in State 4, the horizontal center line L1h of the test image Img1_T2(Vp) appears to be a straight horizontal line as viewed from the user's viewpoint Vp.

In state 4, the second rotation processing unit 214 obtains and holds the data for specifying a straight line including the horizontal center line L1h. Examples of data for specifying a straight line including the horizontal center line L1h include (1) data of an equation (a straight line equation) that defines the straight line and (2) data for specifying the coordinates of two different points included in the straight line.

The second rotation processing unit 214 then transmits a detection signal including data for specifying a straight line including the horizontal center line L1h as Det2 to the viewpoint identification processing unit 215.

After performing the second rotation processing as described above, the projection system 2000 performs the viewpoint identification processing.

2.2.6 Viewpoint Identification Processing

Next, the viewpoint identification processing will be described.

Figure 28:
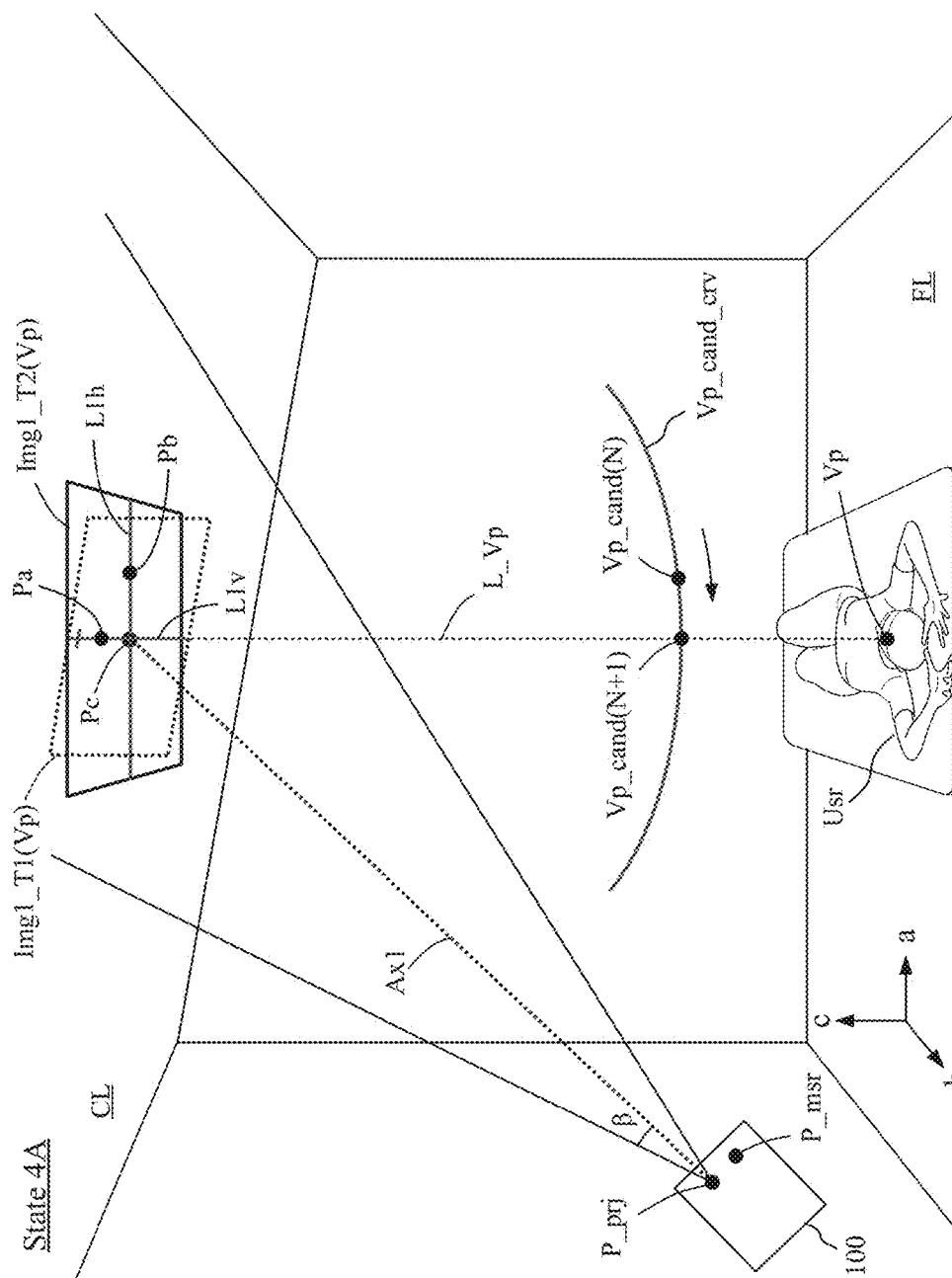
FIG. 28 is a diagram describing viewpoint identification processing.

FIG. 28 is a diagram describing the viewpoint identification processing. More specifically, FIG. 28 shows a test image Img1_T2 (Img1_T2(Vp)) projected on the inclined ceiling plane CL in State 4 with a test image Img1_T1 (Imp1_T2(Vp)) projected on the inclined ceiling plane CL in State 2 superimposed thereon.

The state shown in FIG. 28 is referred to as "State 4A".

FIG. 28 also shows a viewpoint candidate curve Vp_cand cry indicating candidate points of the viewpoint.

The intersection calculation unit 1511 of the viewpoint candidate obtaining unit 151 obtains first straight line data from the detection signal Det1 transmitted from the first rotation processing unit 213, and obtains the coordinates data Data(Pa) of the point Pa on the vertical center line L1v (the first line) in State 4A.

The intersection calculation unit 1511 obtains second straight line data from the detection signal Det2 transmitted from the second rotation processing unit 214, and obtains the coordinates data Data(Pb) of the point Pb on the horizontal center line L1h (the second line) in State 4A.

Further, the intersection calculation unit 1511 obtains the coordinates data Data(Pc) of the intersection Pc of the first straight line and the second straight line. For example, the intersection calculation unit 1511 obtains an equation for defining the first straight line and an equation for defining the second straight line, and then obtains the coordinates data Data(Pc) (=(cx, cy, cz)) of the intersection Pc of the first straight line and the second straight line through calculation using the obtained equation for defining the first straight line and the obtained equation for defining the second straight line.

Note that the intersection calculation unit 1511 obtains the coordinates data of the points Pa, Pb, and Pc in the xyz space defined by the x-axis, the y-axis, and the z-axe shown in FIG. 21 as the following data.

Data(Pa)=(ax, ay, az)
Data(Pb)=(bx, by, bz)
Data(Pc)=(cx, cy, cz)

The intersection calculation unit 1511 transmits the obtained data Data(Pa) of the Pa and the obtained data Data(Pb) of the point Pb to the coefficient calculation unit 1512.

From the data Data(Pa) of the point Pa and the data Data(Pb) of the point Pb, the coefficient calculation unit 1512 obtains coefficients A, B, and C through processing corresponding to the following:

$$A = -a_x \times b_y + a_y \times b_x$$

$$B = -a_x \times b_z + a_z \times b_x$$

$$C = -a_z \times b_y + a_y \times b_z$$

The coefficient calculation unit 1512 transmits information (data) on the obtained coefficients A, B, and C to the transformation matrix obtaining unit 1513.

Using the coefficients A, B, and C and the data Data(Pa) of the point Pa, the transformation matrix obtaining unit 1513 obtains transformation matrices Rx, Ry, and Rz by performing processing corresponding to the following formulae.

Formula 1

$$Rx = \frac{1}{\sqrt{A^2+B^2}} \begin{pmatrix} \sqrt{A^2+B^2} & 0 & 0 \\ 0 & A & B \\ 0 & -B & A \end{pmatrix} \quad (1)$$

Formula 2

$$Ry = \frac{1}{\sqrt{A^2+B^2+C^2}} \begin{pmatrix} \sqrt{A^2+B^2} & 0 & C \\ 0 & \sqrt{A^2+B^2+C^2} & 0 \\ -C & 0 & \sqrt{A^2+B^2} \end{pmatrix} \quad (2)$$

Formula 3

$$Rz = \frac{1}{k1} \begin{pmatrix} a_y A + a_z B & -a_x \sqrt{A^2+B^2+C^2} & 0 \\ a_x \sqrt{A^2+B^2+C^2} & a_y A + a_z B & 0 \\ 0 & 0 & k1 \end{pmatrix} \quad (3)$$

$$k1 = \sqrt{a_x^2(A^2+B^2+C^2)+(a_y A+a_z B)^2}$$

The transformation matrix obtaining unit 1513 then transmits data on the obtained transformation matrices Rx, Ry, and Rz to the transformation matrix combining unit 1514.

From the transformation matrices Rx, Ry, and Rz, the transformation matrix combining unit 1514 obtains the composite matrix R through processing (multiplication of matrices) corresponding to the following:

$$R = Rz \cdot Ry \cdot Rx$$

The transformation matrix combining unit 1514 then transmits the data on the obtained composite matrix R to the inverse transformation matrix obtaining unit 1515 and the transformation unit 1516.

The inverse transformation matrix obtaining unit 1515 obtains an inverse transformation matrix $R^{-1}$ from the composite matrix R and transmits the data on the obtained inverse transformation matrix $R^{-1}$ to the viewpoint candidate point calculation unit 1519.

The transformation unit 1516 obtains data (coordinates data) on the point Pb' by performing processing corresponding to the following formula using the composite matrix R and the data Data(Pb) of the point Pb.

Formula 4

$$\begin{pmatrix} b'_x \\ b'_y \\ b'_z \end{pmatrix} = R \begin{pmatrix} b_x \\ b_y \\ b_z \end{pmatrix} \quad (4)$$

The transformation unit 1516 then transmits the data Data(Pb') (=(bx', by', bz')) on the obtained point Pb' to the coefficient obtaining unit 1517 and the viewpoint candidate point calculation unit 1519.

The angle obtaining unit 1518 receives the signal Sig1 transmitted from the first interface 6, and obtains the angle θ based on the signal Sig1. For example, when receiving the signal Sig1, the angle obtaining unit 1518 varies the angle θ by a predetermined angle from the angle set before receiving the signal Sig based on the signal value of the signal Sig1.

The angle obtaining unit 1518 then transmits data on the obtained angle θ to the coefficient obtaining unit 1517 and the viewpoint candidate point calculation unit 1519.

Based on the data Data(Pb') and the angle θ, the coefficient obtaining unit 1517 obtains the coefficient A' through processing corresponding to the following formula.

Formula 5

$$A' = b'^2_y + b'^2_x \sin^2\theta \quad (5)$$

The coefficient obtaining unit 1517 then transmits the data on the obtained coefficient A' to the viewpoint candidate point calculation unit 1519.

Based on the data Data(Pc), the angle θ, the coefficient A', the data Data(Pb'), and the inverse transformation matrix $R^{-1}$, the viewpoint candidate point calculation unit 1519 performs processing corresponding to the following formulae to obtain the coordinates data Vp_cand (=(x, y, z)) of the viewpoint candidate point.

(1) when by'>0 (−π/2<θ<0) is satisfied

Formula 6

$$\begin{pmatrix} x \\ y \\ z \end{pmatrix} = \frac{R^{-1}}{\sqrt{A'}} \begin{pmatrix} b'_x \sin^2\theta \\ b'_y \\ -b'_x \sin\theta\cos\theta \end{pmatrix} + \begin{pmatrix} c_x \\ c_y \\ c_z \end{pmatrix} \quad (6)$$

(2) When by '≤0' (0<θ<π/2) is satisfied

Formula 7

$$\begin{pmatrix} x \\ y \\ z \end{pmatrix} = \frac{R^{-1}}{\sqrt{A'}} \begin{pmatrix} b'_x \sin^2\theta \\ b'_y \\ -b'_x \sin\theta\cos\theta \end{pmatrix} + \begin{pmatrix} c_x \\ c_y \\ c_z \end{pmatrix} \quad (7)$$

The viewpoint candidate point calculation unit 1519 then transmits the coordinates data Vp_cand (=(x, y, z)) of the viewpoint candidate point obtained by the above processing to the projection image obtaining unit 152.

As described above, the projection system 2000 performs the viewpoint identification processing.

Figure 29:
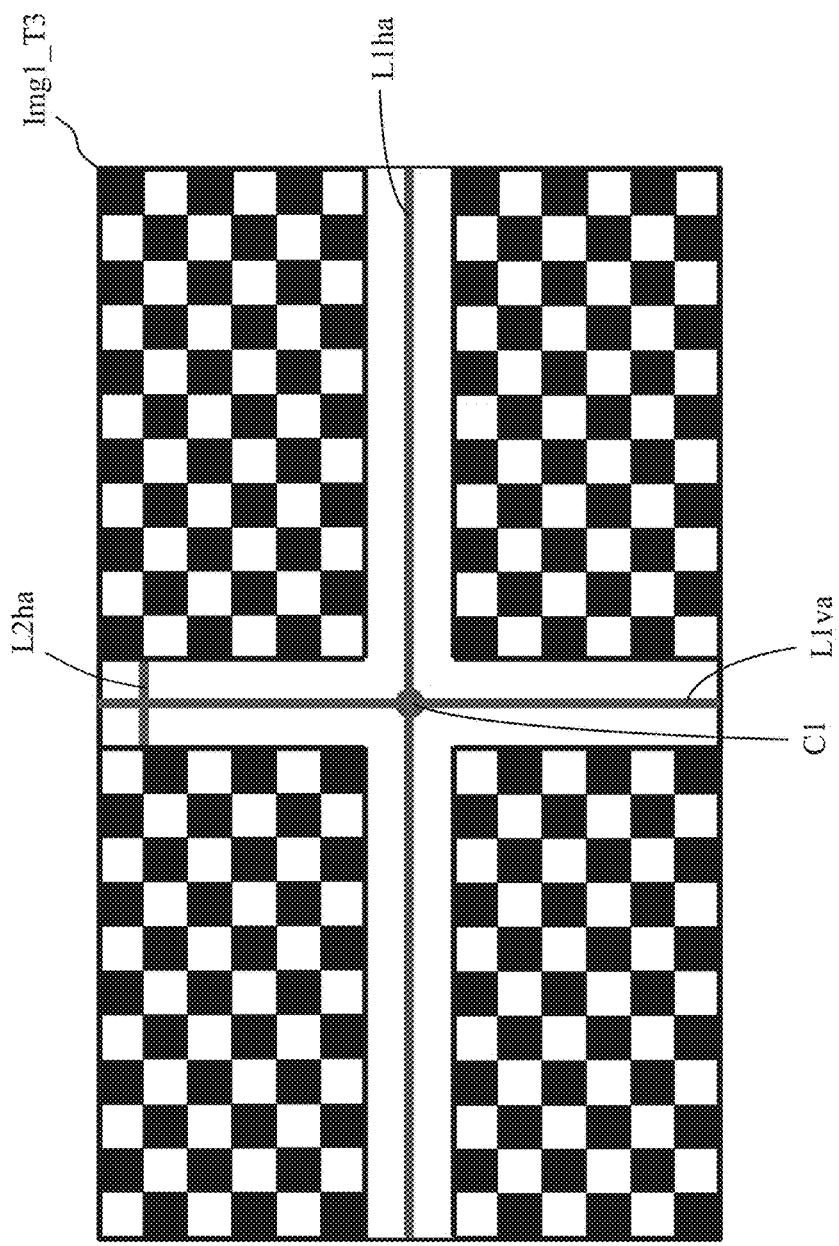
FIG. 29 shows an example of a third test image Img1_T3.

FIG. 29 shows an example of a third test image Img1_T3, which is an example of the test image Img1. The third test image Img1_T3 is an image used for the viewpoint identification processing.

As shown in FIG. 29, the third test image Img1_T3 is a rectangular image. As shown in FIG. 29, the third test image Img1_T3 is a pattern image that has a vertical center line L1*va* extending in the longitudinal direction (in the vertical direction) at the center in the lateral direction (the horizontal direction) of the image, a horizontal line L2*ha* extending in the lateral direction (in the horizontal direction) in the upper portion of the image, and a circular dot C1 at the center of the image. As shown in FIG. 29, the third test image Img1_T3 is a pattern image that also has a horizontal center line L1*ha* extending in the lateral direction (in the horizontal direction) at the center in the longitudinal direction (the vertical direction) of the image.

In the third test image Img1_T3 shown in FIG. 29, the portion where the intersection of the line L1*va* and the line L2*ha* exists is the upper portion of the image.

Further, as shown in FIG. 29, the third test image Img1_T3 is an image in which a first lattice pattern which is a square pattern of a white background and a second pattern which is a square pattern of a black background are alternately arranged in the horizontal and vertical directions.

Note that the third test image Img1_T3 shown in FIG. 29 is an example; for an image used for the viewpoint identification processing, another image in which the user can easily recognize distortion in projecting the image may be employed.

When the projection system 2000 performs the viewpoint identification processing, the third test image Img1_T3 is transmitted from the test image storage unit 2 to the first selector SEL1 of the projected image adjustment unit 201.

Then, selecting the terminal 0 by the first selector and selecting the terminal 0 by the first switcher SW1 causes the third test image Img1_T3 to be inputted into the viewpoint identification processing unit 215.

Based on the three-dimensional shape data 3D_data and information P_prj on the projection point of the projection unit 3, the projection image obtaining unit 152 of the viewpoint identification processing unit 215 converts the input third test image Img1_T3 into an image without geometric distortion as viewed from a viewpoint candidate point identified by the coordinates data Vp_cand (=(x, y, z)). The projection image obtaining unit 152 then transmits the converted image as the image D41 (image signal D41) to the fourth selector SEL4.

The image D41 is then transmitted from the fifth selector SEL5 to the projection unit 3 as the image Dout.

The projection unit 3 projects the image Dout (image D41) onto the inclined ceiling CL.

The user operates the controller 200 such that the degree of distortion of the third test image Img1_T3 projected on the inclined ceiling CL becomes small.

In accordance with the operation of the user's controller 200, the projection system 2000 repeatedly performs the above-described viewpoint identification processing.

In FIG. 28, an identified viewpoint candidate point after N-th (N is a natural number) viewpoint identification processing has been performed is indicated as Vp_cand(N); an identified viewpoint candidate point after N+1-th viewpoint identification processing has been performed is indicated as Vp_cand(N+1). It is assumed that the viewpoint candidate point Vp_cand(N+1) exists on a straight line connecting the point Pc and the user's viewpoint Vp.

When the user operates the controller 200 to perform the N+1-th viewpoint identification processing, the viewpoint candidate point is set to Vp_cand(N+1); accordingly, the image without geometric distortion viewed from the user's viewpoint Vp is projected on the inclined ceiling CL.

Figure 30:
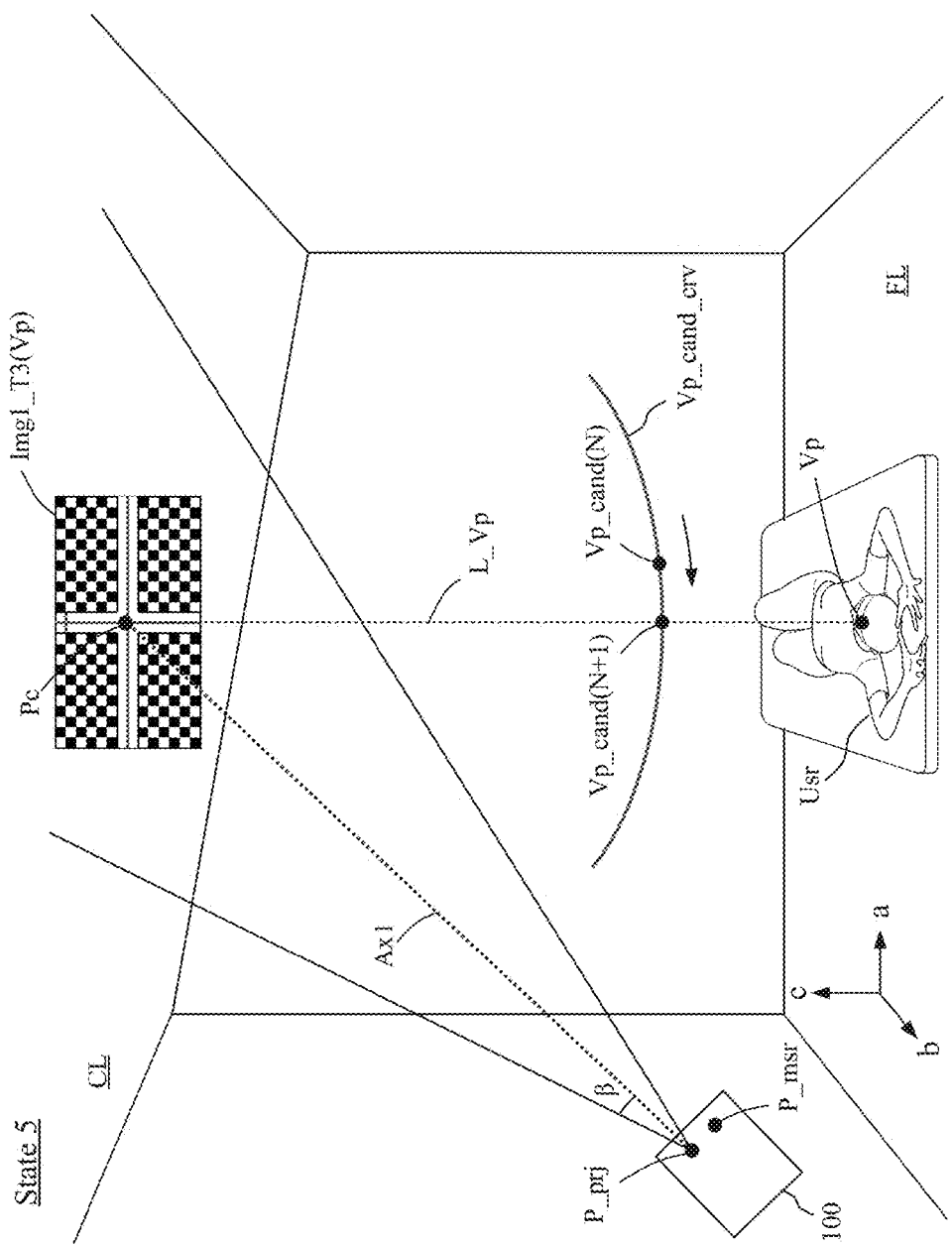
FIG. 30 is a diagram showing a state in which the third test image Img1_T3 is projected on the inclined ceiling CL when the projection system 2000 performs N+1-th viewpoint identification processing and a viewpoint candidate point is identified to Vp_cand(N+1).

FIG. 30 is a diagram showing a state in which the third test image Img1_T3 is projected on the inclined ceiling CL when the projection system 2000 performs N+1-th viewpoint identification processing and a viewpoint candidate point is identified to Vp_cand(N+1) (this state is referred to as "State 5").

As can be seen from FIG. 30, the viewpoint candidate point Vp_cand(N+1) exists on the straight line connecting the point Pc and the user's viewpoint Vp, and thus, in State 5, the third test image Img1_T3 appears to the user to be an image without geometric distortion as viewed from the user.

As described above, the viewpoint identification processing is performed in the projection system 2000, thus allowing for projecting an image without geometric distortion (reduced geometric distortion) as viewed from the user's viewpoint Vp on the inclined ceiling plane CL.

The user confirms the state (State 5) in which the geometric distortion of the image projected on the inclined ceiling plane CL is sufficiently reduced and then terminates the adjustment processing in the projector apparatus 2100 (the adjustment processing for reducing geometric distortion of the image). For example, the user operates the controller 200 to terminate the adjustment processing (adjustment processing for reducing geometric distortion of the image) in the projector apparatus 2100.

The projector apparatus 2100 receives a signal, from the controller 200, for terminating the adjustment processing (adjustment processing for reducing geometric distortion of the image) in the projector apparatus 2100.

When receiving the signal from the controller 200, the projector apparatus 2100 maintains a state in which an image is projected on the inclined ceiling using the current settings.

When the projector apparatus 2100 is switched to a mode for displaying (projecting) the image signal (or video signal) Din, the projector apparatus 2100 causes the first selector SEL1 to select the terminal 1, and causes the first switcher SW1 to select the terminal 0, thereby transmitting the image signal Din to the viewpoint identification processing unit 215. The viewpoint identification processing unit 215 then converts the image Din into an image without geometric distortion as viewed from the user's viewpoint Vp (the point Vp_cand(N+1)), and transmits the converted image to the fourth selector SEL4 as the image D41.

In the projector apparatus 2100, the terminal 0 is selected in the fourth selector SEL4 and the terminal 1 is selected in the fifth selector. This causes the image D41 to be transmitted to the projection unit 3 as the image Dout.

The projection unit 3 of the projector apparatus 2100 projects the image Dout (image D41) onto the inclined ceiling CL.

This allows the image Din (or the video Din) inputted into the projector apparatus 2100 to be projected onto the inclined ceiling plane CL without geometric distortion (with less geometric distortion) as viewed from the user's viewpoint Vp.

As described above, the projection system 2000 projects a test image, in which the upper portion can be recognized when the image is displayed, onto the inclined ceiling plane CL, and the user operates the controller 200 to causes the projector apparatus 2100 to perform the following processes (1) to (3), thereby allowing for eliminating (reducing) geometric distortion in the image projected onto the inclined ceiling plane CL.

(1) Processing (first rotation processing) for rotating the projected image in the inclined ceiling plane CL such that the vertical center line L1v of the first test image Img1_T1 appears to be vertical as viewed from the user.

(2) Processing (second rotation processing) for rotating the projected image in the inclined ceiling plane CL such that the horizontal center line L1h of the second test image Img1_T2 appears to be horizontal as viewed from the user.

(3) Processing (viewpoint identification processing) for identifying a viewpoint candidate point based on a first straight line including the vertical center line L1v of the first test image Img1_T1 projected on the inclined ceiling CL after completing the first rotation processing and a second straight line including the horizontal center line L1h of the second test image Img1_T2 projected on the inclined ceiling CL after completing the second rotation processing, and for generating an image without geometric distortion as viewed from the identified viewpoint candidate point, and for projecting the generated image on the inclined ceiling CL.

Thus, the projection system 2000 easily and appropriately eliminates (reduces) geometric distortion of an image projected on an inclined plane (e.g., an inclined ceiling) without using a device having a photographing function.

2.3 Projection Method

Next, a projection method performed in the projection system 2000 will be described.

Figure 31:
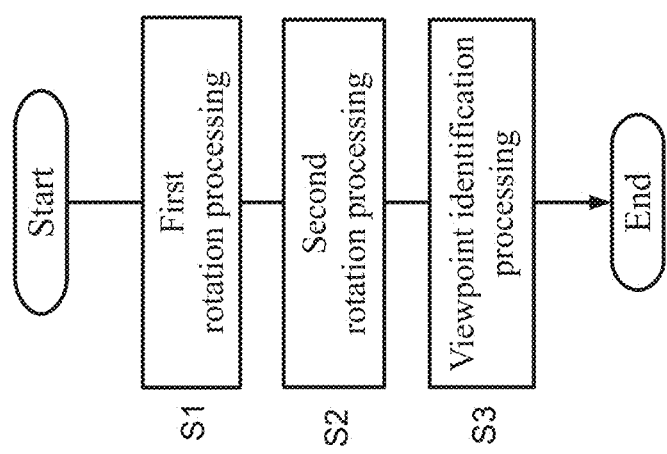
FIG. 31 is a flowchart of a projection method performed in the projection system 2000.

FIG. 31 is a flowchart of the projection method performed in the projection system 2000.

Figure 32:
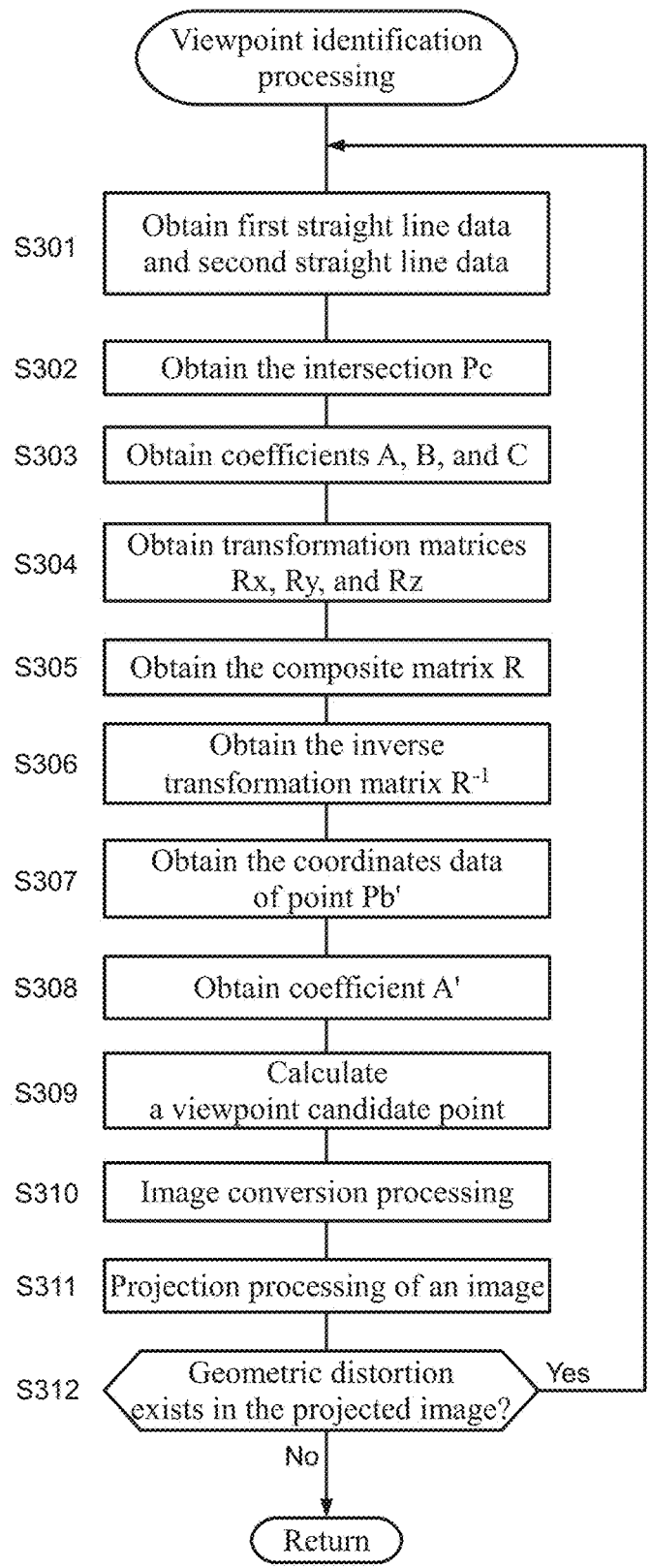
FIG. 32 is a flowchart showing viewpoint identification processing of the projection method performed in the projection system 2000.

FIG. 32 is a flowchart showing viewpoint identification processing of the projection method performed in the projection system 2000.

The projection method performed in the projection system 2000 will now be described with reference to the flowcharts in FIGS. 31 and 32.

Step S1:

In step S1, the projection system 2000 performs first rotation processing.

The first rotation processing is the same processing as one described in the above "2.2.3 First Rotation Processing".

In the first rotation processing, for example, the first test image Img1_T1 shown in FIG. 22 is projected onto the inclined ceiling CL by the projector apparatus 2100.

Then, the user operates the controller 200 until the vertical center line L1v appears to be a vertical straight line in the first test image Img1_T1 projected on the inclined ceiling CL.

Step S2:

In step S2, the projection system 2000 performs the second rotation processing.

The second rotation processing is the same processing as one described in the above "2.2.5 Second Rotation Processing".

In the second rotation processing, for example, the second test image Img1_T2 shown in FIG. 25 is projected onto the inclined ceiling CL by the projector apparatus 2100.

Then, the user operates the controller 200 until the horizontal center line L1h appears to be a horizontal straight line in the second test image Img1_T2 projected on the inclined ceiling CL.

Step S3:

In step S3, the projection system 2000 performs viewpoint identification processing.

The viewpoint identification processing is the same processing as one described in the above "2.2.6 Viewpoint Identification Processing".

Step S301:

In step S301, the intersection calculation unit 1511 of the viewpoint candidate obtaining unit 151 obtains the data of the first straight line from the detection signal Det1 transmitted from the first rotation processing unit 213, and obtains coordinates data Data(Pa) (=(ax, ay, az)) of the point Pa on the line (first straight line) including the vertical center line L1ν in State 4A.

Further, the intersection calculation unit 1511 obtains the data of the second straight line from the detection signal Det2 transmitted from the second rotation processing unit 214, and obtains coordinates data Data(Pb) (=(bx, by, bz)) of the point Pb on the line (second straight line) including the horizontal center line L1h in State 4A.

Step S302:

In step S302, the intersection calculation unit 1511 obtains coordinates data Data(Pc) (=(cx, cy, cz)) of the intersection Pc of the first straight line and the second straight line. For example, the intersection calculation unit 1511 obtains an equation for defining the first straight line and an equation for defining the second straight line, and then obtains the coordinates data Data(Pc)(=(cx, cy, cz)) of the intersection Pc of the first straight line and the second straight line through calculation using the obtained equation for defining the first straight line and the obtained equation for defining the second straight line.

Note that the intersection calculation unit 1511 obtains the coordinates data of the points Pa, Pb, and Pc in the xyz space defined by the x-axis, the y-axis, and the z-axe shown in FIG. 21 as the following data.

Data(Pa)=(ax, ay, az)
Data(Pb)=(bx, by, bz)
Data(Pc)=(cx, cy, cz)

Step S303:

In step S303, from the data Data(Pa) of the point Pa and the data Data(Pb) of the point Pb, the coefficient calculation unit 1512 obtains coefficients A, B, and C through processing corresponding to the following:

$$A=-ax\times by+ay\times bx$$

$$B=-ax\times bz+az\times bx$$

$$C=-az\times by+ay\times bz$$

Step S304:

In step S304, using the coefficients A, B, and C and the data Data(Pa) of the point Pa, the transformation matrix obtaining unit 1513 obtains transformation matrices Rx, Ry, and Rz by performing processing corresponding to the following formulae.

Formula 8

$$Rx = \frac{1}{\sqrt{A^2+B^2}} \begin{pmatrix} \sqrt{A^2+B^2} & 0 & 0 \\ 0 & A & B \\ 0 & -B & A \end{pmatrix} \quad (8)$$

Formula 9

$$Ry = \frac{1}{\sqrt{A^2+B^2+C^2}} \begin{pmatrix} \sqrt{A^2+B^2} & 0 & C \\ 0 & \sqrt{A^2+B^2+C^2} & 0 \\ -C & 0 & \sqrt{A^2+B^2} \end{pmatrix} \quad (9)$$

Formula 10

$$Rz = \frac{1}{k1} \begin{pmatrix} a_y A + a_z B & -a_x\sqrt{A^2+B^2+C^2} & 0 \\ a_x\sqrt{A^2+B^2+C^2} & a_y A + a_z B & 0 \\ 0 & 0 & k1 \end{pmatrix} \quad (10)$$

$$k1 = \sqrt{a_x^2(A^2+B^2+C^2)+(a_y A + a_z B)^2}$$

Step S305:

In step S305, from the transformation matrices Rx, Ry, and Rz, the transformation matrix combining unit 1514 obtains the composite matrix R through processing (multiplication of matrices) corresponding to the following:

$$R=Rz\cdot Ry\cdot Rx$$

Step S306:

In step S306, the inverse transformation matrix obtaining unit 1515 obtains an inverse transformation matrix $R^{-1}$ from the composite matrix R.

Step S307:

In step S307, the transformation unit 1516 obtains data (coordinates data) on the point Pb' by performing processing corresponding to the following formula using the composite matrix R and the data Data(Pb) of the point Pb.

Formula 11

$$\begin{pmatrix} b'_x \\ b'_y \\ b'_z \end{pmatrix} = R \begin{pmatrix} b_x \\ b_y \\ b_z \end{pmatrix} \quad (11)$$

Step S308:

In step S308, the angle obtaining unit 1518 receives the signal Sig1 transmitted from the first interface 6, and obtains the angle θ based on the signal Sig1. For example, when receiving the signal Sig1, the angle obtaining unit 1518 varies the angle θ by a predetermined angle from the angle set before receiving the signal Sig based on the signal value of the signal Sig1.

Based on the data Data(Pb') and the angle θ, the coefficient obtaining unit 1517 obtains the coefficient A' through processing corresponding to the following formula.

Formula 12

$$A'=b_y'^2+b_x'^2\sin^2\theta \quad (12)$$

Step S309:

In step S309, based on the data Data(Pc), the angle θ, the coefficient A', the data Data(Pb'), and the inverse transformation matrix $R^{-1}$, the viewpoint candidate point calculation unit 1519 performs processing corresponding to the following formulae to obtain the coordinates data Vp_cand (=(x, y, z)) of the viewpoint candidate point.

(1) when by'>0 (−π/2<θ<0) is satisfied

Formula 13

$$\begin{pmatrix} x \\ y \\ z \end{pmatrix} = \frac{R^{-1}}{\sqrt{A'}} \begin{pmatrix} b'_x\sin^2\theta \\ b'_y \\ -b'_x\sin\theta\cos\theta \end{pmatrix} + \begin{pmatrix} c_x \\ c_y \\ c_z \end{pmatrix} \quad (13)$$

(2) When by'≤0' (0<θ<π/2) is satisfied

Formula 14

$$\begin{pmatrix} x \\ y \\ z \end{pmatrix} = \frac{R^{-1}}{\sqrt{A'}} \begin{pmatrix} -b'_x \sin^2\theta \\ -b'_y \\ b'_x \sin\theta\cos\theta \end{pmatrix} + \begin{pmatrix} c_x \\ c_y \\ c_z \end{pmatrix} \quad (14)$$

Step S310:

In step S310, based on the three-dimensional shape data 3D_data and the information P_prj on the projection point of the projection unit 3, the projection image obtaining unit 152 converts the received third test image Img1 (Img1_T3) into an image without geometric distortion viewed from a viewpoint candidate point identified by the coordinates data Vp_cand.

Step S311:

In step S311, the projection unit 3 projects the image (image Dout (image D41)) obtained in step S310 onto the inclined ceiling CL.

Step S312:

In step S312, the user determines whether the distortion of the third test image Img1_T3 projected on the inclined ceiling CL is not present (is sufficiently reduced).

If it is determined that the distortion of the third test image Img1_T3 projected on the inclined ceiling CL is not sufficiently reduced, the process returns to step S301. Conversely, if it is determined that the distortion of the third test image Img1_T3 projected on the inclined ceiling CL is sufficiently reduced, the process is terminated (the viewpoint identification processing is terminated).

As described above, the projection system 2000 projects a test image, in which the upper portion can be recognized when the image is displayed, onto the inclined ceiling plane CL, and the user operates the controller 200 to causes the projector apparatus 2100 to perform the following processes (1) to (3), thereby allowing for eliminating (reducing) geometric distortion in the image projected onto the inclined ceiling plane CL.

(1) Processing (first rotation processing) for rotating the projected image in the inclined ceiling plane CL such that the vertical center line L1v of the first test image Img1_T1 appears to be vertical as viewed from the user.

(2) Processing (second rotation processing) for rotating the projected image in the inclined ceiling plane CL such that the horizontal center line L1h of the second test image Img1_T2 appears to be horizontal as viewed from the user.

(3) Processing (viewpoint identification processing) for identifying a viewpoint candidate point based on a first straight line including the vertical center line L1v of the first test image Img1_T1 projected on the inclined ceiling CL after completing the first rotation processing and a second straight line including the horizontal center line L1h of the second test image Img1_T2 projected on the inclined ceiling CL after completing the second rotation processing, and for generating an image without geometric distortion as viewed from the identified viewpoint candidate point, and for projecting the generated image on the inclined ceiling CL.

Thus, The projection method performed in the projection system 2000 easily and appropriately eliminates (reduces) geometric distortion of an image projected on an inclined plane (e.g., an inclined ceiling) without using a device having a photographing function.

<<Principle of Viewpoint Identification Processing>>

The principle of the viewpoint identification processing will now be described.

Three different points in the three-dimensional space (xyz coordinate space) are defined as follows:
A0=(ax0, ay0, az0)
B0=(bx0, by0, bz0)
C0=(cx0, cy0, cz0)

Let Px be a point from which a vector Vec(C0, A0) (a vector from the point C0 to the point A0) appears to be orthogonal to a vector Vec(C0, B0) (a vector from the point C0 to the point B0).

Identifying the point Px is a problem (proposition) to be solved.

To solve this problem, the following two processes may be performed.

(1) Finding a geometric transformation that generates a state in which the vector Vec(C0, A0) appears to be orthogonal to the vector Vec(C0, B0) as viewed from a point P0 (e.g., a point whose coordinates are (0, 0, 1); a point on the z-axis). For ease of explanation, a case in which the point P0 is set to a point whose coordinates are (0, 0, 1) will now be described.
P0=GmtrCnv(Px)
Px=(x, y, z)
P0=(0, 0, 1)
GmtrCnv: geometric transformation (2) As viewed from a point obtained by performing the inverse transformation of the geometric transformation found in the process (1), the vector Vec(C0, A0) shall appear to be orthogonal to the vector Vec(C0, B0). Therefore, by performing processing corresponding to the formula below, the point Px from which the vector Vec(C0, A0) (the vector from the point C0 to the point A0) appears to be orthogonal to the vector Vec(C0, B0) (the vector from the point C0 to the point B0) can be calculated.

$Px = GmtrCnv^{-1}(P0)$ $GmtrCnv^{-1}$: inverse transformation of the geometric transformation GmtrCnv In the following, a vector from a point m0 to a point m1 is referred to as Vec(m0, m1).

FIG. 33 is a diagram for describing the principle of the viewpoint identification processing.

The point A0, the point B0, and the point C0 may be set to any point as long as they are three different points; for ease of explanation, a case in which the point C0 is set to the origin (=(0, 0, 0)) will now be described. More specifically, the case shown in FIG. 33(b) will now be described. In other words, a case in which the following is satisfied will now be described.
A0=(ax, ay, az)
B0=(bx, by, bz)
C0=(0, 0, 0)

The rotation processing is performed such that the vector Vec(C0, A0) overlaps with the y-axis and the vector Vec(C0, B0) is on the x-y plane. This rotation processing is achieved through rotation processing including rotation processing for rotating around the x-axis, rotation processing for rotating around the y-axis, and rotation processing for rotating around the z-axis.

Then, assuming that points after the rotation processing are a point A0', a point B0', and a point C0', respectively, the coordinates of the points A0', B0', and C0' can be expressed as follows.
A0'=(ax', ay ', az')=(0, ay', 0)
B0'=(bx', by', bz')=(bx', by', 0)

The matrix for performing the above rotation processing can be expressed as follows.

$$R = Rx \cdot Ry \cdot Rz$$

Note that Rx is a matrix representing rotation processing around the x-axis, Ry is a matrix representing rotation processing around the y-axis, Rz is a matrix representing rotation processing around the z-axis.

Figure 34:
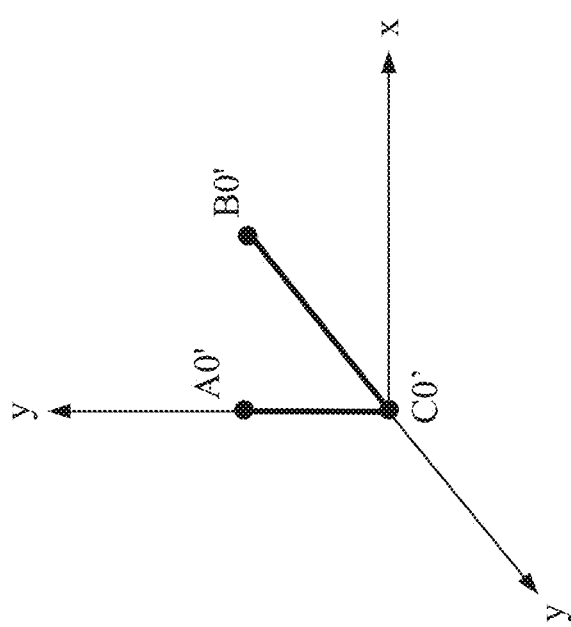
FIG. 34 is a diagram showing points A0', B0', and C0' in a three-dimensional coordinate space.

FIG. 34 is a diagram showing points A0', B0', and C0"(=point C0) after the above processing is performed.

Next, in order to achieve a state in which the vector Vec(C0', A0') is on the y-z plane and Vec(C0', B0') is on the x-z plane, rotation processing around the y-axis is performed and then rotation processing around the z-axis is performed.

Assuming that points after the rotation processing are a point A0", a point B0", and a point C0", respectively, the coordinates of the points A0", B0", and C0" can be expressed as follows.

A0"=(ax", ay", az")=(0, ay", az")

B0"=(bx", by", bz")=(bx", 0, bz")

Figure 35:
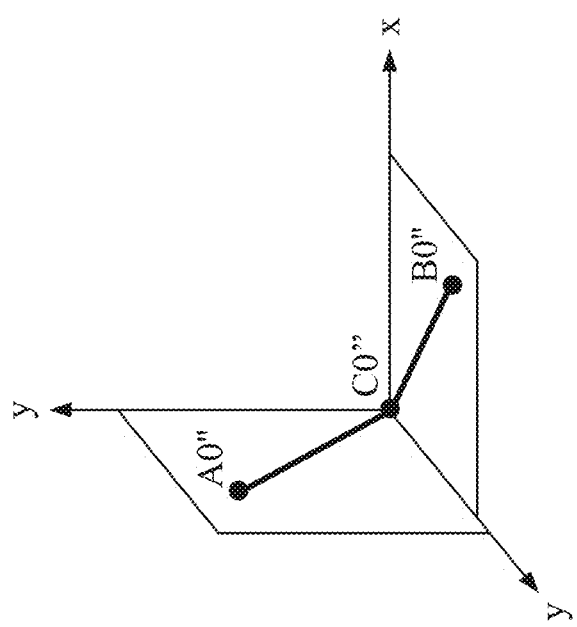
FIG. 35 is a diagram showing points A0", B0", and C0" in the three-dimensional coordinate space.

FIG. 35 is a diagram showing points A0", B0", and C0" after performing the above processing.

The rotation matrix R' for performing the above rotation processing is as follows.

Formula 15

$$R' = Rx'(\rho)Ry'(\theta) \quad (15)$$
$$= \begin{pmatrix} 1 & 0 & 0 \\ 0 & \cos\rho & -\sin\rho \\ 0 & \sin\rho & \cos\rho \end{pmatrix} \begin{pmatrix} \cos\theta & 0 & \sin\theta \\ 0 & 1 & 0 \\ -\sin\theta & 0 & \cos\theta \end{pmatrix}$$

Note that $\rho$ is the rotation angle of the rotation processing around the x-axis and $\theta$ is the rotation angle of the rotation processing around the y-axis.

Then, from the coordinates relation before and after the rotation processing, the rotation matrix R' is calculated as follows.

Formula 16

$$R' = \frac{1}{k2}\begin{pmatrix} \cos\theta & 0 & \sin\theta \\ \pm b'_y\sin\theta & \mp b'_x\sin\theta & \mp b'_y\cos\theta \\ \pm b'_x\sin^2\theta & \pm b'_y & \mp b'_x\sin\theta\cos\theta \end{pmatrix} \quad (16)$$

$$k2 = \sqrt{b'^2_y + b'^2_x\sin^2\theta}$$

As viewed from a point (this point is assumed to be a point Vp (=(x, y, z))) obtained by performing the inverse transformation of the geometric transformation with respect to the point P0 (in the above P0=(0, 0, 1)), the vector Vec(C0, A0) shall appear to be orthogonal to the vector Vec(C0, B0).

In other words, the relationship represented by the following formula is satisfied.

Formula 17

$$Vp = \begin{pmatrix} x \\ y \\ z \end{pmatrix} = R^{-1}R'^T V' + \begin{pmatrix} c_x \\ c_y \\ c_z \end{pmatrix} = R^{-1}R'^T \begin{pmatrix} 0 \\ 0 \\ 1 \end{pmatrix} + \begin{pmatrix} c_x \\ c_y \\ c_z \end{pmatrix} \quad (17)$$

$$= \frac{R^{-1}}{\sqrt{b'^2_y + b'^2_x\sin^2\theta}} \begin{pmatrix} \pm b'_x\sin^2\theta \\ \pm b'_y \\ \mp b'_x\sin\theta\cos\theta \end{pmatrix} + \begin{pmatrix} c_x \\ c_y \\ c_z \end{pmatrix}$$

V'=(0, 0, 1)

Assuming that a vector from the point Pc to the point Pa in FIG. 28 (state 4A) is set to the above vector Vec(C0, A0) and the vector from the point Pc to the point Pb in FIG. 28 (state 4A) is set to the above vector Vec(C0, B0), a point (viewpoint candidate point Vp) from which a straight line (first straight line) passing through the points Pc and Pa in FIG. 28 (State 4A) appears to be orthogonal to a straight line (second straight line) passing through the points Pc and Pb can be calculated in the same manner as described above.

Based on the above principle, the viewpoint identification processing is performed.

OTHER EMBODIMENTS

In the above embodiments (including the modification), the first interface, the second interface, and/or the third interface may be an interface for wireless communication or an interface for cable communication.

In the above embodiments, the controller 200 has two buttons, which are the first button and the second button, and when the user operates the first button or the second button to perform the rotation processing or the keystone correction processing; however, the present invention should not be limited to this structure (this case). For example, the controller 200 may have two buttons for the rotation processing, and may additionally have two buttons for the keystone correction processing. Further, the controller 200 may have an interface other than buttons. For example, the controller 200 may have a joystick, and the user operates the joystick to cause the projector apparatus 100 to perform the rotation processing or the keystone correction processing. Alternatively, the controller 200 may have a display panel with a touch panel function, display icons on the display panel, and assign an execution function of the rotation processing or the keystone correction processing to icons; then, the user may operate the icons to cause the rotation processing or the keystone correction processing to be performed.

In the above embodiments, the test image used in the projection system should not be limited to the image shown in FIG. 4; any image for which a user can intuitively recognize a state for rotation of a projected image or a state for keystone correction for the projected image when the projection system 1000 projects an image in performing the rotation processing may be employed as the test image.

Further, the test image used in the projection system should not be limited to a rectangular image; for example, it may be an image having another shape (other contour) such as an image having a circular shape or an image having an elliptical shape.

Further, in the above embodiments, the projection plane used in the projection system is described as a ceiling of a plane horizontal to the floor, but the present invention is not limited thereto; for example, the projection plane may be a plane obtained by rotating a plane horizontal to the floor around the axis that appears to the user to be a horizontal straight line as viewed from the user's viewpoint.

In other words, a plane (forward inclined plane) which is not inclined to either the left or the right and is inclined in the forward direction as viewed from the user may be used as the projection plane. Also, a plane (backward inclined plane) which is not inclined to either the left side or the right side and is inclined in the backward direction as viewed from the user may be used as the projection plane.

In other words, a plane parallel to a straight line connecting the left eye viewpoint and right eye viewpoint of the user may be used as the projection plane in the projection system of the present invention.

The present invention is also applicable to the case of using such a projection plane.

Further, in the above-described embodiments (including the modification), a case in which the controller 200 has two buttons, which are the first button and the second button, and the user operates the first button or the second button to perform the first rotation processing, the second rotation processing, and/or the keystone correction processing is described; however the present invention should not be limited to this structure (this case). For example, the controller 200 may have two buttons for the first rotation processing, two buttons for the second rotation processing, and two buttons for the viewpoint identification processing, separately. Further, the controller 200 may have an interface other than buttons. For example, the controller 200 may have a joystick, and the user operates the joystick to cause the projector apparatus 2100 to perform the first rotation processing, the second rotation processing, and/or the viewpoint identification processing. Alternatively, the controller 200 may have a display panel with a touch panel function, display icons on the display panel, and assign an execution function of the first rotation processing, the second rotation processing and/or the viewpoint identification processing to icons; then, the user may operate the icons to cause the first rotation processing, the second rotation processing and/or the viewpoint identification processing to be performed.

In the above embodiments, a case in which the projection plane of the projection system is a inclined ceiling plane as shown in FIG. 21 or the like is described; however the president invention should not be limited to this case. The projection plane may be a plane that is inclined in any direction by any angle with respect to the floor (or the viewpoint of the user). Even in such a case, performing the same processing as above allows an image to be projected on the projection plane, which is the inclined plane, without geometric distortion (with geometric distortion reduced) as viewed from the viewpoint of the user.

The terms "horizontal", "vertical", "longitudinal", "lateral" or the like are concepts that include not only cases represented by the strict meanings of "horizontal", "vertical", "longitudinal", "lateral" or the like but also include cases represented by the meanings of "substantially horizontal", "substantially vertical", "substantially longitudinal", "substantially lateral" or the like. The terms "horizontal", "vertical", "longitudinal", "lateral", "plane" or the like are concepts that permit errors, such as a measurement error and a design error.

Each block of the projection system, the projector apparatus, and the controller described in the above embodiments may be formed using a single chip with a semiconductor device, such as an LSI (large-scale integration) device, or some or all of the blocks of the projection system, the projector apparatus, and/or the controller may be formed using a single chip.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

Figure 36:
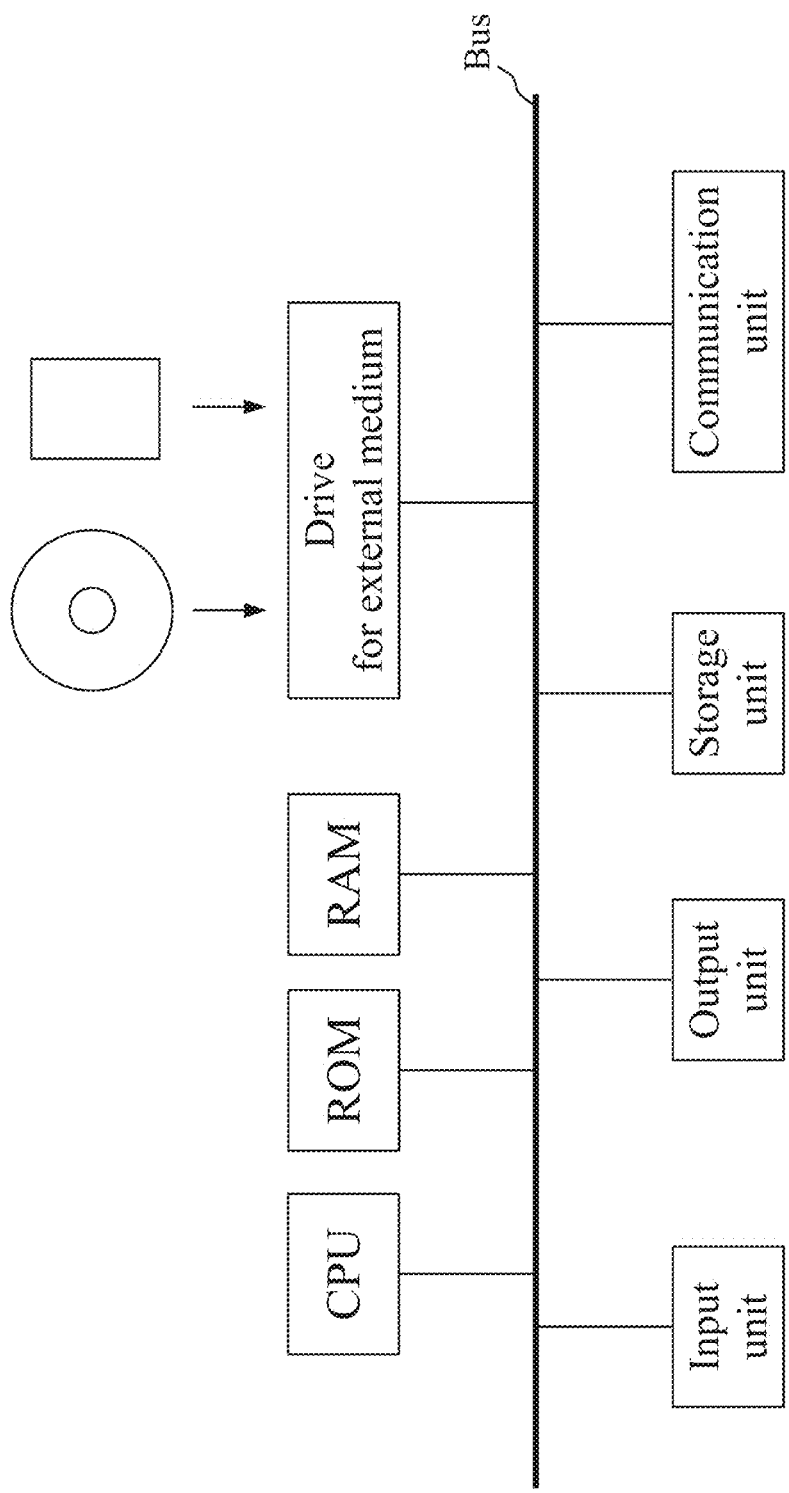
FIG. 36 is a schematic diagram of an exemplary configuration with a CPU bus.

All or part of the processes performed by the functional blocks described in the above embodiments may be implemented using the configuration shown in FIG. 36, for example.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments. The order in which the processes are performed may be changed without departing from the scope and the spirit of the invention.

If the processing details for the correction processing, the rotation processing, and the keystone correction processing are determined in the adjustment processing (the adjustment processing for reducing the geometric distortion of the image) in the above embodiments, the correction processing, the rotation processing, and the keystone correction processing are not necessarily required to be performed separately; instead, an image process for performing a conversion process corresponding to all the processes for the correction processing, the rotation processing, and the keystone correction processing may be performed in actually projecting an image.

If the processing details for the correction processing, the first rotation processing, the second rotation processing, and the viewpoint identification processing are determined in the adjustment processing (the adjustment processing for reducing the geometric distortion of the image) in the above embodiments, the correction processing, the first rotation processing, the second rotation processing, and the viewpoint identification processing are not necessarily required to be performed separately; instead, an image process for performing a conversion process corresponding to all the processes for the correction processing, the first rotation processing, the second rotation processing, and the viewpoint identification processing may be performed in actually projecting an image.

The present invention may also include a computer program enabling a computer to implement the method described in the above embodiments and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program may not be recorded on the recording medium but may be transmitted with an electric communication line, a wireless or cable communication line, or a network such as the Internet.

The term "unit" may include "circuitry," which may be partly or entirely implemented by using either hardware or software, or both hardware and software.

The specific structures described in the above embodiments are mere examples of the present invention, and may be changed and modified variously without departing from the scope and the spirit of the invention.

APPENDIXES

The present invention may also be expressed in the following forms.

A first aspect of the invention provides a projection system in which a plane parallel to a line connecting a left eye viewpoint and a right eye viewpoint is set as a projection plane and an image is projected such that geometric image distortion is reduced as viewed from a user's viewpoint. The projection system includes a projection unit, a three-dimensional shape measurement unit, a controller, and a projected image adjustment unit.

The projection unit is configured to project an image onto the projection plane, and project a test image.

The three-dimensional shape measurement unit is configured to measure a three-dimensional shape of the projection plane.

The controller is configured to generate a control signal based on operation of the user.

(1) The projected image adjustment unit is configured to perform correction processing, which is image conversion processing, on the test image based on the three-dimensional shape data measured by the three-dimensional shape measurement unit such that geometric image distortion is reduced as viewed from a first point, which is a point that passes through a projection center point, which is an intersection of a projection axis of the projection unit and the projection plane, the first point being on a normal line of the projection plane.

(2) The projected image adjustment unit is configured to determine a rotation angle in accordance with the control signal and perform rotation processing, which is image conversion processing, on the test image after the correction processing, such that the image projected on the projection plane, which is obtained by projecting the test image after the correction processing by the projection unit, appears to be an image obtained by rotating the projected image by the rotation angle around the projection center point as viewed from the first point to the projection plane.

In this projection system, a test image whose upper portion can be recognized is projected on a plane parallel to a line connecting a left eye viewpoint and a right eye viewpoint (e.g., a horizontal projection plane, such as a horizontal ceiling plane). Thus, performing processing for rotating the projected image on the projection plane while recognizing a change in states of the test image using the controller by a user allows the image projected on the projection plane to be an image without geometric distortion (with geometric distortion reduced).

Thus, the projection system allows for easily and appropriately eliminating (reducing) geometric distortion of an image projected on a plane (e.g., a horizontal projection plane, such as a horizontal ceiling plane) parallel to a line connecting both eyes of a user without using a device having a photographing function.

Note that "a plane parallel to a line connecting a left eye viewpoint and a right eye viewpoint" is, for example, a projection plane that is a horizontal plane parallel to a floor, a forward inclined plane, or backward inclined plane. Note that "a line connecting a left eye viewpoint and a right eye viewpoint" is, for example, a straight line parallel to a floor when a user stands upright on the floor.

The wording "forward inclined plane" refers to a plane that is obtained by rotating a plane parallel to a floor around a rotation axis, which is a straight line parallel to the floor (or a straight line parallel to a straight line passing through the left eye viewpoint and right eye viewpoint of a user), and that does not incline either in the left direction or in the right direction as viewed from the user, and that inclines forward (in the direction toward the user).

The wording "backward inclined plane" refers to a plane that is obtained by rotating a plane parallel to a floor around a rotation axis, which is a straight line parallel to the floor (or a straight line parallel to a straight line passing through the left eye viewpoint and right eye viewpoint of a user), and that does not incline either in the left direction or in the right direction as viewed from the user, and that inclines backward (in the direction away from the user).

The measure of "a three-dimensional shape of the projection plane" is, for example, a concept that covers (1) the measurement for calculating a normal line of the projection plane and determining the positional relationship between the projection unit and the projection plane, or (2) the measurement for calculating an angle of the projection axis of the projection unit with respect to the projection plane and determining the positional relationship between the projection unit and the projection plane.

A state in which "geometric image distortion is reduced" is, for example, a state in which geometric image distortion of the projected image that occurs due to the positional relationship between the projection unit and the projection plane (the angle of the projection axis with respect to the projection plane) is reduced, so that the original shape of the image to be projected (the original image) has been maintained in the projected image.

Further, the "image conversion processing" performed on the test image after the correction processing such that the image projected on the projection plane, which is obtained by projecting the test image after the correction processing by the projection unit, appears to be an image obtained by rotating the projected image by the rotation angle around the projection center point may be performed by performing the following processes, for example.

That is, assuming that the three-dimensional space is set to a space defined by an x-axis, a y-axis, and a z-axis, a projection center point is set to the origin $(x, y, z)=(0, 0, 0)$, a projection plane is set to a plane on the x-y plane, the coordinates of a pixel Px of the test image after the correction processing are $(x_1, y_1, z_1)$, and the coordinates of the pixel Px after the image conversion processing are $(x_1', y_1', z_1')$, the above "image conversion processing" may be performed by performing processing corresponding to the following formula 18. This causes the pixel Px to move from the coordinates $(x_1, y_1, z_1)$ to the coordinates $(x_1', y_1', z_1')$, thereby allowing for obtaining an image that is obtained by rotating the above "test image after the correction processing" around the z-axis by the angle $\theta$.

Formula 18

$$\begin{pmatrix} x1' \\ y1' \\ z1' \end{pmatrix} = \begin{pmatrix} \cos\theta & -\sin\theta & 0 \\ \sin\theta & \cos\theta & 0 \\ 0 & 0 & 1 \end{pmatrix} \begin{pmatrix} x1 \\ y1 \\ z1 \end{pmatrix} \quad (18)$$

A second aspect of the present invention provides the projection system of the first aspect of the present invention in which the test image is an image including a vertical reference line extending in a vertical direction in an image in a state of being displayed on a display screen.

The projection image adjustment unit determines a distortion reduction amount in accordance with the control signal and performs keystone correction processing, which is image conversion processing, on the test image after the rotation processing such that, as viewed from a point included in a plane that includes the vertical reference line in the projected image projected on the projection plane and is orthogonal to the projection plane, a difference between a first distance that is a length of the projected image in a direction, in which a first cross point that is a point on the vertical reference line is included, orthogonal to the vertical reference line and a second distance that is a length of the projected image in a direction, in which a second cross point that is another point than the first cross point on the vertical reference line is included, orthogonal to the vertical reference line is reduced by an amount corresponding to the distortion reduction amount; for example, the keystone correction processing is performed such that geometric distortion occurring in the direction orthogonal to the vertical reference line is reduced (e.g., the keystone correction processing is performed such that a difference between the length of one side of the projected image in the direction orthogonal to the vertical reference line and the length of the other side of the projected image in the direction orthogonal to the vertical reference line becomes small).

The projection system projects a test image, in which the upper portion can be recognized when the image is displayed, onto the projection plane (e.g., a horizontal projection plane, such as a horizontal ceiling plane) that is parallel to the straight line connecting the left eye viewpoint and right eye viewpoint of the user. In accordance with the user's operation using the controller, the projection system (1) performs processing for rotating the projected image in the projection plane and then (2) performs the keystone correction processing on the image projected onto the projection plane, thereby allowing for eliminating (reducing) geometric distortion in the image projected onto the projection plane.

Thus, the projection system easily and appropriately eliminates (reduces) geometric distortion of an image projected on the projection plane (e.g., a horizontal projection plane, such as a horizontal ceiling plane) that is parallel to the straight line connecting the left eye viewpoint and right eye viewpoint of the user without using a device having a photographing function.

Note that the wording "geometric distortion occurring in the direction orthogonal to the vertical reference line is reduced" includes a concept that a difference between the length (the width) of the projected image in the direction orthogonal to the vertical reference line in the upper portion of the image (the upper portion in the vertical direction when the image is displayed) and the length (the width) of the projected image in the direction orthogonal to the vertical reference line in the lower portion of the image (the lower portion in the vertical direction when the image is displayed) becomes small.

A third aspect of the present invention provides the projection system of the second aspect of the present invention in which the projected image adjustment unit includes a slight adjustment unit configured to adjust a projection state of the projected image when the test image obtained through performing at least one of the rotation processing and the keystone correction processing is projected on the projection plane.

In this projection system, the sliest adjustment unit performs the above-described adjustment processing to correct errors that occurs in the three-dimensional shape measurement processing, for example, thereby allowing for performing even more accurate image projection processing (processing for reducing geometric distortion of the image).

A fourth aspect of the present invention provides the projection system of the second or third aspect of the present invention in which the test image includes a pattern capable of distinguishing the upper portion of the test image in a state of being displayed on a display screen.

This allows for performing processing in the projection system using the test image in which its upper portion can be easily distinguished.

A fifth aspect of the present invention provides the projection system of one of the second to fourth aspects of the present invention in which the test image is an image including a lattice-like pattern composed of a plurality of square lattice patterns.

This projection system projects the test image (lattice-like image composed of square lattice patterns) and performs adjustment processing (for reducing geometric image distortion), for example, using the controller, such that geometric distortion of the projected test image is eliminated. This allows the projection system to perform, using the test image, adjustment processing (adjustment processing for reducing the geometric distortion of the image) in an instinctively easy-to-understand manner.

A sixth aspect of the present invention provides the projection system of the fifth aspect of the present invention in which the test image is an image having a lattice-like pattern in which a first lattice pattern with a first pattern and a second lattice pattern with a second pattern are alternately arranged in a first direction in the test image and a second direction orthogonal to the first direction in the test image in a state without geometric distortion.

This projection system projects the test image and performs adjustment processing (for reducing geometric image distortion), for example, using the controller, such that geometric distortion of the projected test image is eliminated. This allows the projection system to perform, using the test image, adjustment processing (adjustment processing for reducing the geometric distortion of the image) in an instinctively easy-to-understand manner.

A seventh aspect of the present invention provides the projector apparatus used in the projection system of one of the first to fifth aspects of the present invention. The projector apparatus includes the projection unit and the projected image adjustment unit.

This achieves the projector apparatus used in the projection system of one of the first to sixth aspects of the present invention.

An eighth aspect of the invention provides a program enabling a computer to implement a projection method in which a plane parallel to a line connecting a left eye viewpoint and a right eye viewpoint is set as a projection plane and an image is projected such that geometric image distortion is reduced as viewed from a user's viewpoint.

The projection method includes a projection step, a three-dimensional shape measurement step, a step configured to generate a control signal based on operation of the user, and a projected image adjustment step.

The projection step is configured to project a test image onto the projection plane.

The three-dimensional shape measurement step is configured to measure a three-dimensional shape of the projection plane.

(1) The projected image adjustment step is configured to perform correction processing, which is image conversion processing, on the test image based on the three-dimensional shape data measured by the three-dimensional shape measurement step such that geometric image distortion is reduced as viewed from a first point, which is a point that passes through a projection center point, which is an intersection of a projection axis for the projection step and the projection plane, the first point being on a normal line of the projection plane.

(2) The projected image adjustment step is configured to determine a rotation angle in accordance with the control signal and perform rotation processing, which is image conversion processing, on the test image after the correction processing, such that the image projected on the projection plane, which is obtained by projecting the test image after the correction processing by the projection step, appears to be an image obtained by rotating the projected image by the rotation angle around the projection center point as viewed from the first point to the projection plane.

This achieves a program for causing a computer to execute the projection method having the same advantageous effects as the projection system of the first aspect of the present invention.

A ninth aspect of the present invention provides the program of the eighth aspect of the present invention in which the test image is an image including a vertical reference line extending in a vertical direction in an image in a state of being displayed on a display screen.

The projection image adjustment step determines a distortion reduction amount in accordance with the control signal and performs keystone correction processing, which is image conversion processing, on the test image after the rotation processing such that, as viewed from a point included in a plane that includes the vertical reference line in the projected image projected on the projection plane and is orthogonal to the projection plane, geometric distortion occurring in the direction orthogonal to the vertical reference line is reduced by an amount corresponding to the distortion reduction amount.

This achieves a program for causing a computer to execute the projection method having the same advantageous effects as the projection system of the second aspect of the present invention.

A tenth aspect of the invention provides a projection system in which an inclined plane with respect to a plane that is parallel to a plane including a left eye viewpoint and a right eye viewpoint and is a common tangent plane of the right eye cornea and the left eye cornea is set as a projection plane and an image is projected such that geometric image distortion is reduced as viewed from a user's viewpoint. The projection system includes a projection unit, a three-dimensional shape measurement unit, a controller, and a projected image adjustment unit.

The projection unit is configured to project an image on the projection plane, the projection unit projecting a first test image including a vertical reference line for defining a vertical direction in the image and projecting a second test image including a horizontal reference line for defining a horizontal direction in the image.

The three-dimensional shape measurement unit is configured to measure a three-dimensional shape of the projection plane.

The controller is configured to generate a control signal based on operation of the user.

The projected image adjustment unit performs the following processing.

(1A) The projected image adjustment unit performs correction processing, which is image conversion processing, on the first test image based on the three-dimensional shape data measured by the three-dimensional shape measurement unit such that geometric image distortion is reduced as viewed from a first point, which is a point that passes through a projection center point, which is an intersection of a projection axis of the projection unit and the projection plane, the first point being on a normal line of the projection plane.

(2A) The projected image adjustment unit determines a first rotation angle in accordance with the control signal and perform rotation processing, which is image conversion processing, on the first test image after the correction processing such that the image projected on the projection plane, which is obtained by projecting the first test image after the correction processing by the projection unit, appears to be an image obtained by rotating the projected image by the first rotation angle around the projection center point as viewed from the first point to the projection plane.

(1B) The projected image adjustment unit performs correction processing, which is image conversion processing, on the second test image based on the three-dimensional shape data measured by the three-dimensional shape measurement unit such that geometric image distortion is reduced as viewed from a first point, which is a point that passes through a projection center point, which is an intersection of a projection axis of the projection unit and the projection plane, the first point being on a normal line of the projection plane.

(2B) The projected image adjustment unit determines a second rotation angle in accordance with the control signal and perform rotation processing, which is image conversion processing, on the second test image after the correction processing such that the image projected on the projection plane, which is obtained by projecting the second test image after the correction processing by the projection unit, appears to be an image obtained by rotating the projected image by the second rotation angle around the projection center point as viewed from the first point to the projection plane.

(3) The projected image adjustment unit identifies, based on a first straight line that is a straight line including the vertical reference line, on the projection plane, that is in the first test image after the first rotation processing and a second straight line that is a straight line including the horizontal reference line, on the projection plane, that is in the second test image after the first rotation processing, a viewpoint candidate point from which the first straight line appears to be orthogonal to the second straight line, and performs viewpoint identification processing that converts an image to be projected on the projection plane such that geometric distortion of the image is reduced as viewed from the identified viewpoint candidate point.

This projection system performs the viewpoint identification processing as described above, thus allowing the image to be projected, for example, on the inclined ceiling plane without geometric distortion (with geometric distortion reduced) as viewed from the user's viewpoint.

Thus, the projection system easily and appropriately eliminates (reduces) geometric distortion of an image projected on the included projection plane (e.g., an inclined ceiling) without using a device having a photographing function.

An eleventh aspect of the present invention provides the projection system of the tenth aspect of the present invention in which the projected image adjustment unit performs the following processes.

Assuming that xyz coordinates space is defined in which an optical axis of the projection unit is set to a z-axis, and an x-axis and a y-axis is set such that a plane whose normal line is the optical axis of the projection unit is x-y plane, a point on a first straight line that is a straight line including the vertical reference line, on the projection plane, that is in the first test image after the first rotation processing is set to a point Pa whose coordinates are (ax, ay, az), a point on a second straight line that is a straight line including the horizontal reference line, on the projection plane, that is in the second test image after the second rotation processing is set to a point Pb whose coordinates are (bx, by, bz), and an intersection of the first straight line and the second straight line is calculated as a point Pc whose coordinates are (cx, cy, cz), the projected image adjustment unit obtains coefficients A, B, and C by performing processing corresponding to:

$$A = -ax \times by + ay \times bx$$

$$B = -ax \times bz + az \times bx$$

$$C = -az \times by + ay \times bz.$$

The projected image adjustment unit obtains rotation matrices Rx, Ry, and Rz by performing processing corresponding to:

Formula 19

$$Rx = \frac{1}{\sqrt{A^2+B^2}} \begin{pmatrix} \sqrt{A^2+B^2} & 0 & 0 \\ 0 & A & B \\ 0 & -B & A \end{pmatrix} \quad (19)$$

Formula 20

$$Ry = \frac{1}{\sqrt{A^2+B^2+C^2}} \begin{pmatrix} \sqrt{A^2+B^2} & 0 & C \\ 0 & \sqrt{A^2+B^2+C^2} & 0 \\ -C & 0 & \sqrt{A^2+B^2} \end{pmatrix} \quad (20)$$

Formula 21

$$Rz = \frac{1}{k1} \begin{pmatrix} a_y A + a_z B & -a_x \sqrt{A^2+B^2+C^2} & 0 \\ a_x \sqrt{A^2+B^2+C^2} & a_y A + a_z B & 0 \\ 0 & 0 & k1 \end{pmatrix} \quad (21)$$

$$k1 = \sqrt{a_x^2(A^2+B^2+C^2) + (a_y A + a_z B)^2}$$

The projected image adjustment unit obtains a composite matrix R by performing processing corresponding to:

$$R = Rz \cdot Ry \cdot Rx.$$

Further, the projected image adjustment unit obtains an inverse matrix of the matrix R as $R^{-1}$.

The projected image adjustment unit obtains a point obtained by transforming the point Pb whose coordinates are (bx, by, bz) using the composite matrix as a point Pb' whose coordinates are (bx', by', bz'), and determines an angle θ in accordance with the control signal from the controller.

The projected image adjustment unit determines the coefficient A' by performing processing corresponding to:

Formula 22

$$A' = b_y'^2 + b_x'^2 \sin^2\theta \quad (22)$$

The projected image adjustment unit calculates coordinates (x, y, z) of the viewpoint candidate point by performing processing corresponding to:

Formula 23

$$Vp = \begin{pmatrix} x \\ y \\ z \end{pmatrix} = R^{-1} R'^T V' + \begin{pmatrix} c_x \\ c_y \\ c_z \end{pmatrix} = R^{-1} R'^T \begin{pmatrix} 0 \\ 0 \\ 1 \end{pmatrix} + \begin{pmatrix} c_x \\ c_y \\ c_z \end{pmatrix} \quad (23)$$

$$= \frac{R^{-1}}{\sqrt{b_y'^2 + b_x'^2 \sin^2\theta}} \begin{pmatrix} \pm b_x' \sin^2\theta \\ \pm b_y' \\ \mp b_x' \sin\theta\cos\theta \end{pmatrix} + \begin{pmatrix} c_x \\ c_y \\ c_z \end{pmatrix}$$

Formula 24

$$R' = \frac{1}{k2} \begin{pmatrix} \cos\theta & 0 & \sin\theta \\ \pm b_y' \sin\theta & \mp b_x' \sin\theta & \mp b_y' \cos\theta \\ \pm b_x' \sin^2\theta & \pm b_y' & \mp b_x' \sin\theta\cos\theta \end{pmatrix} \quad (24)$$

$$k2 = \sqrt{b_y'^2 + b_x'^2 \sin^2\theta}$$

V'=(0, 0, 1).

This projection system performs the viewpoint identification processing as described above, thus allowing the image to be projected, for example, on the inclined ceiling plane without geometric distortion (with geometric distortion reduced) as viewed from the user's viewpoint.

Thus, the projection system easily and appropriately eliminates (reduces) geometric distortion of an image projected on the included projection plane (e.g., an inclined ceiling) without using a device having a photographing function.

A twelfth aspect of the present invention provides the projection system of the tenth or the eleventh aspect of the present invention in which the first test image includes the vertical reference line passing through a center point of the first test image in a state of being displayed on the display screen.

Thus, in the projection system, it becomes easy to specify the first straight line including the vertical reference line in the first test image on the projection plane.

A thirteenth aspect of the present invention provides the projection system of the tenth or the eleventh aspect of the present invention in which the second test image includes the horizontal reference line passing through a center point of the second test image in a state of being displayed on the display screen.

Thus, in the projection system, it becomes easy to specify the first straight line including the horizontal reference line in the second test image on the projection plane.

A fourteenth aspect of the present invention provides the projection system of one of the tenth to thirteenth aspects of the present invention in which the first test image includes a pattern capable of distinguishing the upper portion of the first test image in a state of being displayed on a display screen.

Thus, in this projection system, it is possible to easily specify the top and bottom of the projection image on the projection plane.

A fifteenth aspect of the present invention provides the projection system of one of the tenth to fourteenth aspects of the present invention in which the projection unit projects a third test image including a lattice-like pattern composed of a plurality of square lattice patterns when the viewpoint identification processing is performed.

Thus, in this projection system, it is possible to easily recognize the degree of distortion of the lattice-like patterns, thereby allowing for easily recognizing the degree of distortion of the projected image.

A sixteenth aspect of the present invention provides the projection system of the fifteenth aspect of the present invention in which the third test image is an image having a lattice-like pattern in which a first lattice pattern with a first pattern and a second lattice pattern with a second pattern are alternately arranged in a first direction in the third test image and a second direction orthogonal to the first direction in the third test image in a state without geometric distortion.

Thus, in this projection system, it is possible to easily recognize the degree of distortion of the lattice-like patterns, thereby allowing for easily recognizing the degree of distortion of the projected image.

A seventeenth aspect of the present invention provides a projector apparatus used in the projection system according to one of the tenth to sixteenth aspects of the present invention. The projector apparatus includes the projection unit and the projected image adjustment unit.

This achieves a projector apparatus used in the projection system of one of the tenth to sixteenth aspects of the present invention.

An eighteenth aspect of the present invention provides a program enabling a computer to implement a projection method in which an inclined plane with respect to a plane that is parallel to a plane including a left eye viewpoint and a right eye viewpoint and is a common tangent plane of the right eye cornea and the left eye cornea is set as a projection plane and an image is projected such that geometric image distortion is reduced as viewed from a user's viewpoint, the projection method performed using a controller that generates a control signal in accordance with a user's operation.

The projection method includes a projection step, a three-dimensional shape measurement step, a projected image adjustment step The projection step is configured to project an image on the projection plane. The projection step is configured to project a first test image including a vertical reference line for defining a vertical direction in the image and projecting a second test image including a horizontal reference line for defining a horizontal direction in the image.

The three-dimensional shape measurement step is configured to measure a three-dimensional shape of the projection plane.

The projected image adjustment step performs the following processes.

(1A) The projected image adjustment step is configured to perform correction processing, which is image conversion processing, on the first test image based on the three-dimensional shape data measured by the three-dimensional shape measurement step such that geometric image distortion is reduced as viewed from a first point, which is a point that passes through a projection center point, which is an intersection of a projection axis for projecting the image in the projection step and the projection plane, the first point being on a normal line of the projection plane.

(2A) The projected image adjustment step is configured to determine a first rotation angle in accordance with the control signal and perform rotation processing, which is image conversion processing, on the first test image after the correction processing such that the image projected on the projection plane, which is obtained by projecting the first test image after the correction processing by the projection step, appears to be an image obtained by rotating the projected image by the first rotation angle around the projection center point as viewed from the first point to the projection plane.

(1B) The projected image adjustment step is configured to perform correction processing, which is image conversion processing, on the second test image based on the three-dimensional shape data measured by the three-dimensional shape measurement step such that geometric image distortion is reduced as viewed from a first point, which is a point that passes through a projection center point, which is an intersection of a projection axis for projecting the image in the projection step and the projection plane, the first point being on a normal line of the projection plane.

(2B) The projected image adjustment step is configured to determine a second rotation angle in accordance with the control signal and perform rotation processing, which is image conversion processing, on the second test image after the correction processing such that the image projected on the projection plane, which is obtained by projecting the second test image after the correction processing by the projection step, appears to be an image obtained by rotating the projected image by the second rotation angle around the projection center point as viewed from the first point to the projection plane.

(3) The projected image adjustment step is configured to identify, based on a first straight line that is a straight line including the vertical reference line, on the projection plane, that is in the first test image after the first rotation processing and a second straight line that is a straight line including the horizontal reference line, on the projection plane, that is in the second test image after the first rotation processing, a viewpoint candidate point from which the first straight line appears to be orthogonal to the second straight line, and perform viewpoint identification processing that converts an image to be projected on the projection plane such that geometric distortion of the image is reduced as viewed from the identified viewpoint candidate point.

This achieves a program enabling a computer to implement the projection method having the same advantageous effects as the projection system of the tenth aspect of the present invention.

REFERENCE SIGNS LIST 1000, 2000 projection system
100, 100A, 2100 projector apparatus
1, 1A, 201 projected image adjustment unit 2 test image storage unit
3 projection part
4 three-dimensional shape measurement unit
5 three-dimensional shape data storage unit
6 first interface
200 controller

What is claimed is:

1. A projection system in which a plane parallel to a line connecting a left eye viewpoint and a right eye viewpoint is set as a projection plane and an image is projected such that geometric image distortion is reduced as viewed from a user's viewpoint, the projection system comprising:
   projection circuitry configured to project an image onto the projection plane, the projection circuitry projecting a test image;
   three-dimensional shape measurement circuitry configured to measure a three-dimensional shape of the projection plane;
   controller configured to generate a control signal based on operation of the user; and
   projected image adjustment circuitry (1) configured to perform correction processing, which is image conversion processing, on the test image based on the three-dimensional shape data measured by the three-dimensional shape measurement circuitry such that geometric image distortion is reduced as viewed from a first point, which is a point that passes through a projection center point, which is an intersection of a projection axis of the projection circuitry and the projection plane, the first point being on a normal line of the projection plane, and (2) configured to determine a rotation angle in accordance with the control signal and perform rotation processing, which is image conversion processing, on the test image after the correction processing, such that the image projected on the projection plane, which is obtained by projecting the test image after the correction processing by the projection circuitry, appears to be an image obtained by rotating the projected image by the rotation angle around the projection center point as viewed from the first point to the projection plane.

2. The projection system according to claim 1, wherein the test image is an image including a vertical reference line extending in a vertical direction in an image in a state of being displayed on a display screen, and
   the projection image adjustment circuitry determines a distortion reduction amount in accordance with the control signal and performs keystone correction processing, which is image conversion processing, on the test image after the rotation processing such that, as viewed from a point included in a plane that includes the vertical reference line in the projected image projected on the projection plane and is orthogonal to the projection plane, a difference between a first distance that is a length of the projected image in a direction, in which a first cross point that is a point on the vertical reference line is included, orthogonal to the vertical reference line and a second distance that is a length of the projected image in a direction, in which a second cross point that is another point than the first cross point on the vertical reference line is included, orthogonal to the vertical reference line is reduced by an amount corresponding to the distortion reduction amount.

3. The projection system according to claim 2, wherein the projected image adjustment circuitry includes slight adjustment circuitry configured to adjust a projection state of the projected image when the test image obtained through performing at least one of the rotation processing and the keystone correction processing is projected on the projection plane.

4. The projection system according to claim 2, wherein the test image includes a pattern capable of distinguishing the upper portion of the test image in a state of being displayed on a display screen.

5. The projection system according to claim 2, wherein the test image is an image including a lattice-like pattern composed of a plurality of square lattice patterns.

6. The projection system according to claim 5, wherein the test image is an image having a lattice-like pattern in which a first lattice pattern with a first pattern and a second lattice pattern with a second pattern are alternately arranged in a first direction in the test image and a second direction orthogonal to the first direction in the test image in a state without geometric distortion.

7. A projector apparatus used in the projection system according to claim 1, the projector apparatus comprising the projection circuitry and the projected image adjustment circuitry.

8. A projection method in which a plane parallel to a line connecting a left eye viewpoint and a right eye viewpoint is set as a projection plane and an image is projected such that geometric image distortion is reduced as viewed from a user's viewpoint, the projection method comprising:
   (a) projecting an image onto the projection plane, and the step of projecting including projecting a test image;
   (b) measuring a three-dimensional shape of the projection plane;
   (c) generating a control signal based on operation of the user; and
   (d) (1) performing correction processing, which is image conversion processing, on the test image based on the three-dimensional shape data measured by the step (b) such that geometric image distortion is reduced as viewed from a first point, which is a point that passes through a projection center point, which is an intersection of a projection axis for the step (a) and the projection plane, the first point being on a normal line of the projection plane, and (2) determining a rotation angle in accordance with the control signal and performing rotation processing, which is image conversion processing, on the test image after the correction processing, such that the image projected on the projection plane, which is obtained by projecting the test image after the correction processing by the step (a), appears to be an image obtained by rotating the projected image by the rotation angle around the projection center point as viewed from the first point to the projection plane.

9. The projection method according to claim 8, wherein the test image is an image including a vertical reference line extending in a vertical direction in an image in a state of being displayed on a display screen, and
   the step (d) determines a distortion reduction amount in accordance with the control signal and performs keystone correction processing, which is image conversion processing, on the test image after the rotation processing such that, as viewed from a point included in a plane that includes the vertical reference line in the projected image projected on the projection plane and is orthogonal to the projection plane, geometric distortion occurring in the direction orthogonal to the vertical reference line is reduced by an amount corresponding to the distortion reduction amount.

10. A projection system in which an inclined plane with respect to a plane that is parallel to a plane including a left eye viewpoint and a right eye viewpoint and is a common tangent plane of the right eye cornea and the left eye cornea is set as a projection plane and an image is projected such that geometric image distortion is reduced as viewed from a user's viewpoint, the projection system comprising:
- a projection circuitry configured to project an image on the projection plane, the projection circuitry projecting a first test image including a vertical reference line for defining a vertical direction in the image and projecting a second test image including a horizontal reference line for defining a horizontal direction in the image;
- a three-dimensional shape measurement circuitry configured to measure a three-dimensional shape of the projection plane;
- a controller configured to generate a control signal based on operation of the user; and
- a projected image adjustment circuitry configured to:
  (1A) perform correction processing, which is image conversion processing, on the first test image based on the three-dimensional shape data measured by the three-dimensional shape measurement circuitry such that geometric image distortion is reduced as viewed from a first point, which is a point that passes through a projection center point, which is an intersection of a projection axis of the projection circuitry and the projection plane, the first point being on a normal line of the projection plane,
  (2A) determine a first rotation angle in accordance with the control signal and perform rotation processing, which is image conversion processing, on the first test image after the correction processing such that the image projected on the projection plane, which is obtained by projecting the first test image after the correction processing by the projection circuitry, appears to be an image obtained by rotating the projected image by the first rotation angle around the projection center point as viewed from the first point to the projection plane,
  (1B) perform correction processing, which is image conversion processing, on the second test image based on the three-dimensional shape data measured by the three-dimensional shape measurement circuitry such that geometric image distortion is reduced as viewed from a first point, which is a point that passes through a projection center point, which is an intersection of a projection axis of the projection circuitry and the projection plane, the first point being on a normal line of the projection plane,
  (2B) determine a second rotation angle in accordance with the control signal and perform rotation processing, which is image conversion processing, on the second test image after the correction processing such that the image projected on the projection plane, which is obtained by projecting the second test image after the correction processing by the projection circuitry, appears to be an image obtained by rotating the projected image by the second rotation angle around the projection center point as viewed from the first point to the projection plane, and
  (3) identify, based on a first straight line that is a straight line including the vertical reference line, on the projection plane, that is in the first test image after the first rotation processing and a second straight line that is a straight line including the horizontal reference line, on the projection plane, that is in the second test image after the first rotation processing, a viewpoint candidate point from which the first straight line appears to be orthogonal to the second straight line, and perform viewpoint identification processing that converts an image to be projected on the projection plane such that geometric distortion of the image is reduced as viewed from the identified viewpoint candidate point.

11. The projection system according to claim 10, wherein assuming that xyz coordinates space is defined in which an optical axis of the projection circuitry is set to a z-axis, and an x-axis and a y-axis is set such that a plane whose normal line is the optical axis of the projection circuitry is x-y plane, a point on a first straight line that is a straight line including the vertical reference line, on the projection plane, that is in the first test image after the first rotation processing is set to a point Pa whose coordinates are (ax, ay, az), a point on a second straight line that is a straight line including the horizontal reference line, on the projection plane, that is in the second test image after the second rotation processing is set to a point Pb whose coordinates are (bx, by, bz), and an intersection of the first straight line and the second straight line is calculated as a point Pc whose coordinates are (cx, cy, cz), the projected image adjustment circuitry obtains coefficients A, B, and C by performing processing corresponding to:

$$A = -ax \times by + ay \times bx$$

$$B = -ax \times bz + az \times bx$$

$$C = -az \times by + ay \times bz$$

the projected image adjustment circuitry obtains rotation matrices Rx, Ry, and Rz by performing processing corresponding to:

$$Rx = \frac{1}{\sqrt{A^2 + B^2}} \begin{pmatrix} \sqrt{A^2 + B^2} & 0 & 0 \\ 0 & A & B \\ 0 & -B & A \end{pmatrix} \quad (\text{cl11-1})$$

$$Ry = \frac{1}{\sqrt{A^2 + B^2 + C^2}} \begin{pmatrix} \sqrt{A^2 + B^2} & 0 & C \\ 0 & \sqrt{A^2 + B^2 + C^2} & 0 \\ -C & 0 & \sqrt{A^2 + B^2} \end{pmatrix} \quad (\text{cl11-2})$$

$$Rz = \frac{1}{k1} \begin{pmatrix} a_y A + a_z B & -a_x \sqrt{A^2 + B^2 + C^2} & 0 \\ a_x \sqrt{A^2 + B^2 + C^2} & a_y A + a_z B & 0 \\ 0 & 0 & k1 \end{pmatrix} \quad (\text{cl11-3})$$

$$k1 = \sqrt{a_x^2(A^2 + B^2 + C^2) + (a_y A + a_z B)^2}$$

the projected image adjustment circuitry obtains a composite matrix R by performing processing corresponding to:

$$R = Rz \cdot Ry \cdot Rx$$

the projected image adjustment circuitry obtains an inverse matrix of the matrix R as $R^{-1}$, obtains a point obtained by transforming the point Pb whose coordinates are (bx, by, bz) using the composite matrix as a point Pb' whose coordinates are (bx', by', bz'), and determines an angle θ in accordance with the control signal from the controller, the projected image adjustment circuitry determines the coefficient A' by performing processing corresponding to:

$$A' = b_y'^2 + b_x'^2 \sin^2\theta \qquad \text{(cl1-4)}$$

and the projected image adjustment circuitry calculates coordinates (x, y, z) of the viewpoint candidate point by performing processing corresponding to:

$$Vp = \begin{pmatrix} x \\ y \\ z \end{pmatrix} = R^{-1} R'^T V' + \begin{pmatrix} c_x \\ c_y \\ c_z \end{pmatrix} = R^{-1} R'^T \begin{pmatrix} 0 \\ 0 \\ 1 \end{pmatrix} + \begin{pmatrix} c_x \\ c_y \\ c_z \end{pmatrix} \qquad \text{(cl1-5)}$$

$$= \frac{R^{-1}}{\sqrt{b_y'^2 + b_x'^2 \sin^2\theta}} \begin{pmatrix} \pm b_x' \sin^2\theta \\ \pm b_y' \\ \mp b_x' \sin\theta \cos\theta \end{pmatrix} + \begin{pmatrix} c_x \\ c_y \\ c_z \end{pmatrix}$$

$$R' = \frac{1}{k2} \begin{pmatrix} \cos\theta & 0 & \sin\theta \\ \pm b_y' \sin\theta & \mp b_x' \sin\theta & \mp b_y' \cos\theta \\ \pm b_x' \sin^2\theta & \pm b_y' & \mp b_x' \sin\theta \cos\theta \end{pmatrix} \qquad \text{(cl1-6)}$$

$$k2 = \sqrt{b_y'^2 + b_x'^2 \sin^2\theta}$$

V'=(0, 0, 1).

12. The projection system according to claim 10, wherein the first test image includes the vertical reference line passing through a center point of the first test image in a state of being displayed on the display screen.

13. The projection system according to claim 10, wherein the second test image includes the horizontal reference line passing through a center point of the second test image in a state of being displayed on the display screen.

14. The projection system according to claim 10, wherein the first test image includes a pattern capable of distinguishing the upper portion of the first test image in a state of being displayed on a display screen.

15. The projection system according to claim 10, wherein the projection circuitry projects a third test image including a lattice-like pattern composed of a plurality of square lattice patterns when the viewpoint identification processing is performed.

16. The projection system according to claim 15, wherein the third test image is an image having a lattice-like pattern in which a first lattice pattern with a first pattern and a second lattice pattern with a second pattern are alternately arranged in a first direction in the third test image and a second direction orthogonal to the first direction in the third test image in a state without geometric distortion.

17. A projector apparatus used in the projection system according to claim 10, the projector apparatus comprising the projection circuitry and the projected image adjustment circuitry.

18. A projection method in which an inclined plane with respect to a plane that is parallel to a plane including a left eye viewpoint and a right eye viewpoint and is a common tangent plane of the right eye cornea and the left eye cornea is set as a projection plane and an image is projected such that geometric image distortion is reduced as viewed from a user's viewpoint, the projection method performed using a controller that generates a control signal in accordance with a user's operation, the projection method comprising:

(a) projecting an image on the projection plane, the step of projecting including projecting a first test image including a vertical reference line for defining a vertical direction in the image and projecting a second test image including a horizontal reference line for defining a horizontal direction in the image;

(b) measuring a three-dimensional shape of the projection plane;

(c) (1A) performing correction processing, which is image conversion processing, on the first test image based on the three-dimensional shape data measured by the step (b) such that geometric image distortion is reduced as viewed from a first point, which is a point that passes through a projection center point, which is an intersection of a projection axis for projecting the image in the step (a) and the projection plane, the first point being on a normal line of the projection plane, (2A) determining a first rotation angle in accordance with the control signal and perform rotation processing, which is image conversion processing, on the first test image after the correction processing such that the image projected on the projection plane, which is obtained by projecting the first test image after the correction processing by the step (a), appears to be an image obtained by rotating the projected image by the first rotation angle around the projection center point as viewed from the first point to the projection plane, (1B) performing correction processing, which is image conversion processing, on the second test image based on the three-dimensional shape data measured by the step (b) such that geometric image distortion is reduced as viewed from a first point, which is a point that passes through a projection center point, which is an intersection of a projection axis for projecting the image in the step (a) and the projection plane, the first point being on a normal line of the projection plane, (2B) determining a second rotation angle in accordance with the control signal and perform rotation processing, which is image conversion processing, on the second test image after the correction processing such that the image projected on the projection plane, which is obtained by projecting the second test image after the correction processing by the step (a), appears to be an image obtained by rotating the projected image by the second rotation angle around the projection center point as viewed from the first point to the projection plane, and (3) identifying, based on a first straight line that is a straight line including the vertical reference line, on the projection plane, that is in the first test image after the first rotation processing and a second straight line that is a straight line including the horizontal reference line, on the projection plane, that is in the second test image after the first rotation processing, a viewpoint candidate point from which the first straight line appears to be orthogonal to the second straight line, and performing viewpoint identification processing that converts an image to be projected on the projection plane such that geometric distortion of the image is reduced as viewed from the identified viewpoint candidate point.

* * * * *